United States Patent
Caldwell et al.

(10) Patent No.: US 10,248,264 B2
(45) Date of Patent: Apr. 2, 2019

(54) APPARATUS AND METHOD FOR DETERMINING A STIMULUS, INCLUDING A TOUCH INPUT AND A STYLUS INPUT

(71) Applicant: AlSentis, LLC, Holland, MI (US)

(72) Inventors: David W. Caldwell, Holland, MI (US); William D. Schaefer, Grand Rapids, MI (US); Robert G. Bos, Grand Haven, MI (US); Stefan G. Kurek, Grand Rapids, MI (US)

(73) Assignee: Alsentis, LLC, Holland, MI (US)

( * ) Notice: Subject to any disclaimer, the term of this patent is extended or adjusted under 35 U.S.C. 154(b) by 0 days.

(21) Appl. No.: 14/396,794

(22) PCT Filed: Apr. 26, 2013

(86) PCT No.: PCT/US2013/038323
§ 371 (c)(1),
(2) Date: Oct. 24, 2014

(87) PCT Pub. No.: WO2013/163496
PCT Pub. Date: Oct. 31, 2013

(65) Prior Publication Data
US 2015/0301646 A1 Oct. 22, 2015

Related U.S. Application Data

(60) Provisional application No. 61/639,373, filed on Apr. 27, 2012.

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0418* (2013.01);
(Continued)

(58) Field of Classification Search
CPC . G06F 2203/04101; G06F 2203/04103; G06F 2203/04104; G06F 3/0412; G06F 3/0418; G06F 3/044
See application file for complete search history.

(56) References Cited

U.S. PATENT DOCUMENTS 4,766,368 A   8/1988   Cox
7,009,663 B2  3/2006   Abileah et al.
(Continued)

FOREIGN PATENT DOCUMENTS

JP       2010218535 A    9/2010

OTHER PUBLICATIONS

International Search Report and Written Opinion of the International Searching Authority for PC/US13/38323 dated Oct. 18, 2013.
(Continued)

*Primary Examiner* — Hong Zhou
(74) *Attorney, Agent, or Firm* — Lorenz & Kopf, LLP

(57) ABSTRACT

A capacitive sensor for detecting a stimulus. The capacitive sensor includes first and second electrodes defining a capacitive coupling, and a processing unit electrically coupled to the first and second electrodes to determine the presence of a stimulus based on the rate of change of the capacitive coupling. A substrate is positioned adjacent the first and second electrodes, wherein the stimulus corresponds to the placement of an object against the substrate. The processing unit is operative to determine a time rate of change based on successive measurements of the capacitive coupling and in response to the capacitive coupling being greater than a predetermined reference value.

8 Claims, 63 Drawing Sheets

(52) U.S. Cl.
CPC .............. *G06F 2203/04101* (2013.01); *G06F 2203/04103* (2013.01); *G06F 2203/04104* (2013.01)

(56) References Cited

U.S. PATENT DOCUMENTS

| | | | |
|---|---|---|---|
| 7,920,134 B2 | 4/2011 | Krah | |
| 8,111,243 B2 | 2/2012 | Peng et al. | |
| 2003/0067451 A1* | 4/2003 | Tagg | G01V 3/088 345/174 |
| 2005/0005703 A1* | 1/2005 | Saito | G01L 9/12 73/780 |
| 2005/0069695 A1* | 3/2005 | Jung | D03D 1/0088 428/328 |
| 2006/0267953 A1* | 11/2006 | Peterson, Jr. | G06F 3/0418 345/173 |
| 2006/0279551 A1* | 12/2006 | Lii | G06F 3/044 345/173 |
| 2008/0238448 A1* | 10/2008 | Moore | G10H 3/10 324/686 |
| 2009/0284495 A1 | 11/2009 | Geaghan et al. | |
| 2010/0164901 A1* | 7/2010 | Chen | G06F 3/044 345/174 |
| 2010/0295813 A1 | 11/2010 | Kent | |
| 2011/0025629 A1 | 2/2011 | Grivna et al. | |
| 2011/0084937 A1 | 4/2011 | Chang et al. | |
| 2011/0115717 A1 | 5/2011 | Hable et al. | |
| 2011/0227866 A1* | 9/2011 | Kawaguchi | G06F 3/044 345/174 |
| 2011/0254672 A1* | 10/2011 | Ciesla | G06F 3/016 340/407.2 |
| 2011/0279408 A1 | 11/2011 | Urano et al. | |
| 2012/0043976 A1 | 2/2012 | Bokma et al. | |
| 2012/0050214 A1* | 3/2012 | Kremin | G06F 3/0418 345/174 |
| 2012/0062516 A1 | 3/2012 | Chen et al. | |
| 2012/0068760 A1* | 3/2012 | Caldwell | G06F 3/0418 327/517 |
| 2012/0068957 A1 | 3/2012 | Puskarich | |
| 2012/0075239 A1 | 3/2012 | Azumi et al. | |
| 2012/0092324 A1 | 4/2012 | Buchan et al. | |
| 2012/0113047 A1 | 5/2012 | Hanauer et al. | |
| 2013/0249849 A1* | 9/2013 | Wong | G06F 1/3231 345/174 |

OTHER PUBLICATIONS

Japan Patent Office, Decision of Final Rejection in Japanese Patent Application No. 2015-509162 dated Jan. 16, 2018.

\* cited by examiner

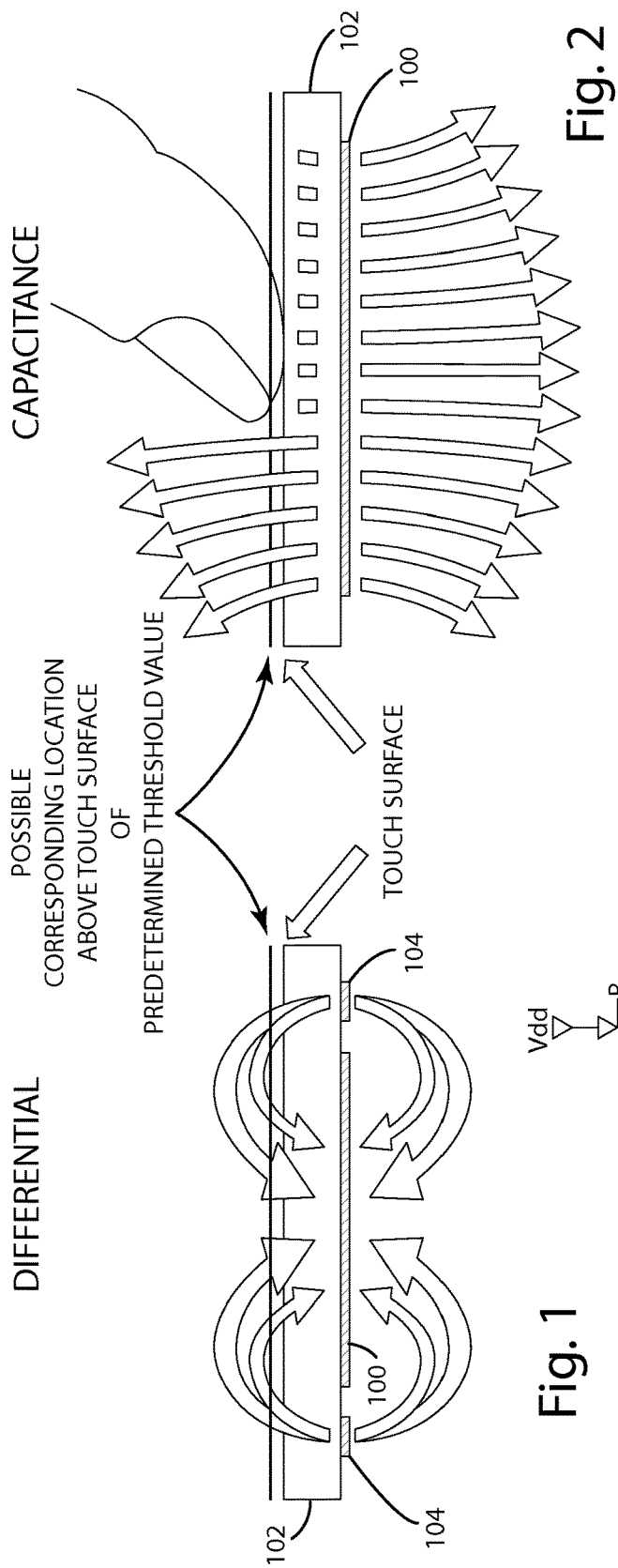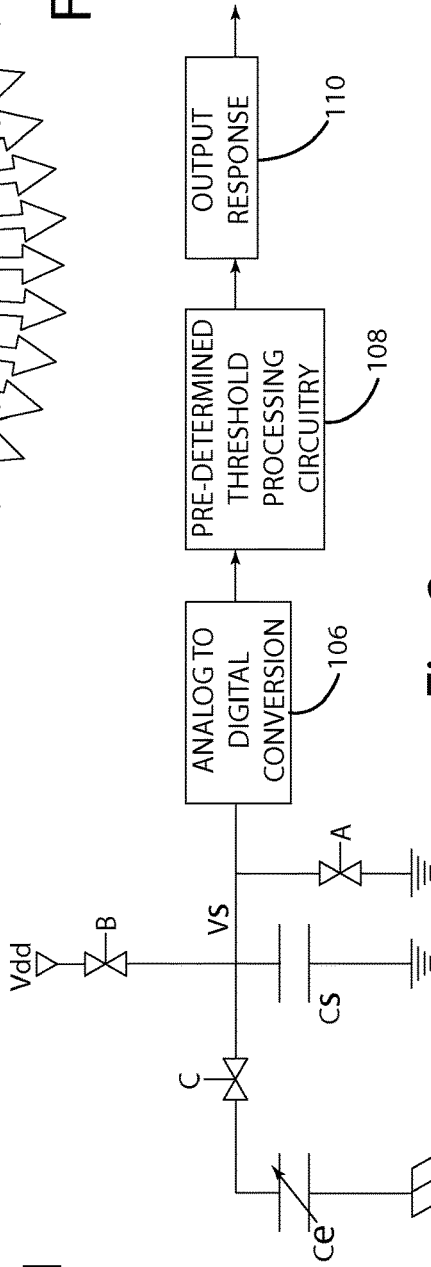

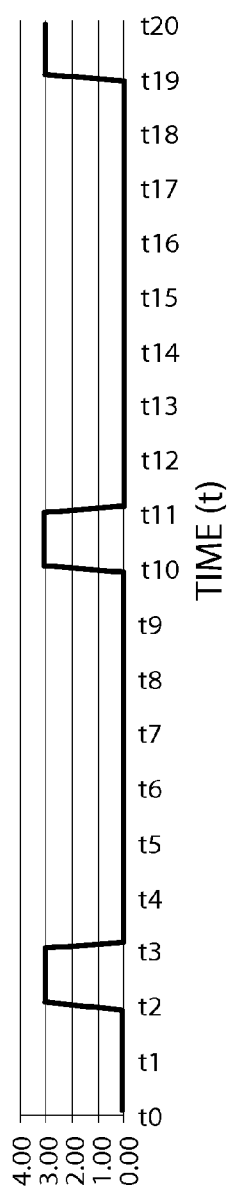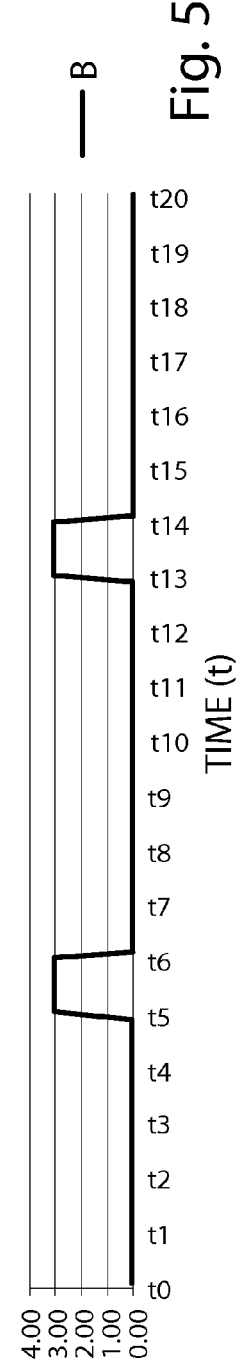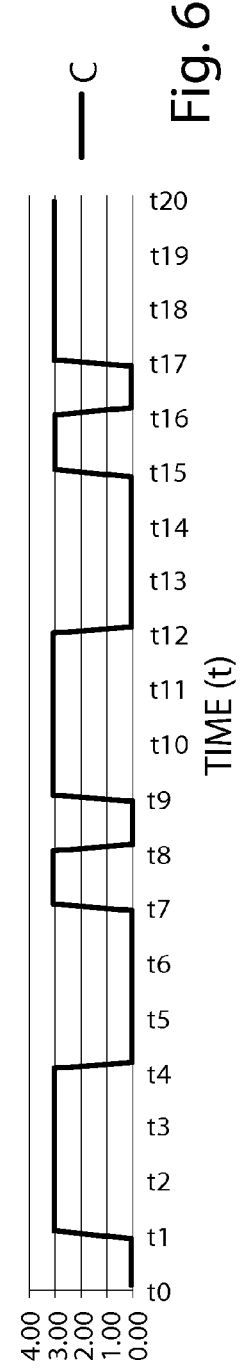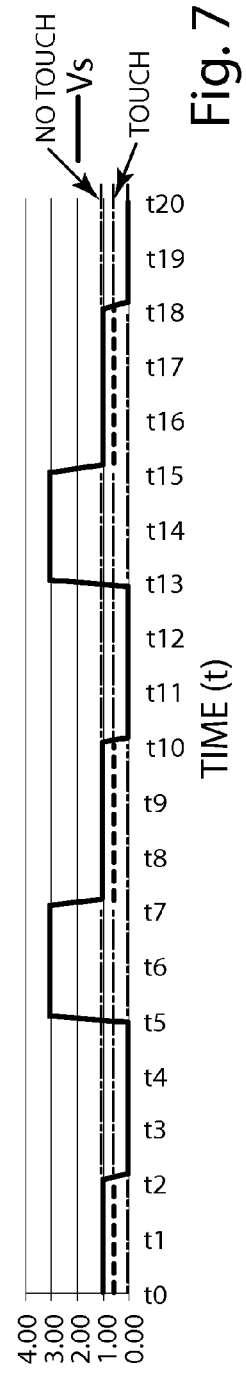

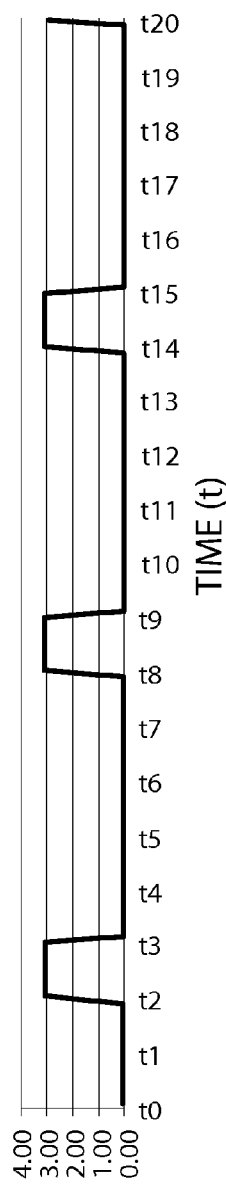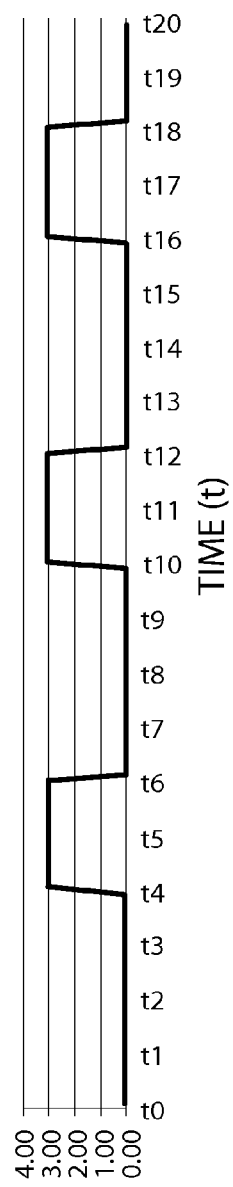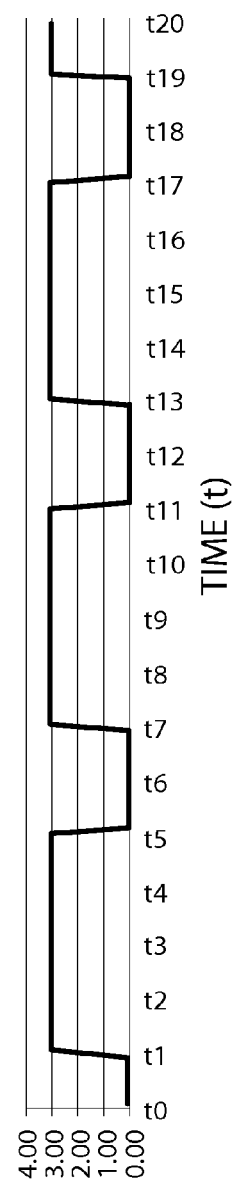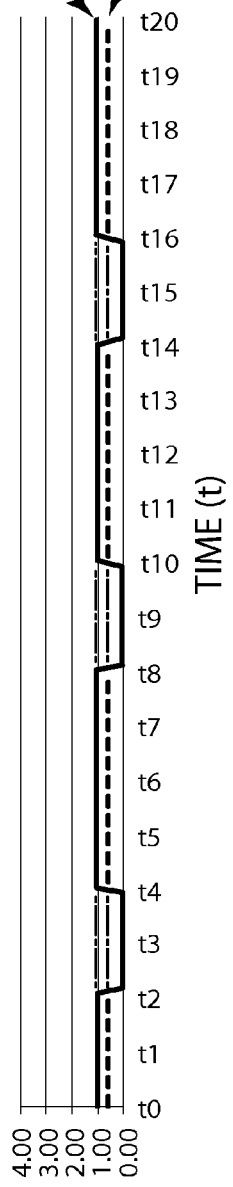

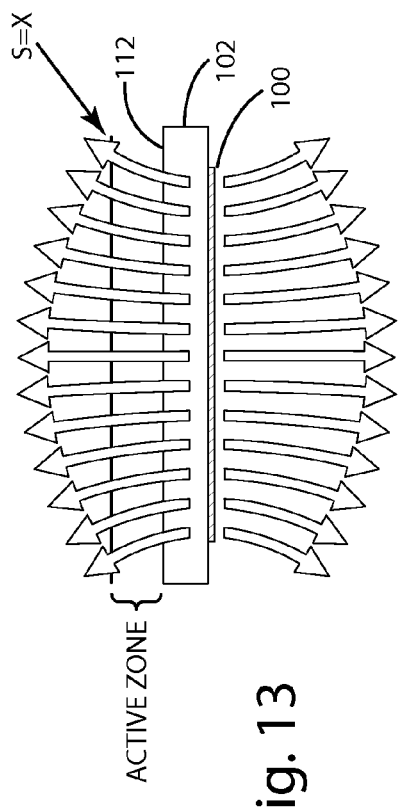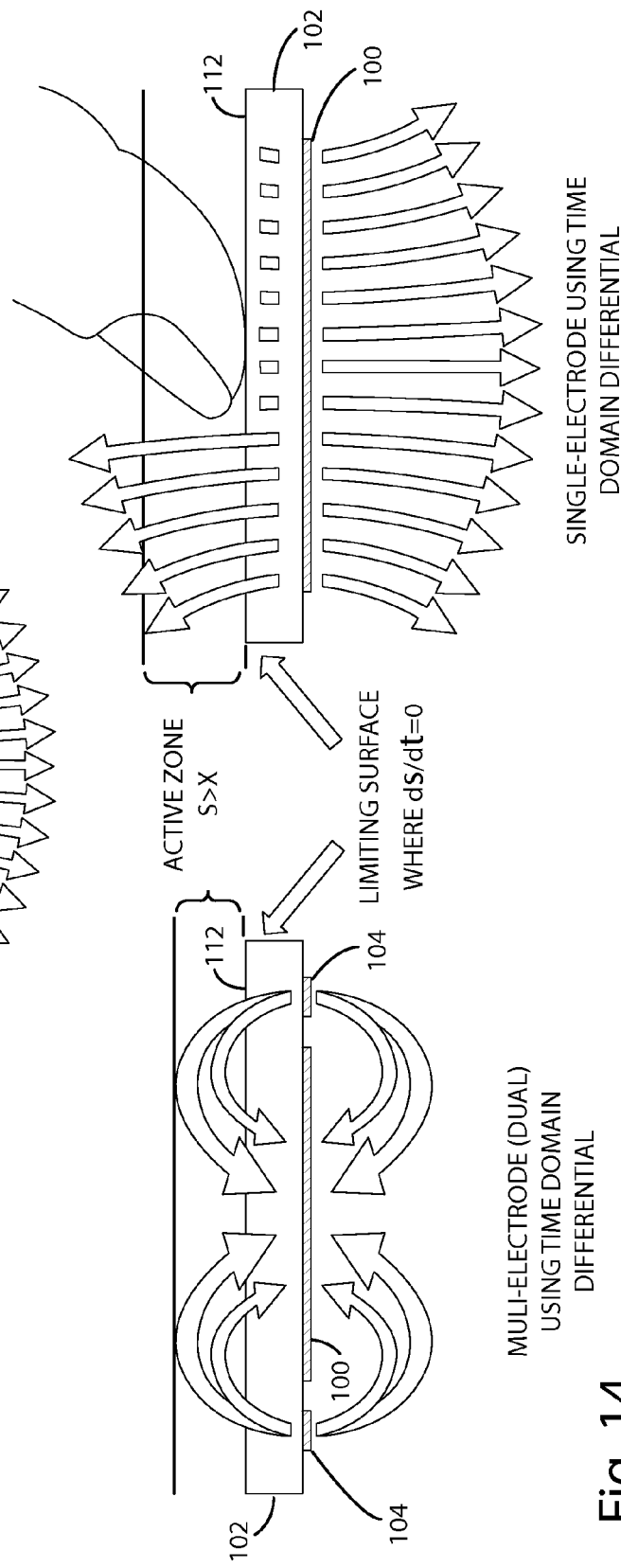

SINGLE ELECTRODES

GROUND PLANE

ELECTRODES

GROUND PLANE

SINGLE ELECTRODES
-# OF ELECTRODES = OF I/O

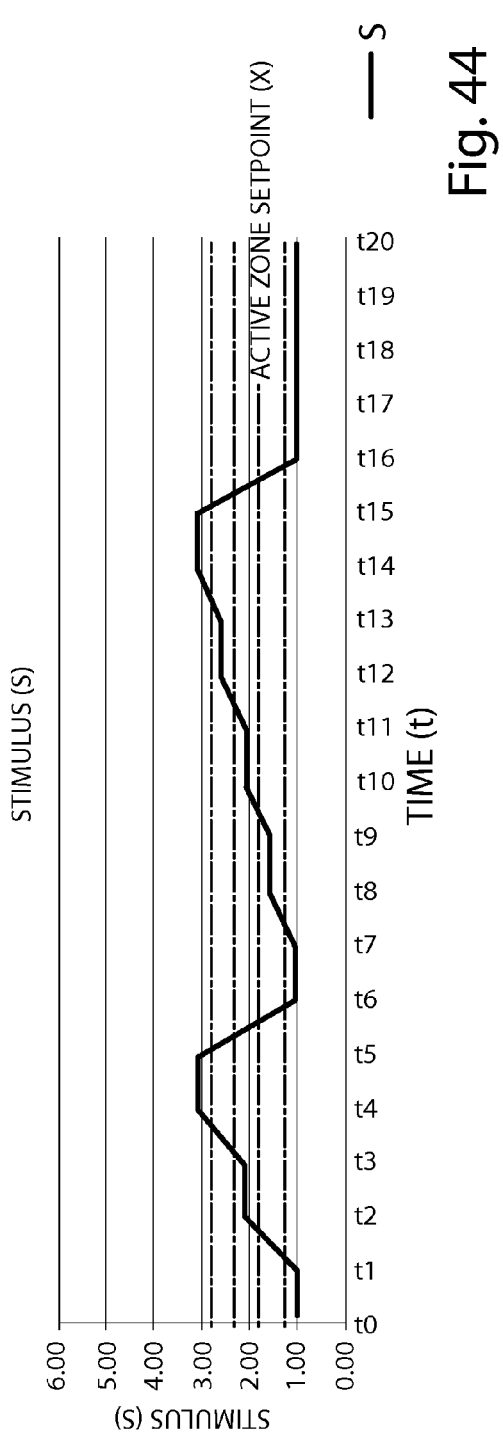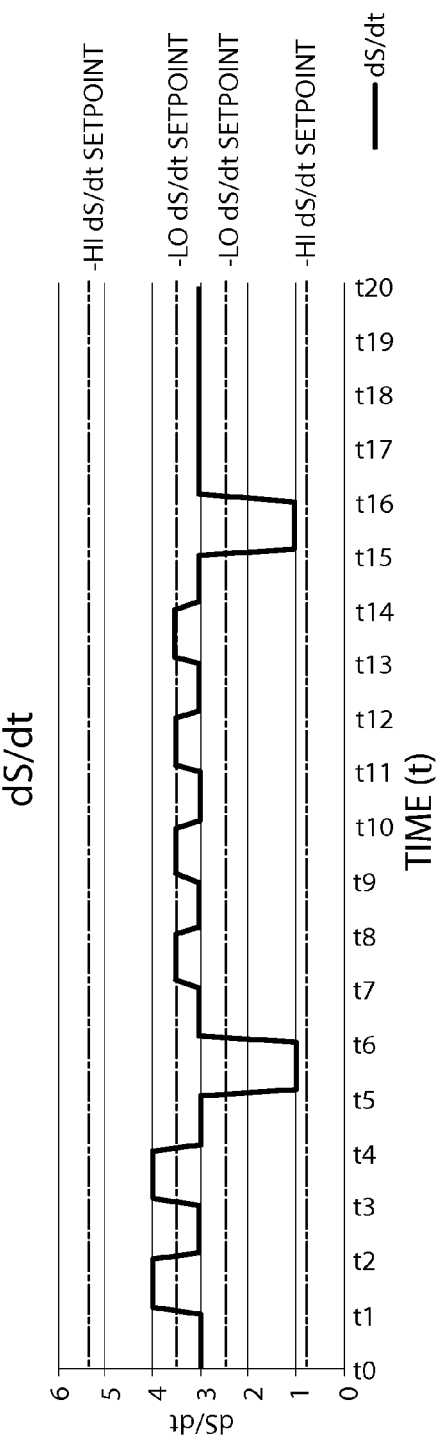

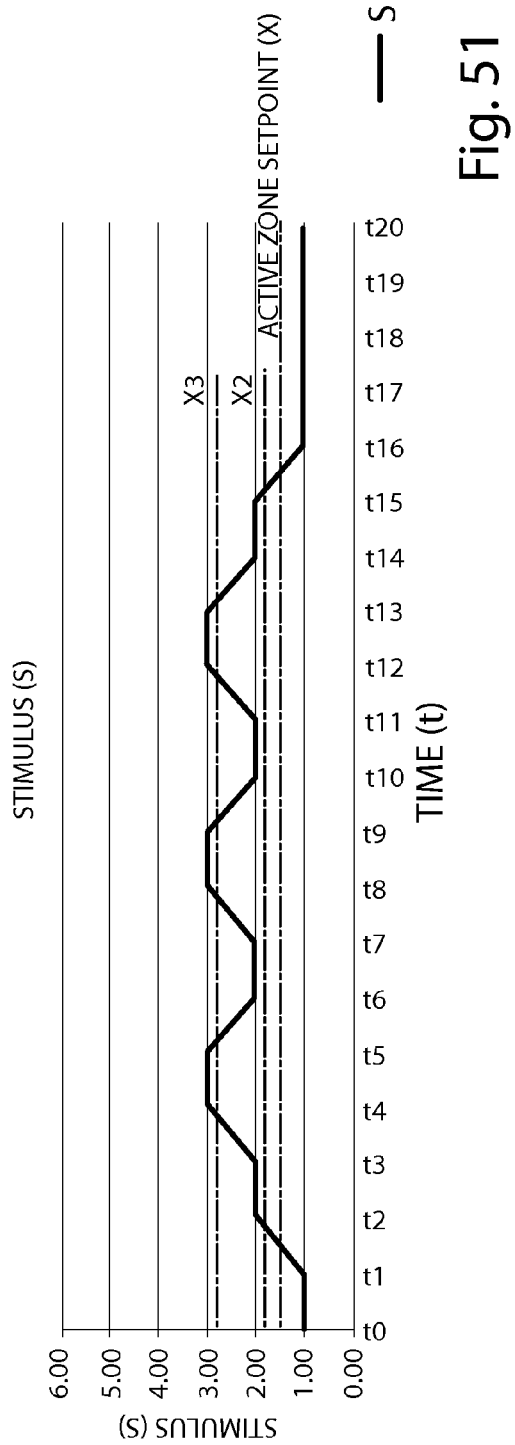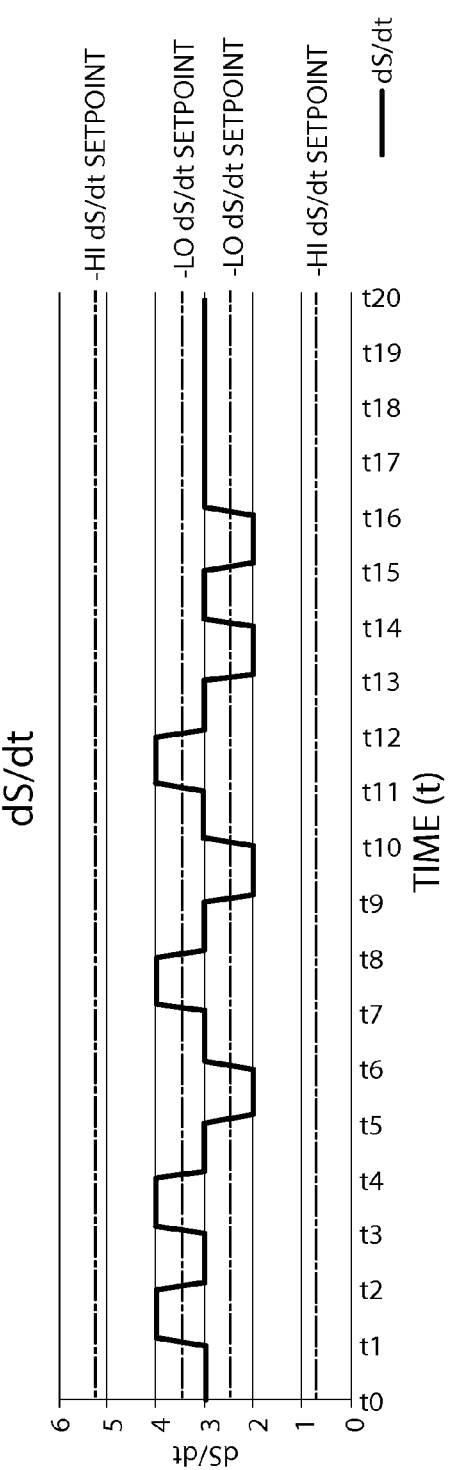

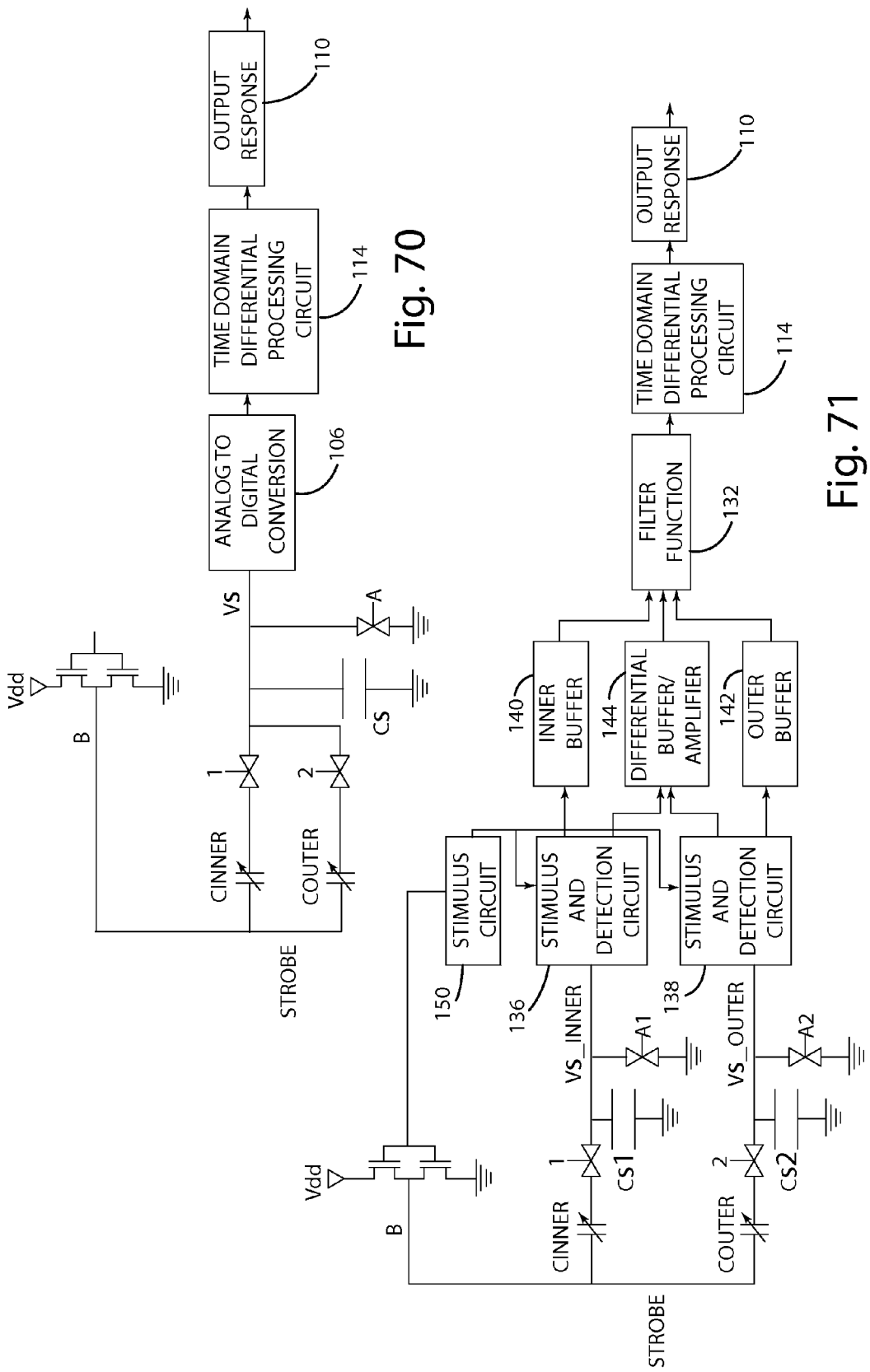

FLEXIBLE SUBSTRATE

RIGID SUBSTRATE

FLEXIBLE SUBSTRATE

RIGID SUBSTRATE

TOUCH #1 - PROXIMITY POINT (ZONE)
TOUCH #2 - TOUCH SURFACE
TOUCH #3 - MECHANICAL DEFLECTION

CAN BE EXTENDED TO NORMAL GRAPHICS NON-TRANSPARENT TOUCH INPUT APPLICATIONS

TOUCH #1 - PROXIMITY POINT (ZONE)
TOUCH #2 - TOUCH SURFACE
TOUCH #3 - MECHANICAL DEFLECTION

CAN BE EXTENDED TO NORMAL GRAPHICS NON-TRANSPARENT TOUCH INPUT APPLICATIONS

"THREE TOUCH" MOUSE GESTURE DEVICE

FLEXIBLE SUBSTRATE

BIASED ELECTRODE    RIGID SUBSTRATE

FLEXIBLE SUBSTRATE

BIASED ELECTRODE    RIGID SUBSTRATE

TOUCH #1 - PROXIMITY POINT (ZONE)
TOUCH #2 - TOUCH SURFACE
TOUCH #3 - MECHANICAL DEFLECTION
CAN BE EXTENDED TO NORMAL GRAPHICS NON-TRANSPARENT TOUCH INPUT APPLICATIONS
"THREE TOUCH" MOUSE GESTURE DEVICE

TOUCH #1 - PROXIMITY POINT (ZONE)
TOUCH #2 - TOUCH SURFACE
TOUCH #3 - MECHANICAL DEFLECTION

CAN BE EXTENDED TO NORMAL GRAPHICS NON-TRANSPARENT TOUCH INPUT APPLICATIONS

"THREE TOUCH" MOUSE GESTURE DEVICE

COMBINED TOUCH AND HAPTIC ELECTRIC FIELD DRIVER

COMBINED TOUCH AND HAPTIC ELECTRIC FIELD DRIVER ELECTRODES

TOUCH #1 - PROXIMITY POINT (ZONE)
TOUCH #2 - TOUCH SURFACE
TOUCH #3 - MECHANICAL DEFLECTION
CAN BE EXTENDED TO NORMAL GRAPHICS NON-TRANSPARENT TOUCH INPUT APPLICATIONS

"THREE TOUCH WITH HAPTIC MOUSE" APPLICATIONS

APPARATUS AND METHOD FOR DETERMINING A STIMULUS, INCLUDING A TOUCH INPUT AND A STYLUS INPUT

FIELD OF THE INVENTION

The present invention relates to an apparatus and method for detecting a stimulus, and more particularly, an apparatus and method for detecting a touch input and a stylus input.

BACKGROUND OF THE INVENTION

There exist numerous Human Machine Interface (HMI) devices designed to sense the presence of human touch today. In some cases these HMI interfaces include a stylus that is used to provide input from the human to the machine interface. A stylus may completely replace the direct human interface or may supplement the human interface. These HMI devices may use light, sound, mechanical-electro (switches) magnetic fields, electric fields, electromagnetic fields, or a combination of these stimuli.

Three prior and current touch technologies that exist today and that use electric fields are commonly referred to as projected capacitance, capacitive, and differential sensing. Projected capacitance is commonly associated with transparent touch screens that are used in conjunction with displays of the same approximate size and are assembled with such displays in a manner as to allow the light from the display to pass through the sensing elements of the projected capacitance touch screen sensing elements. Projected capacitance is usually implemented with high resolution capabilities where the selection of an area of touch can be much smaller than the actual size of a finger. Projected capacitance is widely used on personal electronic devices such as cell phones, personal digital assistants (PDAs), smart phones, notebooks, laptop computers, laptop monitors, and other user devices that have displays. Capacitance sensing, as opposed to projected capacitance, is usually applied in applications where singular inputs are processed that generally respond to much lower resolution than projected capacitance, such as buttons or low resolution sliders. These lower resolution input sensing applications use electrode structures that are designed to respond to a finger sized input. Nonetheless, capacitance sensing can be used in place of projected capacitance, and in principle projected capacitance is a subset implementation of capacitance in general. Differential sensing technology uses electric fields, low impedance sensing techniques, and unique sensing electrodes that in conjunction with specific electronic sensing circuits allow for the accurate, robust sensing of human touch without the use of software.

Capacitance, projected capacitance, and differential sensing have at least two common attributes: 1) they all use electric fields as the stimulus for measuring the human machine interaction and 2) they rely on a predetermined threshold that is determined by the engineer which corresponds to a touch when a certain stimulus change has occurred due to human machine interaction.

FIGS. 1 and 2 illustrate basic single input sensor configurations for using multiple electrode and single electrode capacitance sensing. FIG. 2 illustrates a simple capacitance sensor with a single electrode 100 for sensing through a dielectric substrate 102. The touch stimuli would be inserted on the opposite side of the dielectric 102 of which the single electrode 100 is located. FIG. 1 illustrates a multiple electrode capacitive sensor having a dielectric substrate 102 and at least two electrodes 100, 104. Similarly to FIG. 2, the touch stimulus would be inserted on the opposite side of the dielectric 102 of which the multiple electrodes 100, 104 are located. These capacitance sensing techniques related to the structures in FIGS. 1 and 2 above sense changes in capacitance from single or multiple electrodes in such a manner that after the stimuli signal is processed there will be an output signal that will change as a finger or stylus approaches the sensing electrode(s). The output signal is processed in such a way that when a certain value is reached (predetermined threshold) a touch response will occur. This predetermined threshold would correspond to a touch position located with a touch zone above the touch surface. Changes—affected by manufacturing tolerances, the dielectric constant, the dielectric thickness, the electrode area, and the electronic sensing circuit variances—will cause the actual touch location above the sensor electrode(s) to also vary.

Refer to FIGS. 3 through 7. FIG. 3 illustrates an electrical schematic and block diagram of a single electrode capacitance sensor as illustrated in FIG. 2 and timing diagrams illustrated in FIGS. 4 through 7, a basic technique for detecting and processing a touch input utilizing a single electrode. Ce represents the effective net capacitance of a single electrode sensing element, illustrated in FIG. 2. Ce will change depending on the capacitance present, i.e. with "no touch" Ce will have lower value of capacitance than when a "touch" is present in which case Ce will have a higher value of capacitance. Cs represents a sampling capacitor for the Analog to Digital Converter 106, Pre-Determined Threshold Circuitry 108, and Output Response 110. Control devices A, B, and C represent electronic switches where when they are turned on will be in minimal resistance mode (ideally, zero ohms) and when off are in high resistance mode (ideally, infinite resistance).

FIGS. 4, 5, 6, and 7 are timing diagrams used to describe the basic operation of a sensing technique for sensing a touch input using a single electrode Ce. FIG. 4 illustrates the timing diagram for a control signal for control device A. When the control signal is at a value of 3.00 the control device is on and when the control signal is at a value 0.00 the control device is off. The same hold trues also for control signals for control devices B and C in FIGS. 5 and 6. At time t1 in FIG. 6 control signal C goes high causing control device to turn on connecting Ce to Cs. Also at time t1 control signals A and B are low as indicated turning off control devices A and B. At time t2 control device A is turned on discharging any charge that is present on Ce and Cs ground as indicated by the voltages Vs dropping to 0.00 from a voltage value of 1.00 in FIG. 7. At time t3 control device A is turned off. At time t4 control device C is turned off isolating Ce from Cs. At time t5 control device B is turned on charging sampling capacitor Cs to Vdd. FIG. 7 illustrates the voltage Vs charging from a value of 0.00 to a Vdd value of 3.00. At time t7 control device C is turned on connecting Cs to Ce causing the charge on Cs to redistribute to both Cs and Ce and therefore the voltage Vs to drop proportional to the amount of capacitance on Ce. The capacitance of Cs is constant. The lower voltage will drop according to the below equation:

$$Vs = Vdd * (Cs/(Cs+Ce))$$

At time t7 the "no touch" value of 1.00 is illustrated in FIG. 7. If there were a touch event, the capacitance Ce would be at higher value than the "no touch" capacitance value. Based on the above stated equation, Vs is shown as a lower value of 0.500 in FIG. 7. At time t8 the control device C is turned off disconnecting the sensor capacitor Ce from the sample capacitor Cs. The value of Vs would remain at the sampled value that is proportional to the touch condition, a higher value for "no touch" condition and a lower value for the "touch" condition.

An alternative capacitance detecting technique utilizing multiple electrodes is described here. Refer to FIGS. 1, 8 through 12. FIG. 8 illustrates an electrical schematic and block diagram of a multiple electrode capacitance sensor as illustrated in FIG. 1, and timing diagrams illustrated in FIGS. 9 through 12, a basic technique for detecting and processing a touch input utilizing a multiple electrodes. Ce represents an effective net capacitance for a multiple (two) electrode sensing element, illustrated in FIG. 1. Ce will change depending on the capacitance present, i.e. with "no touch" Ce will have higher value of capacitance and when "touch" is present Ce will have a lower value of capacitance. Cs represents a sampling capacitor for the Analog to Digital Converter. Control devices A and C represent electronic switches where when they are turned on will be in minimal resistance mode (ideally, zero ohms) and when off are in high resistance mode (ideally, infinite resistance). Control device B is represented as a MOSFet circuit for generating a drive signal on the output of control device B. FIGS. 9, 10, 11, and 12 are timing diagrams used to describe the basic operation of a sensing technique for sensing a touch input using a multiple electrode capacitance sensor Ce. FIG. 11 illustrates the timing diagram for a control signal for control device C. When the control signal is at a value of 3.00 the control device is on and when the control signal is at a value 0.00 the control device is off. The same hold trues also for the control signal for control device A in FIG. 9. FIG. 10 illustrates the timing diagram for the output drive signal B which varies from a value of 0.00 to a value of 3.00.

At time t1 in FIG. 11 control signal C goes high causing control device C to turn on connecting Ce to Cs. Also at time t1 control signal A is low turning off control device A and output B is low, both states shown in FIGS. 11 and 10 respectively. At time t2 control device A is turned on discharging any charge that might be stored on Ce and Cs to ground as indicated by the voltage Vs dropping to 0.00 from a voltage value of 1.00 in FIG. 12. At time t3 control device A is turned off. At time t4 output device B is turned on causing the voltage applied to sensor electrode structure from a value of 0.00 to 3.00. The voltage stimulus will cause the value of Vs to rise to a value that is proportional to the capacitance of Ce as shown by the voltage rising from 0.00 at to a value of 1.00 for a "no touch" condition. If there were a finger/appendage or other touch input device to approach or come into contact with the touch surface, then the capacitance of Ce would be at a lower effective capacitance for a "touch condition" causing the voltage to be at Vs to settle at a lower value as indicated by the value of 0.500 at the "touch condition". Both of these conditions are illustrated in FIG. 12. At time t5 control device C is turned off isolating Ce from Cs. At time t6 output device B goes low removing stimulus from the electrode structure Ce. The capacitance of Cs is constant. The lower voltage will drop according to the below equation:

$$Vs = Vdd*(Ce/(Cs+Ce)).$$

At time t6 the "no touch" value of 1.00 is illustrated in FIG. 12. If there were a touch event, the capacitance Ce would be at higher value than the "no touch" capacitance value. Based on the above stated equation, Vs is shown as a lower value of 0.500 in FIG. 12 capacitor Ce from the sample capacitor Cs. The value of Vs would remain at the Vs value that is proportional to the touch condition, a higher value for "no touch" condition and a lower value for the "touch" condition. One useful attribute of this dual electrode sensing technique is that if water were to lie on the touch surface of the touch sensor structure, Ce would essentially go up in value, then causing Vs to increase in value. This is useful in that the Vs moves in the opposite direction for water as compared to a normal touch event. This information is very useful in inherently discriminating against false touch events do to water laying on the touch surface.

In both cases above, whether single electrode or dual electrodes, the analog to digital converter 106 would convert the value of value of Vs to a digital value that can be processed by the Predetermined Threshold Processing Circuit 108. Two examples of how a Predetermined Threshold Value would be determined might be: 1) the Predetermined Threshold Value equals a Voltage value where when Vs is equal to or less than that that same said Voltage value then there is a valid touch event, i.e. valid touch event is present when V (sample)<=Vp (predetermined threshold value), or 2) the Predetermined Threshold Value equals a Voltage value where when difference between the "no-touch" Vs value and the Vs is equal to or greater than that same said Voltage value then there is a valid touch event, i.e. a valid touch event is present when [(the value of a the "no touch" voltage)–(Vs)] >=V (predetermined threshold value). Threshold Processing Circuitry 108 will take the digital representation of the Vs and the Threshold Processing Circuitry 108 will then, using Predetermined Threshold Value processes similar to that described above, process and decide if there is a valid touch event to be processed by the Output Response circuit 110 for proper interfacing to the outside world. The value for the Predetermined Threshold Value must be determined by the designer of the application of capacitance or field effect sensor. The Predetermined Threshold Value is a value that ultimately is compared to a sampled value that is proportional to the touch stimulus that is then interpreted as a touch event. There are numerous techniques that have been developed that would use this method of using a Predetermined Threshold Value. Even differential sensing techniques using multiple sensing electrodes require that the value sensed on one set of electrodes have some value relative to other sets of electrodes, e.g. as an example in a differential two electrode sensing structure both electrodes may need to be equal to each other in order for there to be a touch event and one of the electrodes may need to be less than the other for there to not be a touch event (logically NOT touch). Regardless of the technique, when using Predetermined Threshold techniques, there are other variables that can ultimately affect the value of sampled voltages such as Vs in FIGS. 7 and 12, other than the "no touch" or "touch" events. Changes in the dielectric constant of the touch substrate, effective variances in sensor pad area, variances in area of finger coupling to the sensor structure, variances based on tolerances of glass substrate, the variance in the sampling circuitry, temperature, moisture, etc. can all lead to false or under/over sensitive touch sensing response. FIGS. 1 and 2 illustrates the location above the touch surface that corresponds to the Predetermined Threshold Value such as to take into account the variability of other factors that could influence the touch sensitivity or "touch feel". If the designer had to account for the use of gloves on a finger/appendage or other touch input device, then the location above the touch surface that would correspond to the Predetermined Threshold Value would have to be a greater distance to accommodate the thickness of the glove insulation. Of course when finger/appendage or other touch input device were to approach the touch surface, the Predetermined Threshold Processing Circuit 108 would register a valid touch event even though the finger/appendage or other touch input device would not actually be touching the touch surface. The corresponding location of the Predetermined Threshold Value could be right at the touch surface. In this case the designer would be taking into account the amount of signal contribution due to the flattening of the finger/appendage after initial contact to the touch surface. The stimulus signal continues to increase as the capacitive coupling of the finger to the glass increases which will causes the capacitance Ce in FIG. 3 to increase and the capacitance Ce in FIG. 8 to decrease. The designer has to take into account all variables that would affect what the Predetermined Threshold Value should be. It would be very important that after taking into account all of these variables that the Predetermined Threshold Value is not set to such a value such that when a finger/appendage or other touch input device is brought to the touch surface there would not be a valid touch event recognized. Conversely, the Predetermined Threshold Value should not be set as to cause false actuations. All of the variables above, including environmental conditions need to be taken into account to determine the proper compromise for setting the Predetermined Threshold Value.

SUMMARY OF THE INVENTION

A capacitive sensor is provided. In one embodiment, the capacitive sensor includes first and second electrodes defining a capacitive coupling and a processing unit electrically coupled to the first and second electrodes to determine the presence of a stimulus based on the rate of change of the capacitive coupling. The processing unit is operative to determine the time rate of change in response to the capacitive coupling being greater than a predetermined threshold. A substrate is positioned adjacent the first and second electrodes, wherein the stimulus corresponds to the placement of an object against the substrate.

In another embodiment, the capacitive sensor includes an inner electrode and an outer electrode. The inner and outer electrodes are substantially coplanar, and the outer electrode substantially encompasses the inner electrode, being spaced apart from the inner electrode. The inner electrode optionally defines spaced apart segments, and the outer electrode is optionally interposed between the spaced apart segments of the inner electrode. The processing unit is operable to determine a rate of change of the capacitive coupling between the inner and outer electrodes in response to a stimulus, e.g., an object proximate the capacitive sensor.

In still another embodiment, the capacitive sensor includes a rigid substrate for supporting first and second coplanar electrodes thereon, and includes a flexible substrate supported above the first and second electrodes by a plurality of spacers. The flexible substrate is flexible downwardly toward the inner and outer electrodes in response to a touch input on a portion of the flexible substrate distal from the first and second electrodes. A processing unit is operable to determine a rate of change of the capacitive coupling between the first and second electrodes in response to the touch input against the flexible substrate.

In yet another embodiment, the capacitive sensor includes a strobe electrode spaced apart from the first and second electrodes. The strobe electrode is generally planar and is coextensive with the first and second electrodes to define first and second capacitive couplings, respectively. A rigid substrate is interposed between the strobe electrode and the first and second electrodes. The processing unit is operable to determine the rate of change of the first and second capacitive couplings to indicate a touch input, optionally in response to the first and second capacitive couplings exceeding a predetermined threshold value.

In even another embodiment, the capacitive sensor include a plurality of electrode rows extending in a first direction, and includes a plurality of electrode columns extending in a second direction transverse to the first direction. The plurality of electrode rows and the plurality of electrode columns are in substantially non-overlapping alignment. In other embodiments, the electrode columns are in overlapping alignment with the electrode rows. The processing unit is operable to determine a rate of change of the capacitance of the plurality of electrode rows and a rate of change of the capacitance of the plurality of electrode columns to indicate the presence of a stimulus in two dimensions. Adjacent electrode rows optionally form a capacitive coupling, wherein the processing unit is further adapted to measure a rate of change of the capacitive coupling. In addition, adjacent electrode columns optionally form a capacitive coupling, wherein the processing unit is further adapted to measure a rate of change of the capacitive coupling.

These and other features and advantages of the present invention will become apparent from the following description of the invention, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 1 is an illustration of a touch sensor including multiple electrodes for differential sensing techniques;

FIG. 2 is an illustration of a touch sensor including a single electrode for capacitive sensing techniques;

FIG. 3 is a circuit diagram corresponding to the single electrode touch sensor illustrated in FIG. 2;

FIG. 4 is a first timing diagram for the circuit of FIG. 3;

FIG. 5 is a second timing diagram for the circuit of FIG. 3;

FIG. 6 is a third timing diagram for the circuit of FIG. 3;

FIG. 7 is a fourth timing diagram for the circuit of FIG. 3;

FIG. 9 is a first timing diagram for the circuit of FIG. 8;

FIG. 10 is a second timing diagram for the circuit of FIG. 8;

FIG. 11 is a third timing diagram for the circuit of FIG. 8;

FIG. 12 is a fourth timing diagram for the circuit of FIG. 8;

FIG. 13 is an illustration of a touch sensor including an active zone for determining proximity to a single electrode;

FIG. 14 is an illustration of a touch sensor including multiple electrodes for time domain differential sensing;

FIG. 15 is an illustration of a touch sensor including a single electrode for time domain differential sensing;

FIG. 44 is a graph illustrating stimulus versus time for the touch sensor illustrated in FIGS. 41-43;

FIG. 45 is a graph illustrating rate of change of stimulus versus time for the touch sensor illustrated in FIGS. 41-43;

FIG. 51 is a first graph illustrating stimulus versus time for the touch sensor of FIGS. 49-50;

FIG. 52 is a first graph illustrating rate of change of stimulus versus time for the touch sensor of FIGS. 49-50;

FIG. 70 is a circuit diagram of the touch sensor illustrated in FIG. 69 and including a time differential processing circuit;

FIG. 71 is a circuit diagram of the touch sensor illustrated in FIG. 69 and including an inner buffer and first and second stimulus and detection circuits;

FIG. 120 illustrates a finger coming to rest against the touch sensor of FIGS. 116-119;

FIG. 121 illustrates a stylus coming to rest against the touch sensor of FIGS. 116-119;

FIG. 122 illustrates the net electric field for a touch sensor including multiple electrode columns in the absence of a touch input;

FIG. 123 illustrates the net electric field for a touch sensor including multiple electrode columns and multiple electrode rows in the absence of a touch input;

FIG. 124 illustrates the net electric field for a touch sensor including multiple electrode rows in the absence of a touch input;

FIG. 125 illustrates the net electric field for a touch sensor including multiple electrode columns and multiple electrode rows from a first side view;

FIG. 126 illustrates the touch sensor of FIGS. 123 and 125 being contacted by a stylus;

FIG. 127 illustrates the touch sensor of FIGS. 123 and 125 being deflected downwardly by a stylus;

FIG. 128 illustrates the touch sensor of FIGS. 123 and 125 being contacted by a finger;

FIG. 129 illustrates the touch sensor of FIGS. 123 and 125 being deflected downwardly by a finger;

FIG. 130 illustrates a light sensor array to determine the position of an object above touch pads in accordance with embodiments of the present invention;

FIG. 131 illustrates a light sensor matrix to determine the position of an object above a touch sensor in accordance with embodiments of the present invention; and FIG. 132 illustrates the location of a fingertip in three dimensions relative to the touch sensor of FIG. 131.

DETAILED DESCRIPTION OF THE CURRENT EMBODIMENTS

The invention as contemplated and disclosed herein includes systems and methods for detecting one or more touch inputs. The systems and methods include monitoring a rate of change of capacitance to determine when an object comes to rest against a substrate. Part I includes an overview of time domain differential sensing techniques. Part II relates to single electrode and multiple electrode touch sensors employing time domain differential sensing techniques. Part III relates to matrix electrode touch sensors employing time domain differential sensing techniques. Lastly, Part IV relates to time domain differential sensing in light sensors, optionally for use in conjunction with the touch sensors discussed in Parts II-III.

I. Overview of Time Doman Differential Sensing

International Patent Application WO2010/111362 to Caldwell et al, filed Mar. 24, 2010, the disclosure of which is incorporated by reference in its entirety, describes many deficiencies and limitations associated with projected capacitance, capacitive, and differential sensing, as well as techniques for overcoming such deficiencies and limitations. These very techniques when properly applied can yield more opportunities for greater performance and additional features than can be achieved from existing capacitance and field effect sensing techniques that are based solely on predetermined threshold values.

Figure 8:
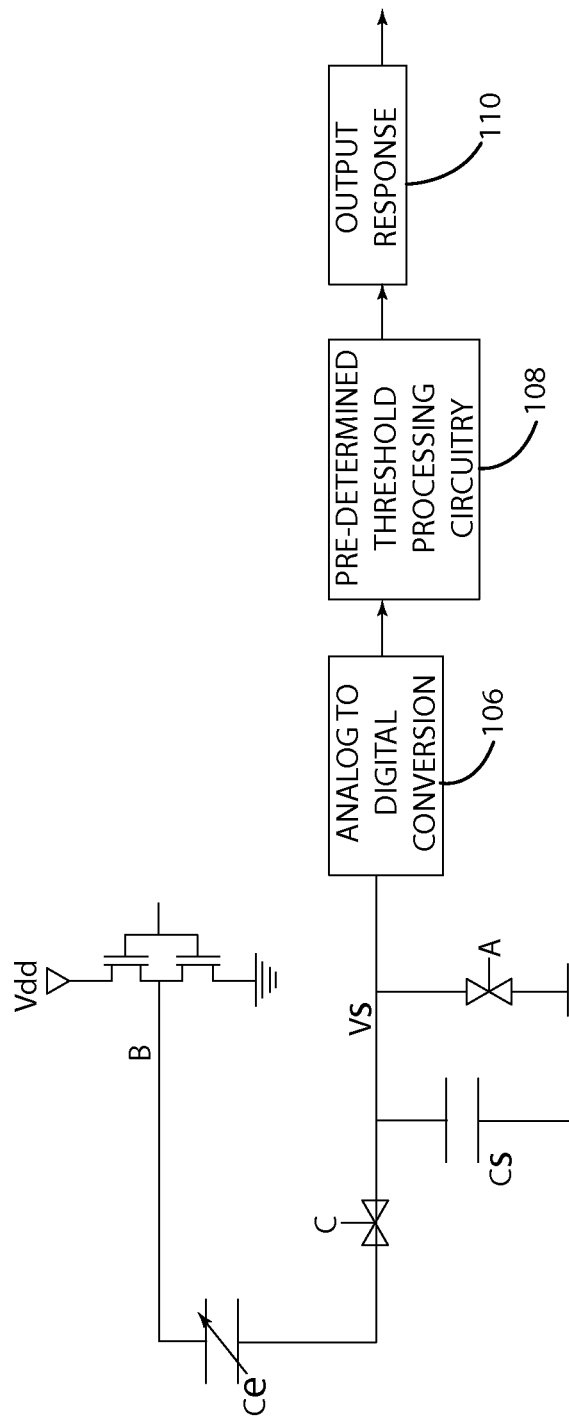
FIG. 8 is a circuit diagram corresponding to the multiple electrode touch sensor illustrated in FIG. 1.

In particular, International Patent Application WO2010/111362 describes using a single electrode and "Time Domain Differential" sensing techniques to achieve more reliable touch sensing by actually sensing the "signature of a touch". The Time Domain Differential sensing techniques can initially use the same techniques as described for detecting the touch signal Vs in FIG. 3 (and for that matter, Vs in FIG. 8 when using a multi-electrode sensor). The basic description of a touch by a human as it moves towards a surface above a given singular electrode that stops the finger and therefore physically limits the finger approach to the sensing electrode and therefore limits the amount of stimulus that can be sensed by the sensing electrode. The signature of a touch event caused by a human finger is then defined by first determining if the finger is in proximity of the sensing electrode by approaching with the Active Zone shown in FIG. 13 where the stimulus (s) would be greater than a loosely set value of x. Once it is determined that the finger is within proximity to the sensing electrode and is within the Active Zone as indicated by s>x, then the rate of change of stimulus with respect to time (ds/dt) is determined and analyzed. The rate of change of stimulus is described as a stimulus change caused by a human finger approaching the touch surface/fascia over a corresponding sensing electrode or electrodes with respect to time.

There are numerous techniques for generating and sensing the stimulus used in detecting a touch such as described earlier, including both self-capacitance techniques involving a single electrode and mutual-capacitance techniques involving two or more electrodes. Even though depending on the technique used to generate and detect a stimulus based on a touch input can cause the stimulus to increase or decrease as the touch input approaches the touch surface, let us assume the stimulus increases as a finger or other appendage/device approaches a touch surface interface (this may happen naturally, based on the sensing technique, or can be formatted by inversion, etc), whether a single or multi-electrode sensor. Therefore the basic definition of a touch signature, processed with analog/digital hardware or software, or a combination of both would be defined by the basic logical sequence of events of: 1) if the stimulus (s) changes and is detected, based on the finger/appendage or other touch input device in close proximity to the sensing electrode, is greater than some value (s>x) followed by; 2) the stimulus rate of change with respect to time (ds/dt), based on the finger moving towards the touch sensing electrode, is greater than zero (ds/dt>0) followed by; 3) the stimulus rate of change with respect to time, caused by the finger coming to rest above the sensing electrode being stopped by the surface fascia (ds/dt=0 or very close to 0 relative to the ds/dt when the finger is moving), then if conditions are such that event 1 is true and event 2 is true and event 3 is true, then the process will indicate there is a touch stimulus.

It should be noted that there are no absolute values that have been predetermined for the process of evaluating a touch. As an example therefore, if a glove were to be worn on the finger, adding additional layers of thickness preventing the finger from actually touching the touch surface and essentially adding distance (the distance generally based on the thickness of the glove) then as long as the stimulus is in proximity above the sensing electrodes (s>x which is condition 1 above) and when conditions 2) and 3) are met above, then a touch would be detected just as when a non-gloved finger/appendage is used. Implementing the above logical conditions results in the consistent touch "feel" sensing of a touch using gloved or non-gloved conditions. In addition should the substrate dielectric, substrate thickness, or other manufacturing tolerances cause the effective stimulus strength to vary, using the above logical sequence to detect the touch input will allow a consistent "feel" of the touch response as compared to using a predetermined threshold as used in conventional capacitance and differential sensing methods of which both use a predetermined threshold that correspond to the stimulus response and the touch signal response.

II. Single Electrode and Multi Electrode Touch Sensors

Figure 16:
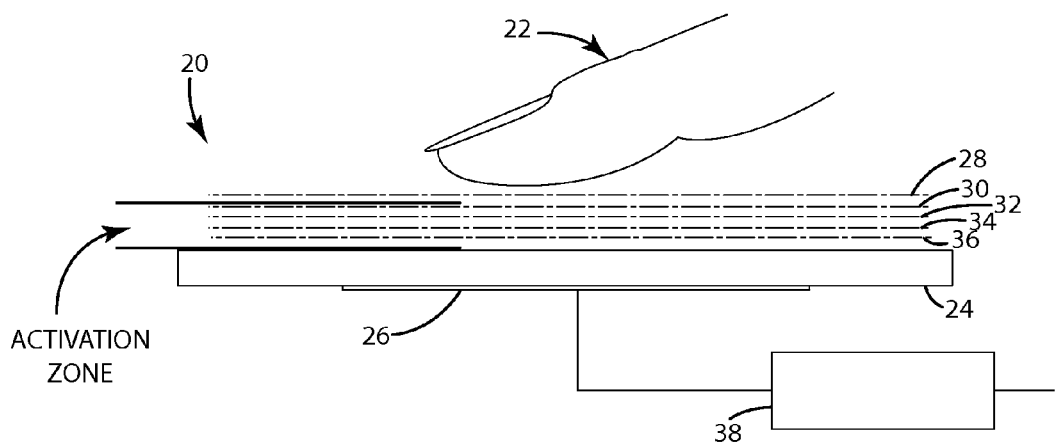
FIG. 16 is an illustration of finger approaching a touch sensor including a single electrode and an activation zone.
Figure 17:
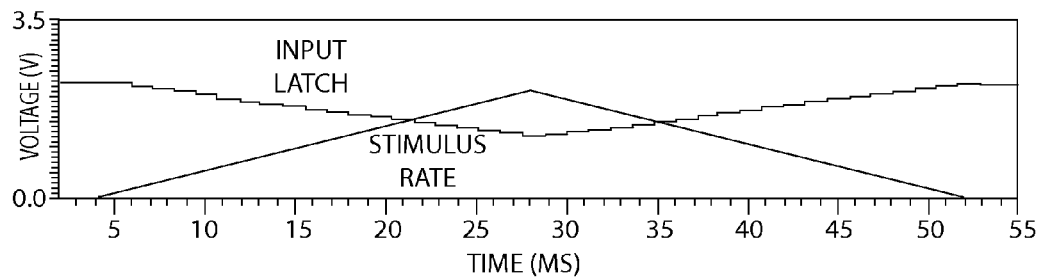
FIG. 17 is a first graph illustrating voltage versus time for the touch sensor illustrated in FIG. 16.
Figure 18:
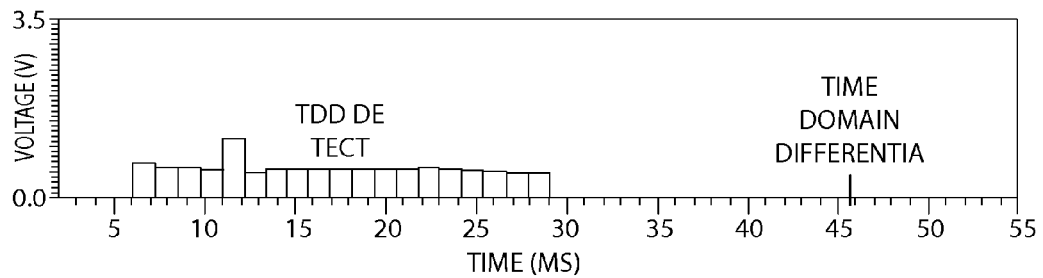
FIG. 18 is a second graph illustrating voltage versus time for the touch sensor illustrated in FIG. 16.
Figure 19:
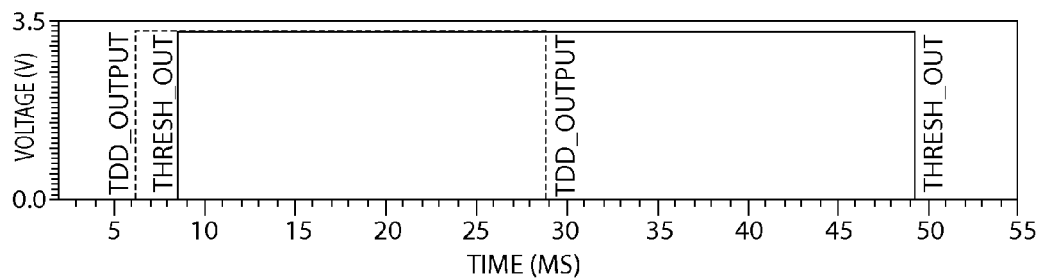
FIG. 19 is a third graph illustrating voltage versus time for the touch sensor illustrated in FIG. 16.

Time Domain Differential sensing techniques can be implemented with single and multiple electrode touch sensors. These techniques can be used to determine a touch signature using a single electrode or multiple electrodes based on s, ds, S, dS, t, dt, T, dT, ds/dt, ds/dT, dS/dt, dS/dT, where s (or S, where s<<S) represents the absolute value of the electrode capacitance and t and T are time domains, where t<<T. These techniques can also be used to determine a touch signature using two electrodes. FIG. 14 illustrates a multi-electrode sensing structure and FIGS. 13 and 15 illustrate a single-electrode structure. Regardless of the sensing technique, the stimulus response to a finger/appendage or other touch input device approaching the touch surface can be analyzed according to the principles described above. FIG. 16 is a drawing from International Patent Application WO2010/111362 which illustrates a touch input in the form of a finger as it approaches a single electrode and FIG. 17 illustrates the stimulus as well as a rate of change of that stimulus as it corresponds to the finger approaching the single electrode. The response in FIG. 17 may also illustrate the response of a multiple electrode sensor and detecting circuit. Likewise the FIGS. 18, 19, 20, and 21 could apply to a multiple electrode response.

Refer again to FIG. 13. Assume the stimulus sensing method of touch increases as the finger approaches the substrate top surface 112. The logic for detecting the touch is defined by the sequence of events based on proximity and the rate of change of stimulus with respect to time as a human finger approaches the defined touch surface 112 above a singular electrode 100 or multiple electrodes 100, 104. This definition is implemented to mimic the same response as a simple switch, but as applied to touch sensing. In actuality the signature for touch could be redefined. For instance, a simple example would be the signature that is defined above with the addition of new condition where a $4^{th}$ condition needs to be followed by a negative ds/dt. If the first three sequences are met then the condition ds/dt<0 will be a terminating condition (the finger needs to be removed sometime which will result in a ds/dt<0).

Assuming s increases as a finger moves towards the touch surface 112 and s represents the touch stimulus, then for a "Conventional touch" the sequence for processing a touch would be as has been described above:
1) If s>x (proximity threshold)
   and
2) ds/dt>0, followed by
3) ds/dt=0, then
4) touch is detected Adding the new condition where the ds/dt<0 is required to for a touch to be detected which we might call "touch on release", then the following sequence would be as follows:
1) If s>x (proximity threshold)
   and
2) ds/dt>0, followed by
3) ds/dt=0, followed by
4) ds/dt<0, then
5) touch is detected The first step above may not be needed, depending on the stimulus detecting technique. In the above described logical sequence of conditions, the first step serves as a gatekeeper to the recognition for touch. Using less robust sensing techniques in order for the steps 2 through 5 to be completed the stimulus needs to meet a level of signal strength to be valid. This eliminates the processing of signals and noise that may not be a valid touch stimulus. Other means may be used to discern valid stimulus strength and presence. One example would be the use of multiple electrode structures and associated stimulus sensing techniques for differential sensing which would tend to reduce or reject common mode noise. Eliminating or reducing the noise signature might allow the elimination of Step 1 in the both logical sequences described above.

Note that regardless of whether using a single or multi electrode pad design, by changing only the definition of the touch signature (by adding step condition 4) the touch response would be different. Note also that by adding step 4 above did not involve changing a predetermined threshold. Also note that the logic for determining the touch response is embedded in the definition of the touch sensing inherently. In existing capacitance, projected capacitance, and differential sensing techniques, the first response would be the detection of s>x as the touch response without regard to the ds/dt and related sequences. In the case where the touch response is dependent on a predetermined threshold the result would be regarded as a proximity effect which is the first step in the above examples. As an example of the effect on the sensing, a bare finger and a gloved finger would react equally once s>x, especially for a "conventional touch". "Touch on release" using conventional capacitance, projected capacitance, and differential sensing techniques would be implemented by adding an additional step to the "s>0" step, where the stimulus inserted by the finger would drop below some value (s<x2 or s<x). Of course, similar to the condition when s>x the "touch on release" using conventional capacitance, projected capacitance, and differential sensing techniques would have similar responses regarding a bare finger as compared to gloved finger as in either case the finger is moved from the sensor surface. Comparative sequences for capacitance, projected capacitance, and differential sensing techniques might look as follows.

Assuming s increases as a finger moves towards a touch surface and s represents the touch stimulus, then for a "Conventional touch" using conventional capacitance, projected capacitance, and differential sensing techniques generally would be as described above:
1) If s>x (proximity threshold), then
2) touch is detected.

Adding the new condition where the s<x is required for a touch to be detected using capacitance, projected capacitance, and differential sensing techniques which we might call "touch on release", then the following sequence would be as follows:
6) If s>x (proximity threshold), followed by
7) s<x (or x2), then
8) touch is detected Note again, in the above described sequences there is not a condition dependent on the use of ds/dt.

One potential additional distinction of time domain differential sensing as compared to conventional capacitance systems is that time domain differential can use faster sample rates as compared to conventional capacitance. Capacitance measuring techniques are not inherently dependent on time. As long as the stimulus exceeds a predetermined threshold level (s>x) and the sensing interface is capable of measuring this change in the stimulus, then in principle the interface needs to only take simply two samples. As an example, for the perception to a user that a touch system will respond instantly, a touch interface system would need to respond around 30 milliseconds. Based on sampling theorem, the system would have to sample at twice the frequency of the response required which would mean that the sensing interface would have to respond to a touch stimulus in 15 milliseconds. A conventional capacitance system would have to measure the stimulus or a change in stimulus, compare that stimulus or change of stimulus (therefore s=stimulus or change in stimulus) to a threshold value (s>x, assuming s increases as the finger moves towards the touch surface), if this comparison to x is true within 15 milliseconds, then the response will only require one sample in 15 milliseconds and at most 2 samples in 30 milliseconds. This is quite doable in a variety of ways.

In comparison, time domain differential sensing techniques use multiple measurements in the same time domain of 15 ms to calculate the number of ds/dt values as needed to analyze the proper sequence that defines the touch detection. Time domain differential sensing can require measuring the stimulus s many times in the same time domain (30 milliseconds, see FIG. 18) in order to capture the conditions ds/dt>0, ds/dt=0, ds/dt>0, etc. Therefore the time domain differential will typically, though not always, use higher sampling rates. This additional processing speed may necessitate additional electronic circuitry or more processing speed in a microprocessor or both as compared to a typical capacitance touch sensor. Again, time domain differential sensing does not depend on a precise predetermined threshold value to detect a touch and relies on the evaluation of ds/dt as part of the decision process for determining whether a touch is present or not unlike capacitance or differential which predominately make its decision on a predetermined threshold value.

Figure 23:
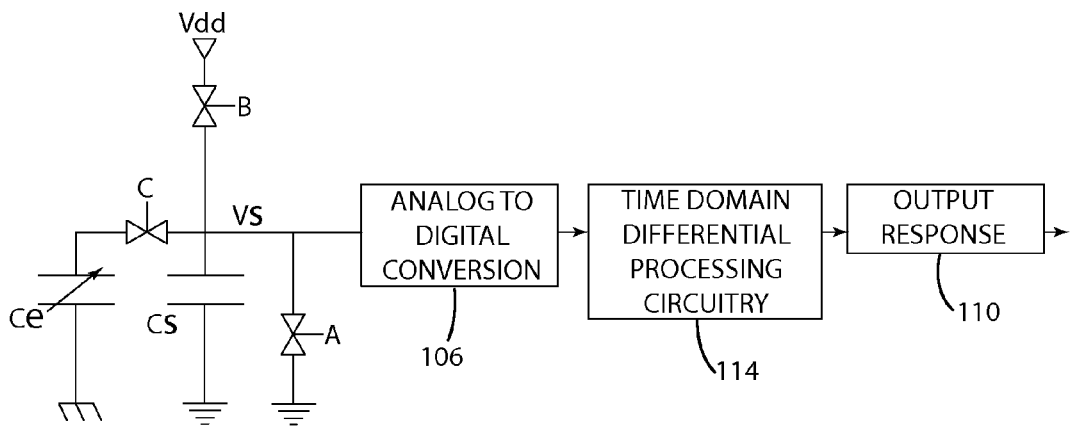
FIG. 23 is a circuit diagram for a touch sensor including multiple electrodes and time domain differential sensing circuitry.
Figure 24:
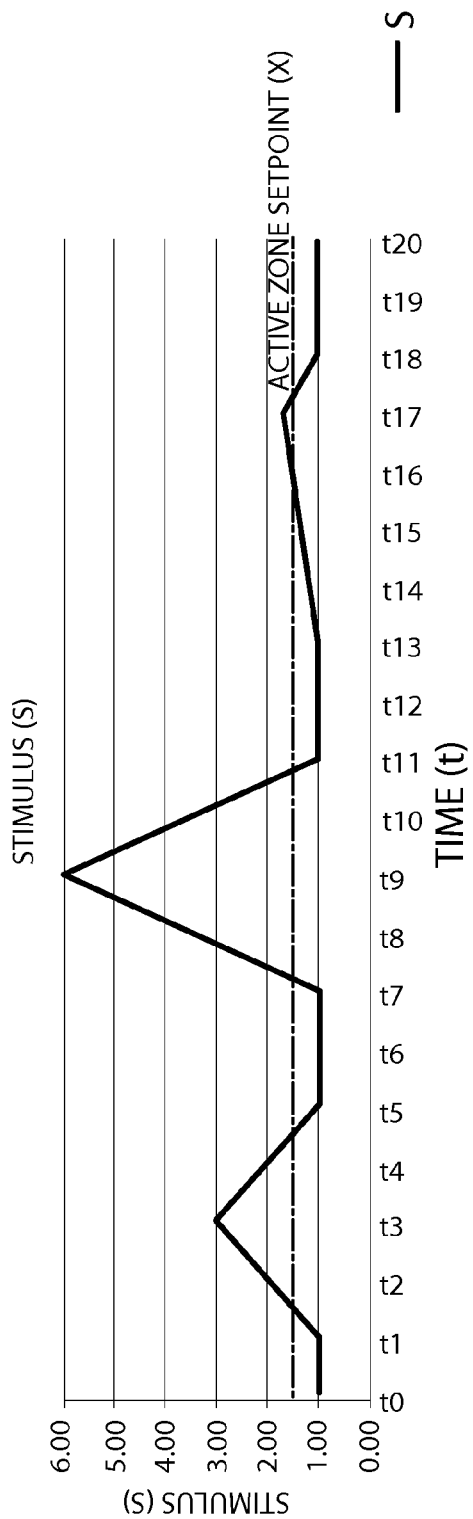
FIG. 24 is a graph illustrating stimulus versus time for the touch sensor illustrated in FIG. 23.
Figure 25:
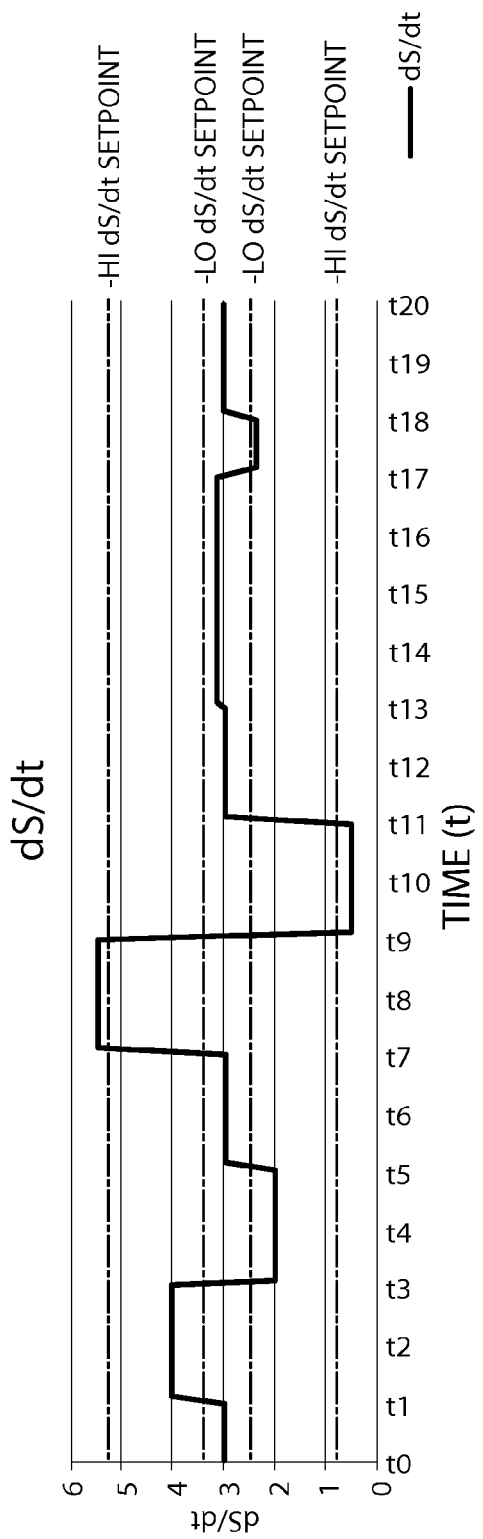
FIG. 25 is a graph illustrating rate of change of stimulus versus time for the touch sensor illustrated in FIG. 23.

Time domain differential sensing techniques initially measure the same parameters as capacitance, projected capacitance, and differential sensing techniques, including time. By using time domain differential sensing techniques and the other parameters that are available (such as s and time) new sensing features that were otherwise unavailable when using conventional capacitance sensing interfaces become available. These other parameters become very useful when the time domain differential interface determines if there is a touch and then uses these parameters. Interesting possibilities arise when a time domain differential interface can evaluate the values of s and time after a touch is detected. The possibilities of multiple touch points or gestures over a single touch surface become possible utilizing a time domain differential interface. As an example if the following sequence were to be allowed to be met by changing the physical structure of a touch input then there could be at least two touch conditions:

1) If s>x (proximity threshold)
   and
2) ds/dt>0, followed by
3) ds/dt=0, then
5) touch #1
   and if followed by
6) ds/dt>0, followed by
7) ds/dt=0, then
8) touch #2 is detected FIG. 13 illustrates a basic single electrode touch sensor with an Active Zone where the basic time domain differential logic can be applied to in which a simple switch function could be replaced. FIG. 23 illustrates a touch detecting circuit, which would be the same as the detecting circuit in FIG. 3 with the exception that the Predetermined Threshold Processing Circuitry 108 is replaced with a Time Domain Differential Processing Circuitry 114, with detecting elements Cs, Ce, control devices A, B, C, and Analog to Digital Converter 106 where the output of said Analog to Digital Converter is called the Stimulis (S) and is output to the Time Domain Differential Processing Circuitry 114. The Time Domain Differential Processing Circuitry 114 can be analog, digital, or software processing, optionally substantially as set forth in International Patent Application WO2010/111362. FIGS. 24 and 25 are timing charts for S and dS/dt as they relate to the Time Domain Differential processing sequence. Assume that the value Stimulus (S) is formatted to increase in value as the touch stimulus is applied (i.e. as the finger/appendage or other touch input device approaches the touch surface). Stimulus (S) at t0 is represented as a base level of 1.00 at the "no touch" condition when a finger/appendage stimulus is far away from the touch surface. The rate of change of S relative to time at t0 (dS/dt) is represented as a base level of 3.00 at the same "no touch" condition described above. At time t1 stimulus S is detected as increasing. At time t1 the dS/dt is detected at a value which would proportional to the rate of change of S with respect to time which is in this case is a value of 4.00. The HI ds/dt reference value of 5.00 and the LO ds/dt reference value of 1.00 are used as a filter. If the touch input stimulus is affected by other factors such as electrical noise (much faster than which a touch stimulus would be) or temperature (much slower than touch stimulus would be) then the processing circuitry which can be implemented in hardware or processed in software or a combination of both can discriminate against these other factors which cannot be a touch based on the response time of the touch signature. As an example, if electrical noise were to cause the stimulus to increase at a rate that cannot be a touch input then the processing circuitry would detect this in by generating a positive high dS/dt or a negative high ds/dt value, both of which may be indicative of rate of stimulus insertion or extraction that a human could not possibly accomplish. In this case the processing circuitry or software could ignore, attenuate, interpolate, the dS/dt and/or S. In all cases the processing circuitry would not falsely indicate a touch condition. Similarly, if the rate of change of stimulus insertion S were to be too slow, the processing and/or software would ignore, attenuate, interpolate, the dS/dt and/or S. If a finger were to approach at a rate that is far slower than what a finger would normally approach the touch surface or if temperature were to cause a stimulus change that is even slower rate, the processing circuitry and/or software logic would ignore, extrapolate, etc. the dS/dt and/or S. In both cases the touch processing circuitry would not result in the interpretation of a valid touch input.

Referring to FIGS. 24 and 25 again, it can be easily be seen the information available for a valid touch. At time t0 the stimulus S is at a base value of 1.00 which corresponds to no stimulus. Also at time t0 the dS/dt is at a base value of 3.00 which corresponds to no rate of change of Stimulus S with respect to time t. At time t1 the stimulus S starts to increase as shown in FIG. 24 and simultaneously the rate of change of stimulus S with respect with time t (dS/dt) is a value of 4.00 (a rate dS/dt of 1.00 which is added to the base value of 3.00 which will yield a net value of 4.00). The stimulus continues to increase until the finger/appendage comes into contact with the surface at time t3, stopping the approach and therefore the stimulus insertion. If the finger/appendage were to immediately, upon touching the touch surface, start to move away from the touch surface, the amount of stimulus S would start to decrease. Therefore simultaneously at time t3 the dS/dt would immediately go to a negative value. This is shown as a value of 2.00 (a rate of change of −1.00 which is added to the base of 3.00 which will yield a net value of 2.00). The stimulus S will continue to decrease as the finger/appendage moves farther from the touch surface (and therefore the sensor electrode) until the finger/appendage is far enough away from the sensor electrode such that the "no condition" of S=3.00 and the "no condition" of dS/dt=3.00 is met at time t5. If at time t3 the finger/appendage were to rest on the surface, then the stimulus value of S would stay at 3.00 but the dS/dt value at time t3 would go to zero. Of course from time t1 to time t3 the stimulus S will exceed the Active Zone set point of 1.50 between time t1 and time t2. The logic for a simple touch could therefore be:

1) If S>x (1.50) (Active Zone set point=x (1.50)) and
2) dS/dt>+Lo dS/dt (3.50) and dS/dt<+Hi dS/dt (4.50) followed by
3) ds/dt<=0, then
4) touch is detected (therefore at time t3)

The effective result of this would be that the finger/appendage would have to simply come in contact with the touch surface (whether wearing a glove or not, etc.) before a touch would be considered valid. Alternatively for a simple touch the logic for valid touch could be:

1) If S>x (1.50) (Active Zone set point=x (1.50)) and
2) dS/dt>+Lo dS/dt (3.50) and dS/dt<+Hi dS/dt (4.50) followed by
3) S<x(1.50), then
4) touch is detected (therefore at time t4.5)

The effective result of this would be that the finger/appendage would have to be pulled away far enough to be outside of the Active Zone before a touch would be considered valid. And yet another alternative for valid touch logic could be:

1) If S>x (1.50) (Active Zone set point=x (1.50)) and
2) dS/dt>+Lo dS/dt (3.50) and dS/dt<+Hi dS/dt (4.50) followed by
3) ds/dt<x(1.50), then
4) touch is detected (therefore at time t4.5)

The effective result of this would be that the finger/appendage would have to be pulled away from the touch surface to be considered be considered valid.

Figure 26:
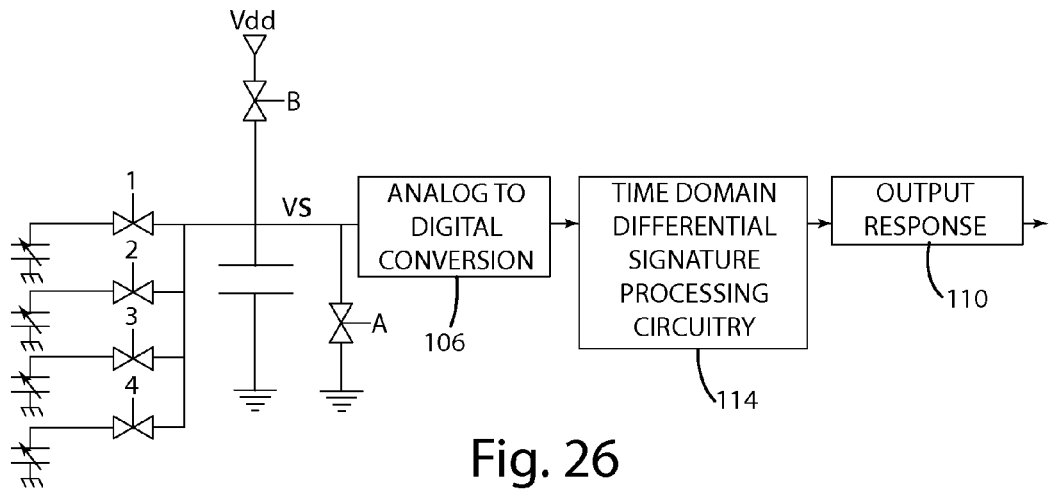
FIG. 26 is a circuit diagram for a touch sensor including four electrodes and time domain differential signature processing circuitry.
Figure 27:
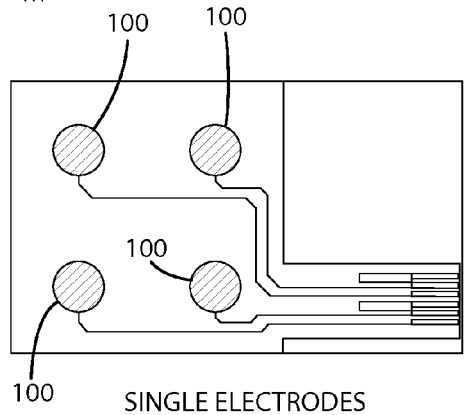
FIG. 27 is a depiction of four circular electrodes for use with the touch sensor illustrated in FIG. 26.
Figure 28:
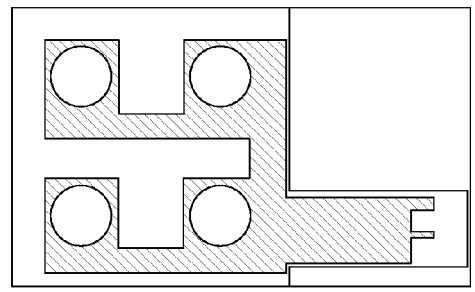
FIG. 28 is a depiction of a ground plane for use with the four circular electrodes depicted in FIG. 27 and the touch sensor illustrated in FIG. 26.

Refer to FIGS. 26, 27, and 28. FIG. 26 extends the concept of measuring a singular single sensor to multiple single sensors. Shown in FIG. 26 are a total of four single sensors depicted as Ce1, Ce2, Ce3, and Ce4, each with a control device (control devices 1, 2, 3, and 4) for connecting each single sensor to the sampling capacitor Cs. The sequence for each sensor would be the same as described above or otherwise. FIGS. 27 and 28 show a four sensor layout that would work with processing circuit shown in FIG. 26. An optional dielectric layer can be interposed between the electrodes 100 of FIG. 27 and the ground plane of FIG. 28.

Figures 29, 30:
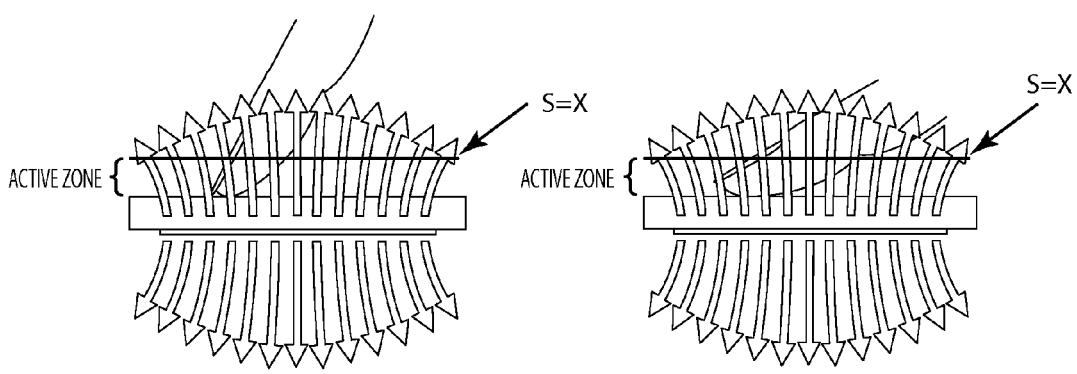
FIG. 29 is a first illustration of a finger coming to rest on a touch sensor including a single electrode.
FIG. 30 is a second illustration of a finger coming to rest on a touch sensor including a single electrode.
Figure 31:
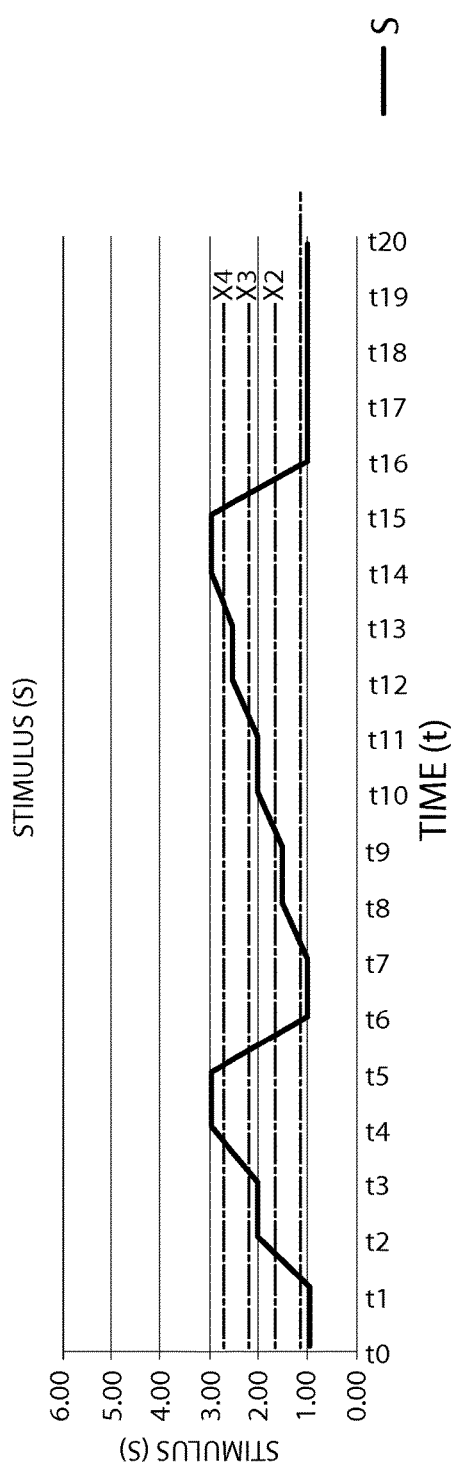
FIG. 31 is a graph illustrating stimulus versus time for the touch sensor illustrated in FIG. 26.
Figure 32:
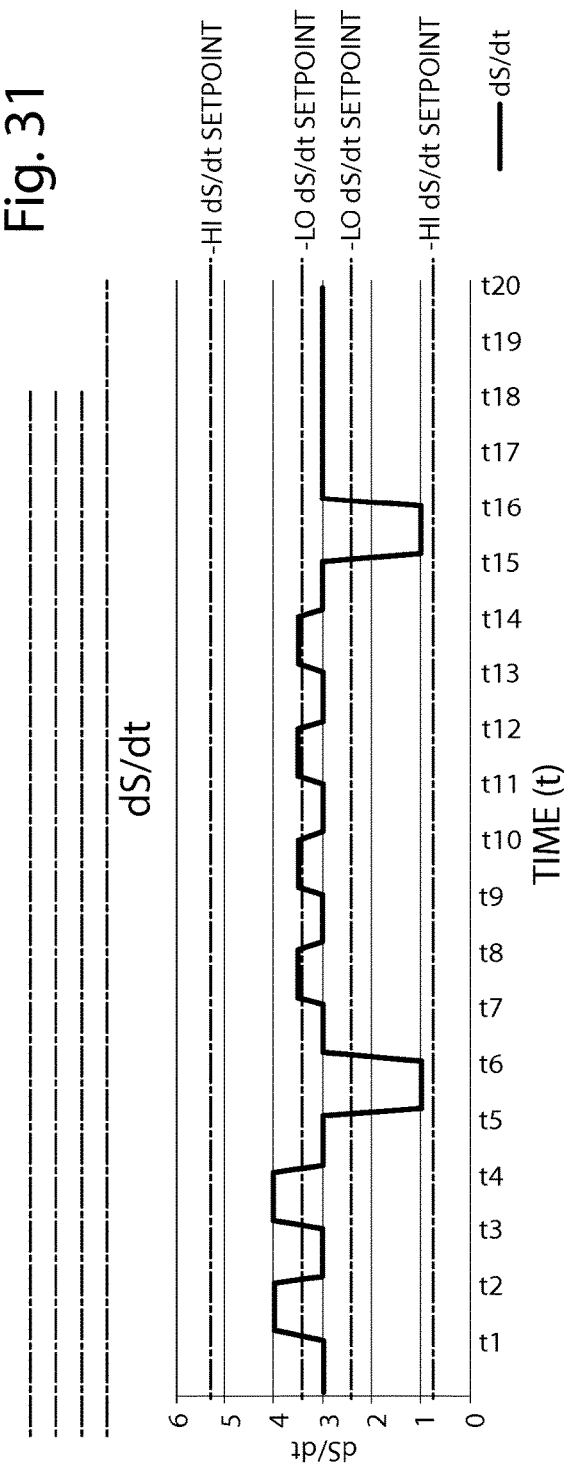
FIG. 32 is a graph illustrating rate of change of stimulus versus time for the touch sensor illustrated in FIG. 26.

Other features can be implemented using the techniques of Time Domain Differential touch sensing by changing the definition and possible the electrode structure. Refer to FIGS. 26, 29, 30, 31, and 32. FIGS. 29-30 depict a single electrode sensor similar to what has been described and a finger approaching the touch surface (the finger could be another appendage or touch input device) and coming to rest at the surface of the touch surface. This sequence is detected by the detection and processing circuitry in FIG. 26 and the stimulus (S) is and dS/dt are shown from time t1 through t3 on FIGS. 31 and 32 and represents the sequence for a simple touch. If at time t2 the finger were to be "rolled" such as to flatten the finger, causing more surface area coupling from the finger to the sensor electrode on the bottom surface of the touch substrate, then the stimulus S would continue to increase to a higher level as well as causing a jump in dS/dt while the finger is moving. After the movement, the finger comes to rest again. This sequence is seen from time t3 to t5. This would indicate a second state. Each set of sequences cold be treated as an individual touch event or any combination of these sequences together could be interpreted as a touch event. These different combinations might be called a "touch signature." The above sequence could be described as follows:

1) If S>x (1.50) (Active Zone set point=x (1.50)) and
2) dS/dt>+Lo dS/dt (3.50) and dS/dt<+Hi dS/dt (4.50) followed by
3) dS/dt returns to 0 then
4) touch #1 is detected (at time t2)
5) If touch #1 is not reset (NOT back to "no touch" state) then
6) If dS/dt>+Lo dS/dt (3.50) and dS/dt<+Hi dS/dt (4.50) followed by
7) dS/dt returns to 0 then
8) touch #2 is detected (at time t4)

Figure 33:
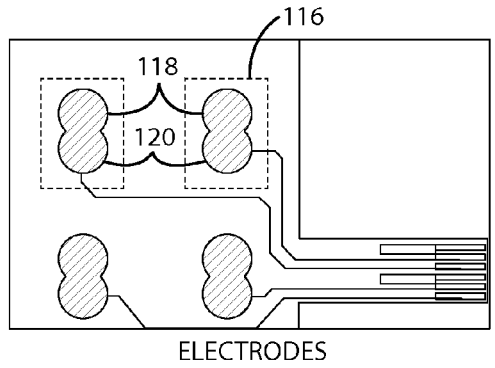
FIG. 33 is a depiction of a four non-circular electrodes for use with the touch sensor illustrated in FIG. 26.
Figure 34:
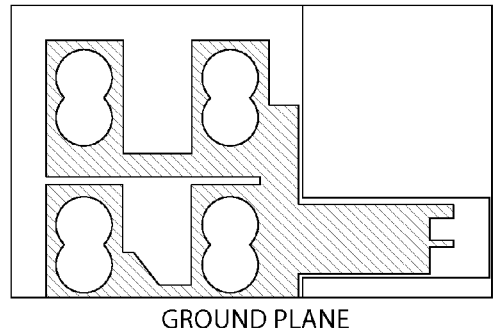
FIG. 34 is a depiction of a ground plan for use with the four non-circular electrodes depicted in FIG. 33 and the touch sensor illustrated in FIG. 26.

FIGS. 33 and 34 illustrate a multiple touch input layout that could use the above described sequence. Note each touch sensor 116 includes an electrode comprising two intersecting circles 118, 120. Each circle 118, 120 is sized to be approximate the size of a finger flattened out. This will optimize and limit the amount of finger coupling to the sensor when a finger touches the glass surface during a normal touch. If a person were to touch above the circle farthest away from the trace connection "the top circle", this would be registered as touch #1. If the finger were to then be rolled (separated by step 3 of dS/dt returns to zero) then the bottom circle allows the finger to increase its capacitive coupling to the sensor allowing for the detection of touch 2. Other electrode configurations having irregular or discontinuous outer peripheries are also possible. This illustrates that the touch electrode design can be modified to enhance the "touch signature" response. The electrode structure can be enhanced to help filter out unwanted stimulus S.

Figure 35:
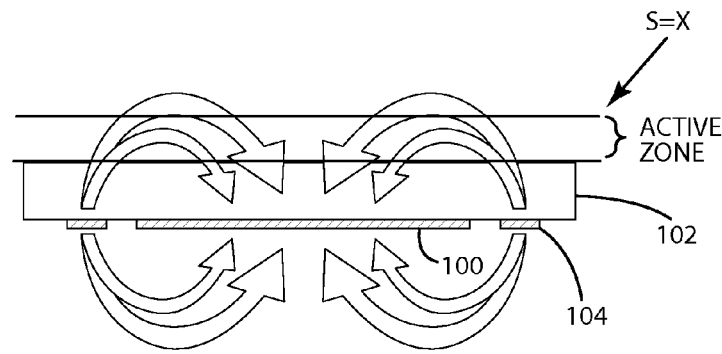
FIG. 35 is an illustration of a touch sensor including multiple electrodes and an active zone for use with time domain differential logic.
Figure 36:
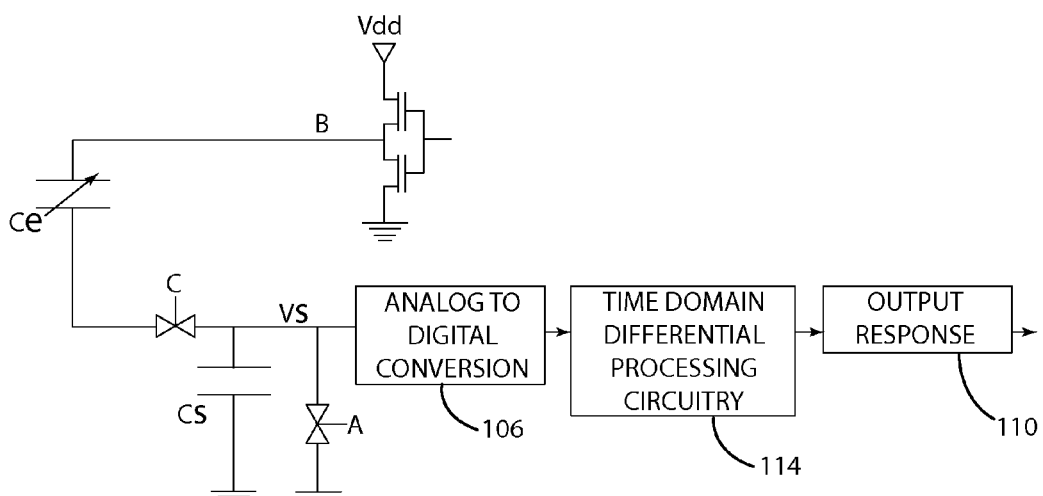
FIG. 36 is a circuit diagram of a multiple electrode touch sensor including a time domain differential processing circuitry.
Figure 37:
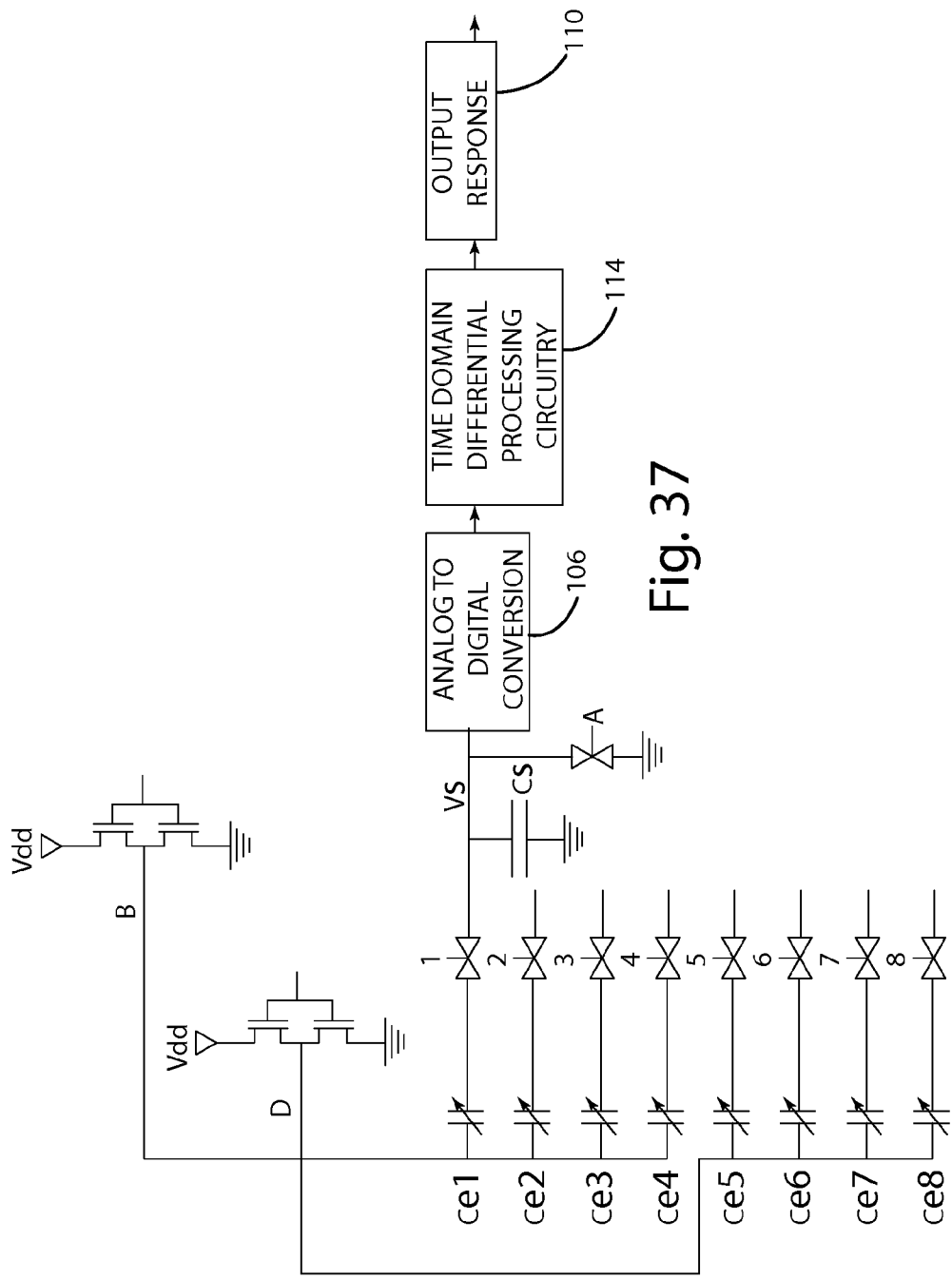
FIG. 37 is a circuit diagram of a touch sensor including eight single- or dual-electrode and time domain differential processing circuitry.
Figure 38:
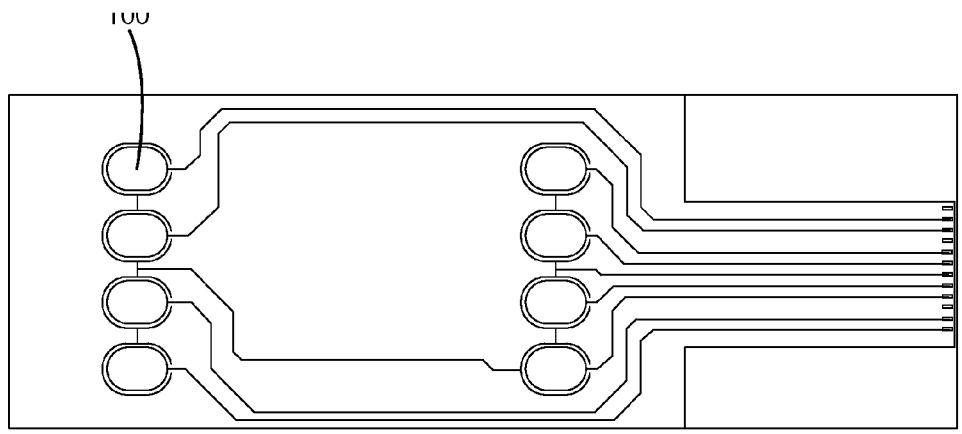
FIG. 38 is a depiction of eight single-electrodes for use with the touch sensor illustrated in FIG. 37.
Figure 39:
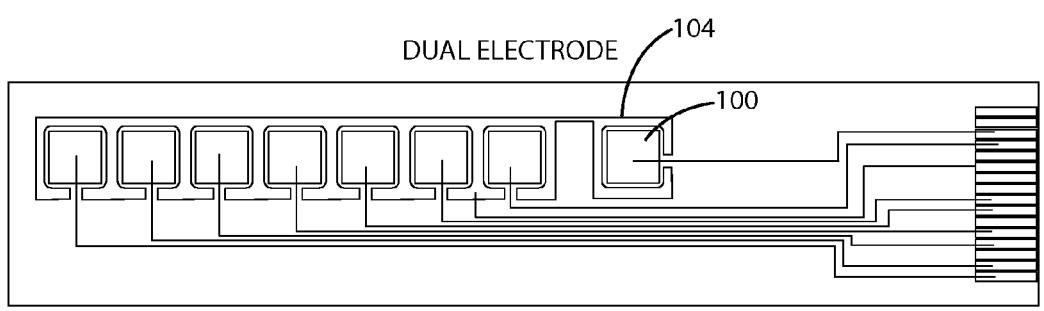
FIG. 39 is a depiction of eight dual-electrodes for use with the touch sensor illustrated in FIG. 37.
Figure 40:
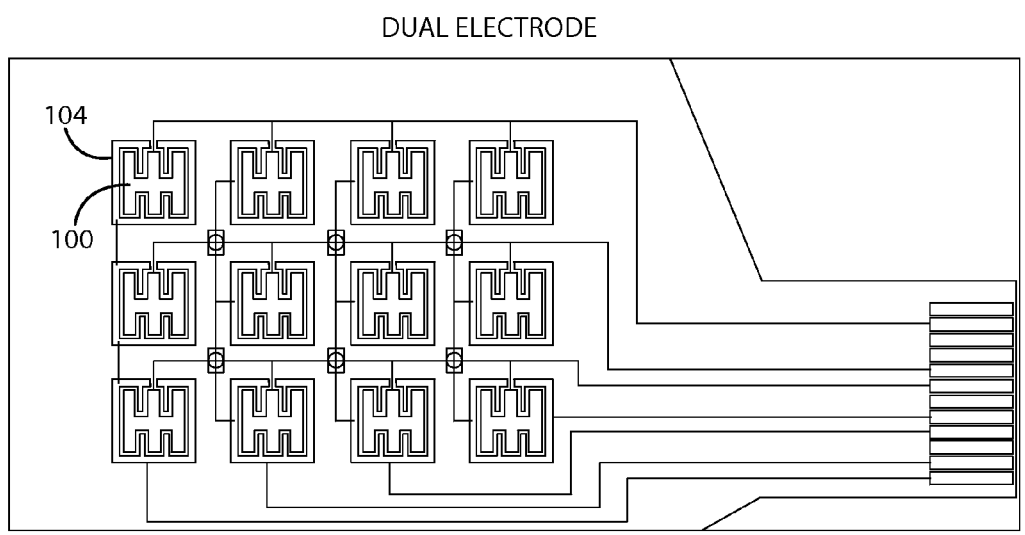
FIG. 40 is a depiction of twelve dual-electrodes for use with the touch sensor illustrated in FIG. 37.

FIG. 35 illustrates a multi electrode touch sensor with an Active Zone where such as would be used in capacitance sensor as in FIG. 1. The basic time domain differential logic can be applied to in which a simple switch function could be replaced. FIG. 36 illustrates a touch detecting circuit, which would be the same as the detecting circuit in FIG. 8 with the exception that the Predetermined Threshold Processing Circuitry 108 is replaced with Time Domain Differential Processing Circuitry 114, with detecting elements Cs, Ce, control devices A and C, Output Drive B, and Analog to Digital Converter 106 where the output of said Analog to Digital Converter 106 is called the Stimulis (S) and is output to the Time Domain Differential Processing Circuitry 114. This type of detecting circuit with its associated dual electrode approach can be more water immune by ignoring stimulus S that go in the opposite direction as a touch stimulus S. The stimulus S would tend to go in the opposite direction for water laying on the touch surface above the dual electrode sensor area. All of the techniques described in processing the stimulus S and rate of change of stimulus with respect to time dS/dt can be used to process the output associated with FIGS. 35 and 36. Also, the concept of measuring the response of multiple dual electrode sensors with common processing circuitry can be applied. One particular configuration would be that that shown in FIG. 37. FIG. 37 illustrates a multiple input configuration with eight dual electrode sensors as described in FIGS. 35 and 36. Each sensor is represented by the net effect capacitance of Ce1, Ce2, Ce3, Ce4, Ce5, Ce6, Ce7, Ce8 and each has a control device (1-8) for connecting/isolating to/from the sampling capacitor Cs and associated processing circuitry. Ce1 through Ce2 are shown in this example that all sensors are driven by Output Drive B via one common drive line and Output Drive D via a second common drive line. FIG. 38 specifically would apply to FIG. 37. Other configurations that are possible using similar techniques are shown via layouts in FIG. 39 and FIG. 40. The layout in FIG. 40 is optimized for immunity by enhancing the coupling from the outer electrode 104 to the inner electrode 100 in each sensor location. The enhanced coupling is accomplished by increasing the linear length of the outer perimeter of each outer and inner conductive pad 100, 104 where they are adjacent each other while maximizing the amount of pad area to increase the coupling through water from the outer to the inner pad. This will maximize the size of the stimulus if water were to lay on the touch surface 112 over the particular sensing electrode structure allowing a greater stimulus S. A greater stimulus caused by water (in the opposite direction of a touch stimulus) allows the processing circuitry to more easily discriminate against water versus a touch stimulus.

Figure 41:
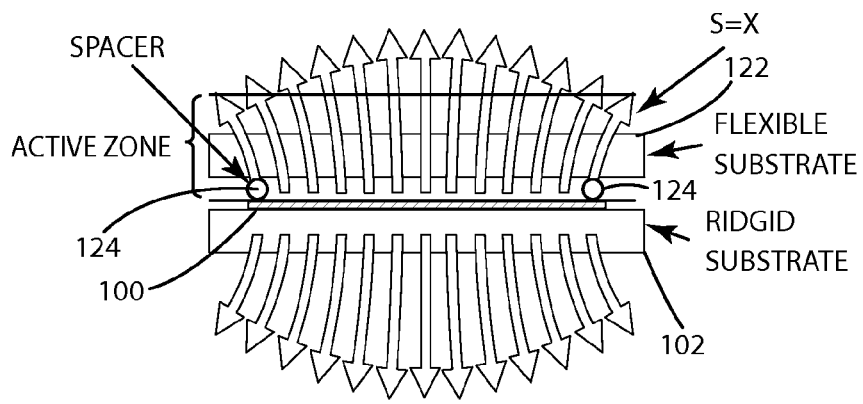
FIG. 41 is an illustration of a touch sensor including a single electrode interposed between a flexible substrate and a rigid substrate.
Figure 42:
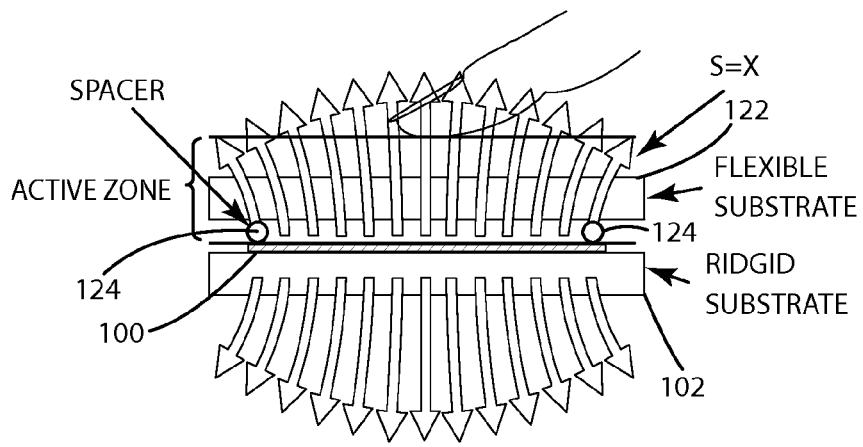
FIG. 42 is an illustration of a finger approaching the touch sensor illustrated in FIG. 41.
Figure 43:
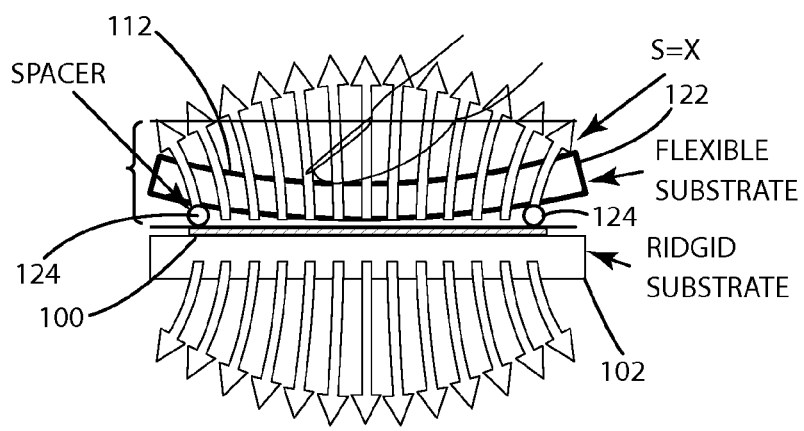
FIG. 43 is an illustration of a finger deflecting a flexible substrate associated with the touch sensor illustrated in FIG. 41.

Referring to FIG. 41, note the addition of an extra dielectric layer 122 in the form of a flexible substrate that is separated by the first dielectric substrate 102 in the form of a rigid substrate. The separation can be implemented and maintained in a variety of ways and the material between the dielectric flexible substrate 122 and rigid substrate 102 can be a variety of constructions including air. FIG. 42 illustrates separation and support between the flexible and rigid substrates 122, 102 by spacers 124. The purpose of the spacers 124 is to support and maintain air gap spacing between the flexible and rigid substrates 122, 102. Note that the additional dielectric material and associated air gap are located with the Active Zone. FIGS. 41-43 illustrate the function of the structure of the three dimensional sensor using the Time Domain Differential sensing technique. FIG. 42 illustrates a finger/appendage in contact with the touch surface 112 of the dielectric flexible substrate 122. This would create a first "touch event." FIG. 43 illustrates a finger/appendage in contact with the touch surface 112 of the dielectric flexible substrate 122 and where the finger/appendage is applying enough physical pressure to depress and bend the dielectric flexible substrate 122 so as to decrease the distance and increase the dielectric constant between the finger/appendage touching the top side of the dielectric flexible substrate 122 and sensor electrode 100 on the top or bottom side of the rigid substrate 102.

FIGS. 44 and 45 illustrate a timing diagram for the operation of the sensor structure in FIGS. 42 and 43. One basic implementation of the sensor structure might be as follows: from time t0 to t1 the stimulus, S, and the rate of change of S with respect to time, dS/dt, are both at the "no touch" condition (a base value of 1.00 for S and a base value of 3.00 for dS/dt). From t1 to t2, as the finger/appendage approaches the touch surface on the upper side of the flexible surface, as shown in FIG. 42, S increases until the finger is limited by the touch surface at t2, a value of 2.00. Accordingly, from t1 to t2 the dS/dt is at a value of 4.00, indicating a rate of change of S with respect to time. At t2, when the finger/appendage stops at the touch surface, dS/dt returns to the base value of 3.00. This sequence of events could be processed as a valid touch event. From t2 to t3 the finger/appendage is in contact with the touch surface and the stimulus S is at a value of 2.00. Simultaneously, there is no change in the stimulus with respect time, and therefore dS/dt is at base value of 3.00 (no change). From t3 to t4 the finger/appendage applies pressure causing the flexible substrate to bend, decreasing the distance and increasing the dielectric constant (by displacing the air with the flexible substrate material) between the finger/appendage and the sensor electrode on the bottom side of the rigid substrate. This action will cause the stimulus S to increase. This is shown in FIG. 44 as the stimulus S increasing from a value of 2.00 to 3.00 from t3 to t4. Simultaneously, there will be a jump in dS/dt as shown in FIG. 45. The value of dS/dt is shown as a value of 4.00 from t3 to t4. At t4 when the finger/appendage stops increasing the deflection of the Flexible substrate, the stimulus S stops increasing and is shown in FIG. 44 as stopping at a value of 3.00. Simultaneously at t4, dS/dt returns to "no change" as indicated at the base value of 3.00. This sequence of events could be processed as a touch event. From t4 to t5 there is no change in stimulus insertion by the finger/appendage and FIGS. 44 and 45 show this state as described above. From t5 to t6 the finger/appendage would be removed from the touch surface outside of the Active Zone. The stimulus S drops to the "no touch" state with a simultaneously negative (−dS/dt) of a value of 1.00 (base value of 3.00+(−2.00)=1.00). At t6 the sensor is in a "no touch" state and the S and dS/dt return to their base "no touch" states of 1.00 and 3.00 respectively.

The construction of the touch sensor shown in FIGS. 42 and 43 coupled with time domain differential sensing techniques described above can yield new features while maintaining the consistency of proper "feel" of touch despite the many variables that may be introduced that would normally plague conventions capacitance and differential sensing techniques that utilize a predetermined threshold. This construction could be considered a basic three dimensional touch sensor as there can be at least one and then two responses for a given touch location on the touch surface. Referring to FIGS. 41 through 45, again the sequence of logical steps might be:

1) If S>x (1.50) (Active Zone set point=x (1.50)) and
2) dS/dt>+Lo dS/dt (3.50) and dS/dt<+Hi dS/dt (4.50) followed by
3) dS/dt returns to 0 then
4) touch #1 is detected (at time t2)
5) If touch #1 is not reset (NOT back to "no touch" state) then
6) If dS/dt>+Lo dS/dt (3.50) and dS/dt<+Hi dS/dt (4.50) followed by
7) dS/dt returns to 0 then
8) touch #2 is detected (at time t4)

The effective result of this would be detection of two distinct touches in sequence. Also the above did not depend on a predetermined threshold level other than the loosely defined setpoint for the Active Zone. Alternatively, and referring to FIGS. 41 through 45, the following logical sequence of conditions would yield the same results as the previous example but perhaps with somewhat higher reliability based on adding additional conditions from data available to the processing circuitry:

1) If S>x (1.50) (Active Zone set point=x (1.50)) and
2) dS/dt>+Lo dS/dt (3.50) and dS/dt<+Hi dS/dt (4.50) followed by
3) dS/dt returns to 0 then
4) touch #1 is detected (at time t2); Remember value of S (S1=S)
5) If touch #1 is not reset (NOT back to "no touch" state) then
6) If dS/dt>+Lo dS/dt (3.50) and dS/dt<+Hi dS/dt (4.50) followed by
7) dS/dt returns to 0 and (S>2.75) then
8) If S>S1 then
9) touch #2 is detected (at time t4)

The effective result of this would be detection of two distinct touches in sequence. Also even though the processing circuitry evaluates the stimulus S, still a predetermined threshold is not used but two variable values of S are obtained and compared to each other.

Yet another alternative would be the following logical sequence of conditions that could yield the same results but with perhaps higher reliability based on information available to the processing circuitry:

1) If S>x (1.50) (Active Zone set point=x (1.50)) and
2) dS/dt>+Lo dS/dt (3.50) and dS/dt<+Hi dS/dt (4.50) followed by
3) dS/dt returns to 0 and (S>1.75 and S<2.25) then
4) touch #1 is detected (at time t8)
5) If touch #1 is not reset (NOT back to "no touch" state) then
6) If dS/dt>+Lo dS/dt (3.50) and dS/dt<+Hi dS/dt (4.50) followed by
7) dS/dt returns to 0 and (S>2.75) then
8) touch #2 is detected (at time t4)

The effective result of this would be detection of two distinct touches in sequence. Also even though the processing circuitry evaluates the stimulus S, still a predetermined threshold is not used (but two separate ranges are evaluated).

Refer to FIGS. 42 through 43 and specifically FIGS. 44 and 45. Time t7 to t14 illustrate a way to show a linear sensing based on increasing deflection from increasing pressure by a finger/appendage on the top surface of the flexible substrate. FIG. 44 illustrates stimulus S is increased in a series of steps by applying the finger/appendage to the top surface of the flexible substrate and then applying increasing pressure and therefore deflection of the flexible substrate. FIG. 45 illustrates the sequence of increased pressure and therefore deflection in discrete steps by four alternating pulses of dS/dt. An example of the processing of a sequence of events might be as follows:

1) If S>x (1.50) (Active Zone set point=x (1.50)) and
2) dS/dt>+Lo dS/dt (3.50) and dS/dt<+Hi dS/dt (4.50) followed by
3) dS/dt returns to 0 then
4) touch #1 is detected (at time t8). Remember value of S (S1=S)
5) If touch #1 is not reset (NOT back to "no touch" state) then
6) If dS/dt>+Lo dS/dt (3.50) and dS/dt<+Hi dS/dt (4.50) followed by
7) dS/dt returns to 0 and (S>S1) then
8) touch #2 is detected (at time 00) Remember value of S (S1=S)
9) If touch #1 is not reset (NOT back to "no touch" state) then
10) If dS/dt>+Lo dS/dt (3.50) and dS/dt<+Hi dS/dt (4.50) followed by
11) dS/dt returns to 0 and (S>S1) then
12) touch #3 is detected (at time t12) Remember value of S (S1=S)
13) If touch #1 is not reset (NOT back to "no touch" state) then
14) If dS/dt>+Lo dS/dt (3.50) and dS/dt<+Hi dS/dt (4.50) followed by
15) dS/dt returns to 0 and (S>S1) then
16) touch #4 is detected (at time t14) Remember value of S (S1=S)

Figure 46:
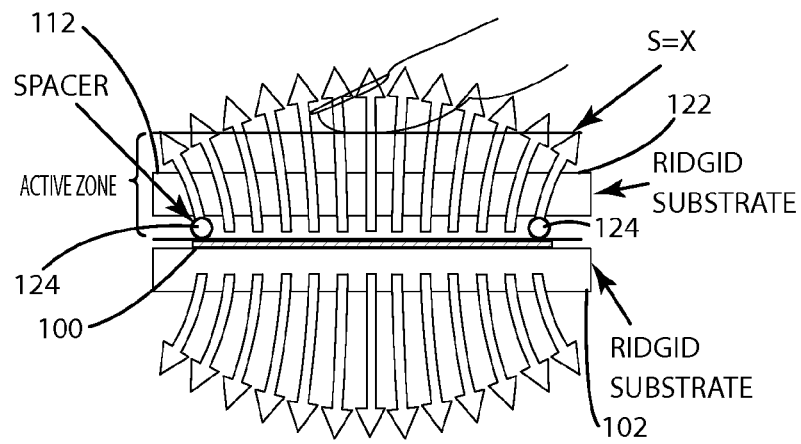
FIG. 46 is an illustration of a touch sensor including a single electrode interposed between two rigid substrates.
Figure 47:
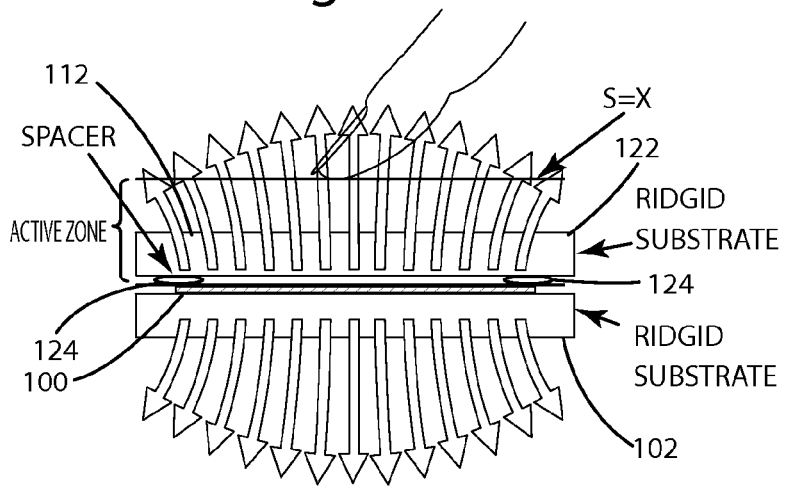
FIG. 47 is an illustration of a finger approaching the touch sensor illustrated in FIG. 46.
Figure 48:
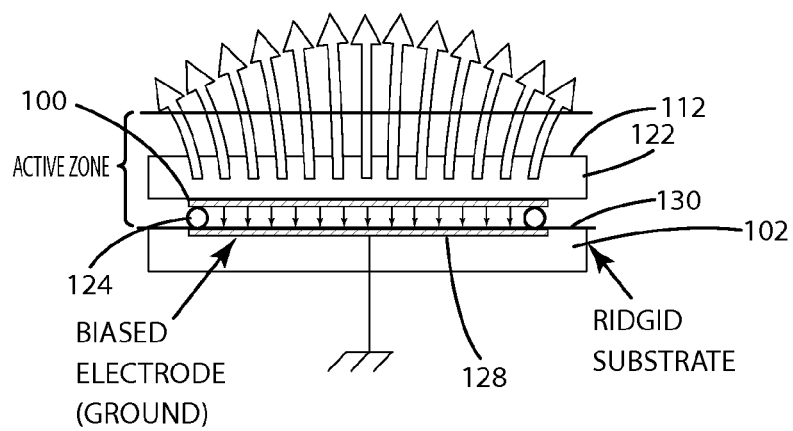
FIG. 48 is an illustration of a touch sensor including a sensor electrode and a biased electrode interposed between upper and lower rigid substrates.

FIGS. 46 and 47 illustrate an alternative construction to that of FIGS. 42 and 43. FIGS. 46 and 47 illustrates a construction of two rigid substrates 102, 122 separated by collapsible spacers 124 that will allow for the decreasing distance/increasing average dielectric constant between the finger/appendage on the top touch surface 112 of the upper rigid substrate 122 and the sensor electrode 100 on the top or bottom side of the lower rigid substrate 102. FIG. 48 is similar to the construction of the sensor in FIG. 41 with the two exceptions: 1) the sensor electrode 100 is located and attached on the bottom side 126 of the upper flexible substrate 122 and 2) an additional electrode 128 is located on the top side 130 of the lower rigid substrate 102. The additional electrode 128 is biased at ground potential, and can also be located on the bottom side of the upper rigid substrate 122. The ground allows for the change of Stimulus in that it emulates the finger/appendage as the flexible substrate moves toward (but not touching) the grounded biased electrode 128. The time domain differential techniques described above can be implemented with all of the structures illustrated in FIGS. 41 through 42, 43, 44, 47, and 48.

Figure 49:
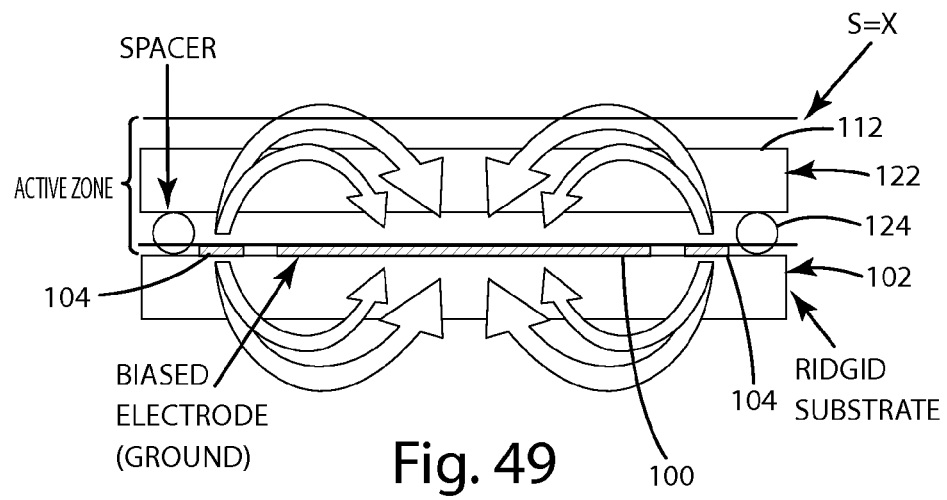
FIG. 49 is an illustration of a touch sensor including multiple electrodes interposed between upper and lower rigid substrates.
Figure 50:
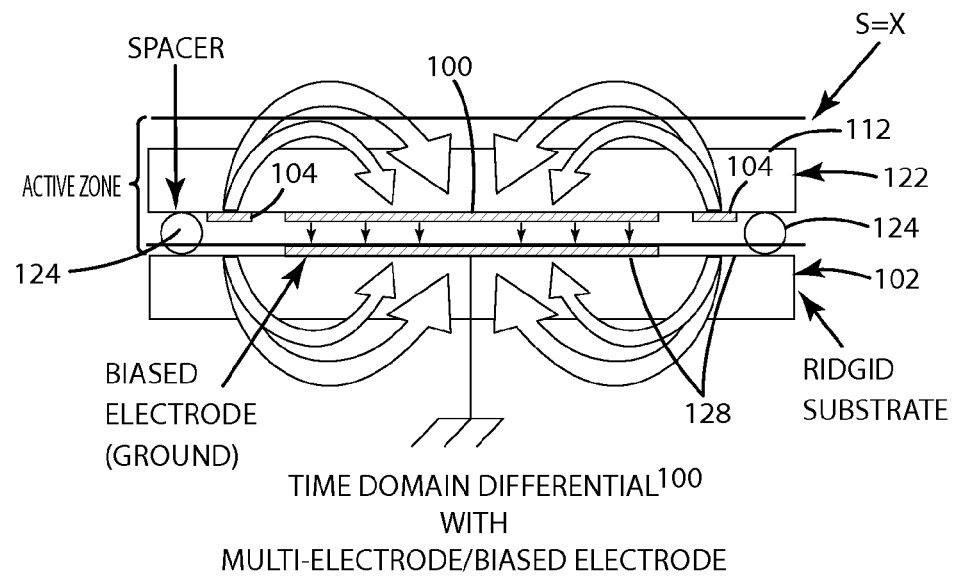
FIG. 50 is an illustration of a touch sensor including multiple electrodes and a biased electrode interposed between upper and lower rigid substrates.

FIGS. 49 and 50 show similar configurations similar to those shown in FIGS. 41 through 48 but with multi-electrode structures as described so far and other similar structures. The upper substrate 122 where the top touch surface 112 is located can be made of either flexible or rigid substrates as long as the techniques described in the physical construction and operation of FIGS. 41 through 48 are applied, again with the exception that multi-electrode techniques are employed. All of the detecting and processing techniques utilizing Time Domain Differential detecting and processing techniques can be applied with the structures in FIGS. 49 and 50 as well as their derivations also. In addition, the sensing electrode 100 is depicted as being positioned on the underside of the upper rigid substrate 122, while the biased electrode 128 is depicted as being positioned atop the lower rigid substrate 102. In other embodiments, however, the sensing electrode 100 is positioned atop the lower rigid substrate 102 and the biased electrode 128 is positioned on the underside of the upper rigid substrate 122.

Combining different sequences utilizing the techniques of detecting S and dS/dt as described above may be used to create other user input features. These user features can enhance the utilitarian function of a touch input function. FIGS. 51/52, 53/54, 55/56, and, 57/58 illustrate some of the variety of sequences that could be employed that would equate to a variety of specific output functions. As by example:

FIGS. 51/52 illustrate a sequence of events that would basically mean that as a touch input stimulus is brought to the surface of without depressing, then pressing further, followed by a light touch, then depressing, then light touch, then a final depressing might indicate a function. Likewise, a light depression, followed by a depressing might select a certain function whereas the next depression might select a sub-function, followed by a light touch and next depression would be a second sub-function.

Figure 53:
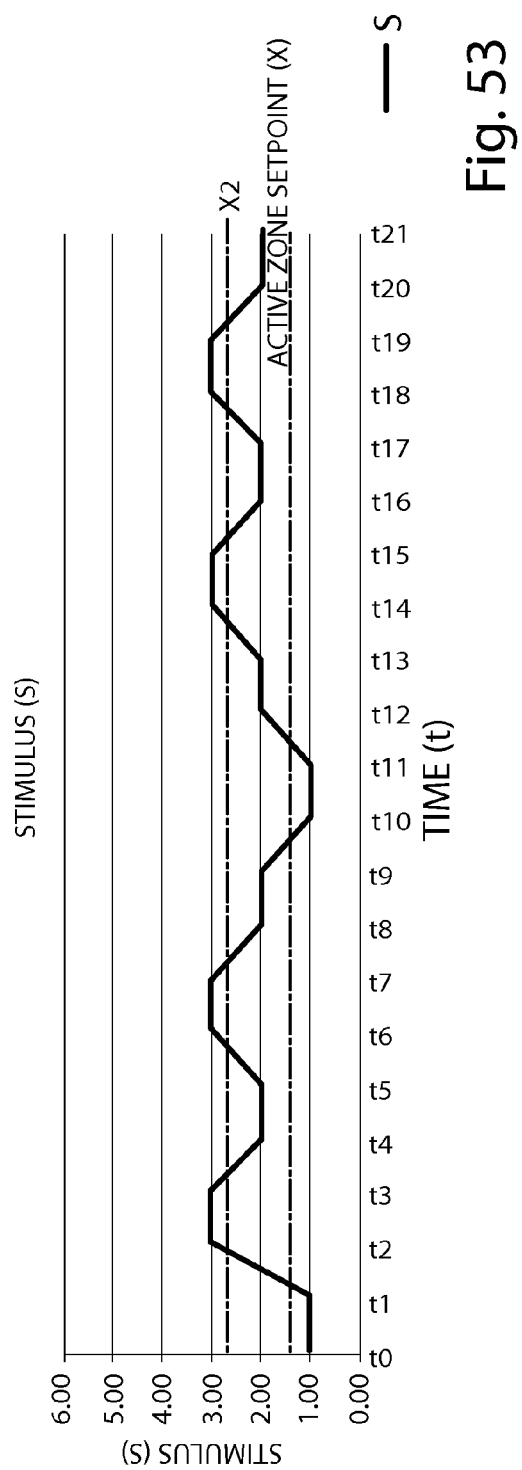
FIG. 53 is a second graph illustrating stimulus versus time for the touch sensor of FIGS. 49-50.
Figure 54:
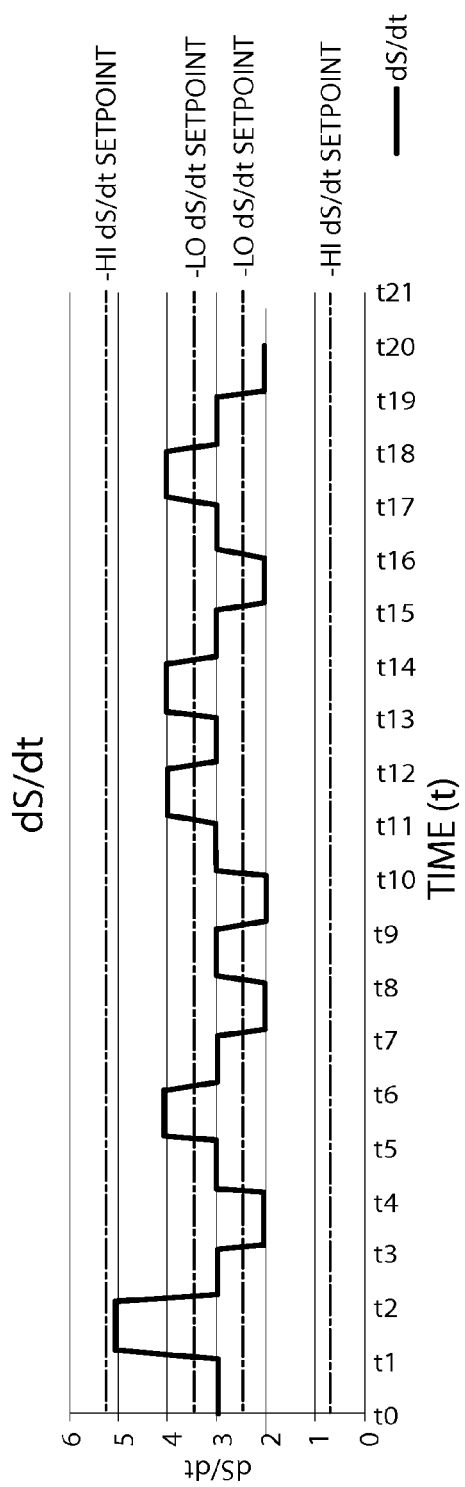
FIG. 54 is a second graph illustrating rate of change of stimulus versus time for the touch sensor of FIGS. 49-50.

FIGS. 53/54 illustrates at the same touch input location as FIGS. 51/52 that if a touch stimulus were to touch and depress immediately the touch input and perhaps above the S value of x2 (a dS/dt accompanied by a S value>x2), then the function would be a different function followed by a sub-function value when there is a light touch followed by a second depression.

Figure 55:
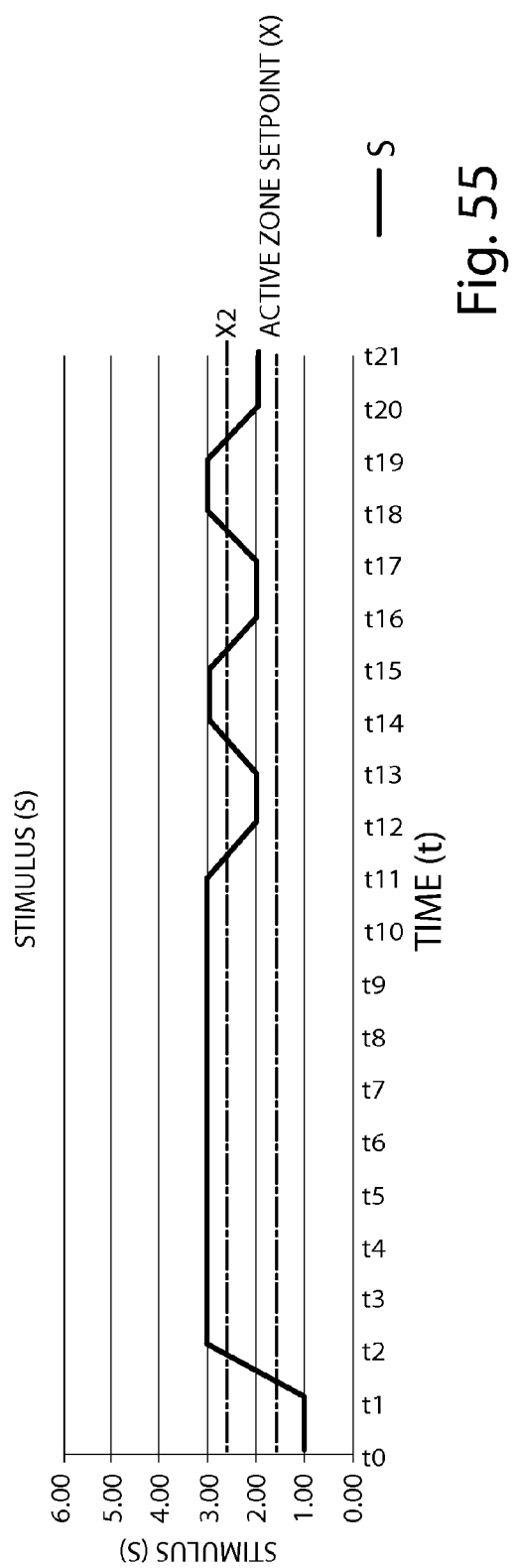
FIG. 55 is a third graph illustrating stimulus versus time for the touch sensor of FIGS. 49-50.
Figure 56:
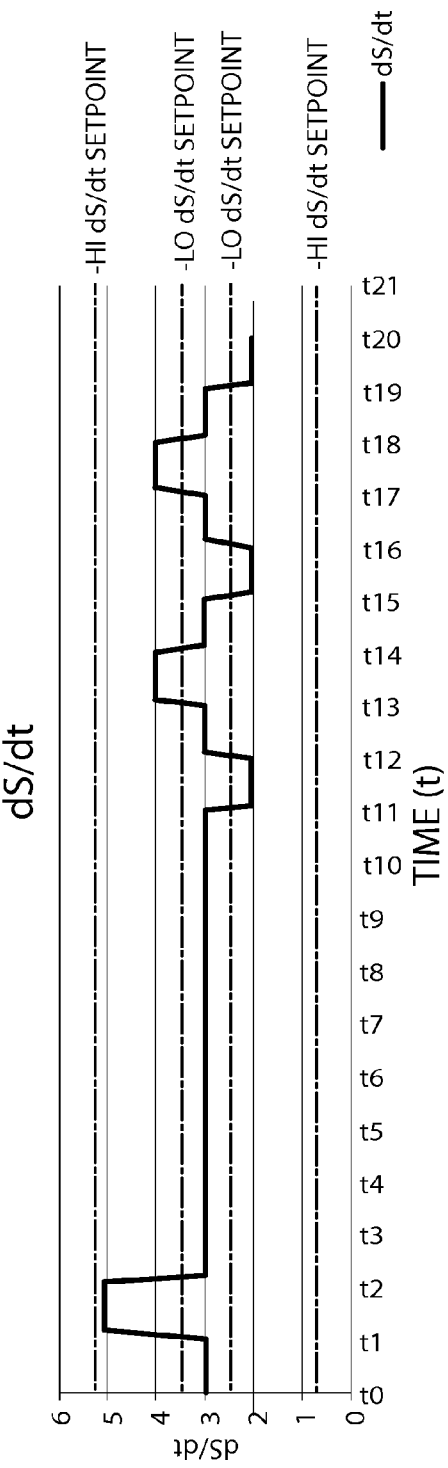
FIG. 56 is a third graph illustrating rate of change of stimulus versus time for the touch sensor of FIGS. 49-50.
Figure 57:
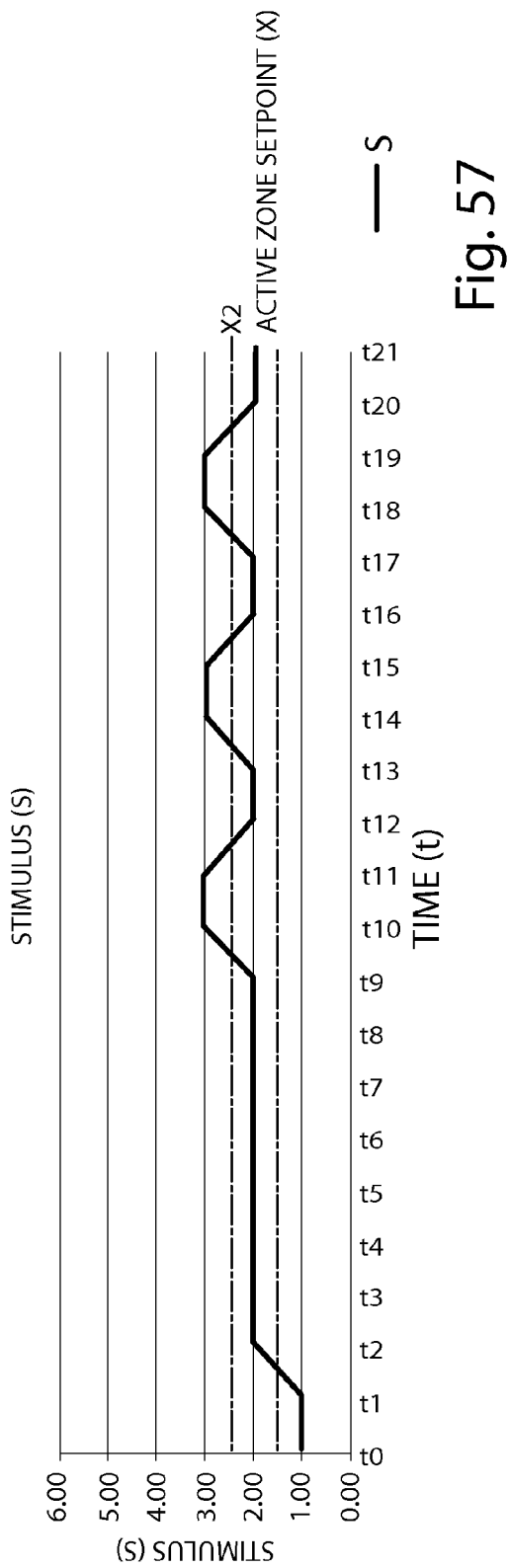
FIG. 57 is a fourth graph illustrating stimulus versus time for the touch sensor of FIGS. 49-50.
Figure 58:
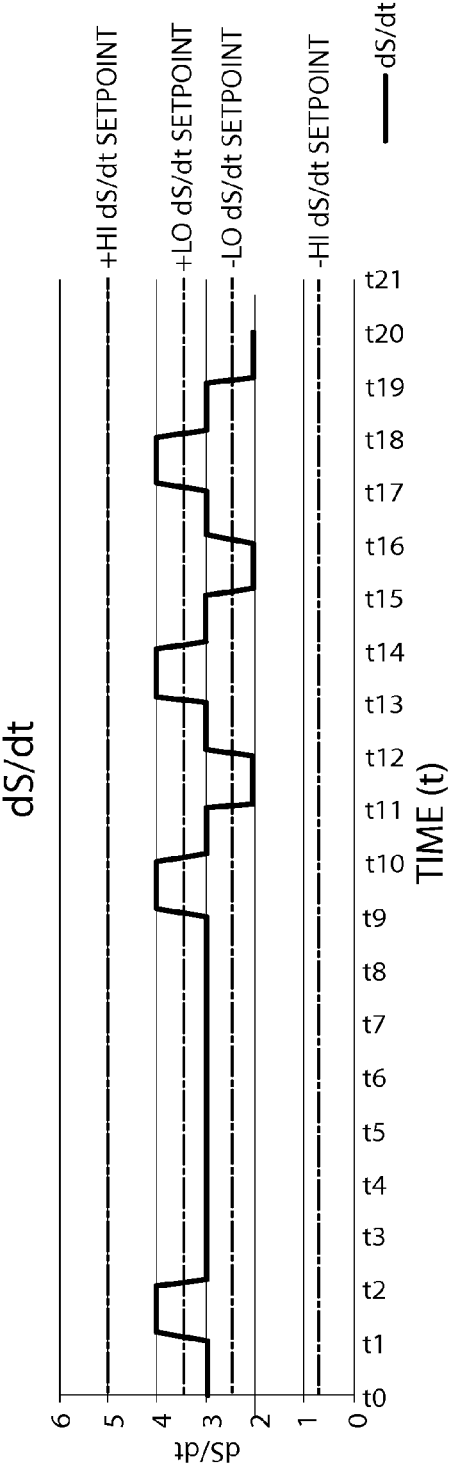
FIG. 58 is a fourth graph illustrating rate of change of stimulus versus time for the touch sensor of FIGS. 49-50.

FIG. 55/56 illustrates at the same touch point as described in FIGS. 51/52 and 53/54 but a different set of conditions. In this set of sequences the after the initial depression and first action (dS/Dt accompanied by a S value>x2) followed by a period of time, then two sub-function selections based on light touch/depression sequences (similar to above).

Finally, similar to FIGS. 55/56, the sequences show a similar "signature" as described where time is used again except after a light touch first then a sets of sub-functions (in this case three) where the sub-functions are selected by depressions followed by a light touch.

Based on the above descriptions, it is apparent to one of skill in the art that there are numerous sequences that can be used to define different input sequences, none reliant on a predetermined threshold for the primary detection of the touch. As noted in any of the sequence figures related to time domain differential processing rely on an absolute value for detecting at least the first touch. Of course, as shown above, even if one were to use predetermined threshold in combination with the technique of detecting dS/dt, reliability and new features can be added to simple touch responses. Also, the sequences above could be used with some success using predetermined threshold techniques by carefully controlling the ranges with the construction of the sensors as described above (i.e., two touch points based on two threshold values and in combination with time and number of sequences). The limitations of predetermined threshold techniques as compared to time domain differential processing techniques as described herein would still apply.

Figure 59:
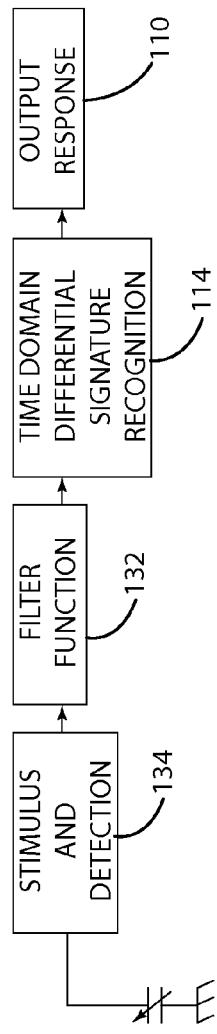
FIG. 59 includes a circuit diagram for a single electrode touch sensor including a filter function and time domain differential signature recognition.
Figure 60:
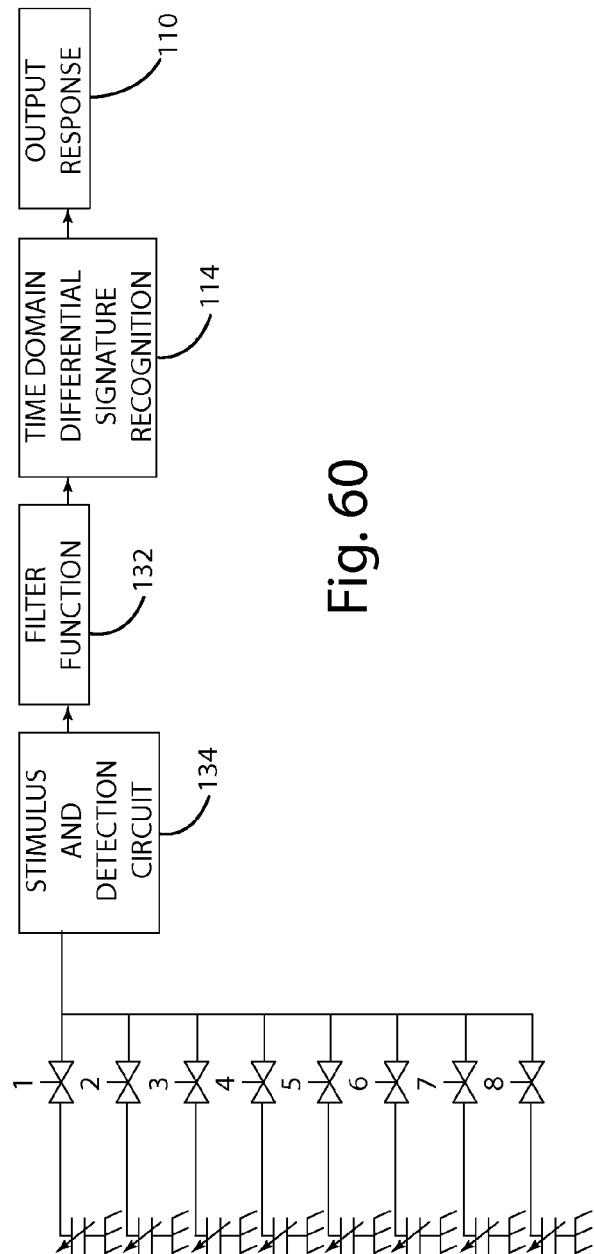
FIG. 60 includes a circuit diagram for a multiple electrode touch sensor including a filter function and time domain differential signature recognition.

As described earlier, time domain differential sensing techniques for sensing touch inputs need to sample at a rate fast enough to at minimum detect the rise and fall of dS/dt such as to detect the touch. Even so the rate that a person can touch a touch input sensing device is slow as compared to that of electrical noise and other environmental conditions. Equally the rate of change of touch stimulus change is much faster than other factors such as temperature, moisture, ice, etc and certainly the static offsets such as dielectric substrate thickness, dielectric constant, and other things that do not change at all (dS/dt=0) in the environment. FIGS. 59/60 illustrate the application and use of a filter 132 that can be employed electronically, software, or a combination of both. The filter 132 may be constructed as a Low Pass Filter such as to filter out changes that might affect the stimulus at a rate that is greater than could be possibly be performed by a human. Likewise the filter could also be used to filter out slower signals in the form of a high pass filter. A combination of a low pass and high pass filter or an integral form of both to form a bandpass filter could be employed also. The Stimulus and Detection circuit 134 would stimulate as necessary and based on the techniques for sensing a touch stimulus and the sensor electrode structure (whether a single electrode sensor or multi-electrode sensor). The filter 132 would filter out those frequencies that can't be related to a touch and then the Time Domain Differential Processing circuit 114 would then identify by the sequences S and dS/dt the "signatures" that relate to valid output functions. Employing a separate filter would reduce the signal processing speed requirements of the Time Domain Differential Processing Circuitry 114. Also by divorcing the filter function from the "signature" recognition function, the filter block 132 can be tailored to tighter filter design at a lower cost by using state of the art integrated circuit designs. FIG. 59 illustrates the use of a single electrode structure and FIG. 60 illustrates how a filter 132 could be used in multiple sensor input applications.

Figure 61:
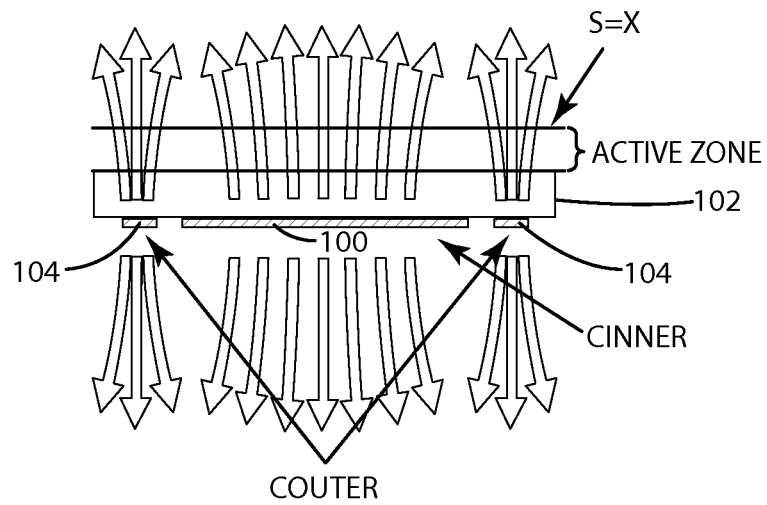
FIG. 61 illustrates a dual electrode touch sensor including an inner electrode and an outer electrode.
Figure 62:
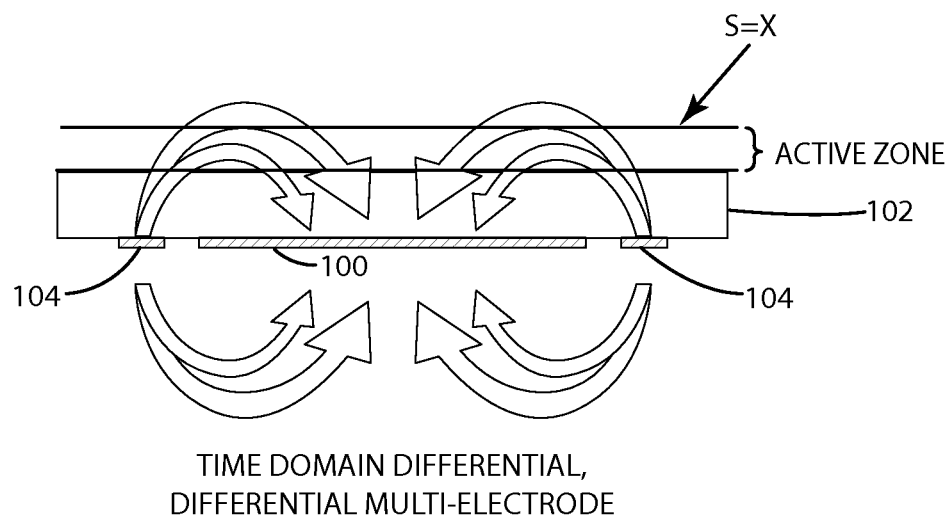
FIG. 62 illustrates the dual electrode touch sensor of FIG. 61 including the net electric field.

Refer to FIG. 61. FIG. 61 illustrates a dual electrode structure for detecting a touch input, the dual electrode structure having a first electrode 100 and a second electrode 104 positioned proximate to the first electrode 100. A differential measuring circuit can reject common mode signals, e.g., electrical noise, interference, and temperature variations. The resultant differential signals can be output processed using Time Domain Differential techniques instead of using the Predetermined Threshold techniques allowing the improved detection of touch inputs as well as allowing for the development of enhanced features as described thus far. FIG. 61 indicates the use of an "inner" and "outer" electrode 100, 104 each designated as Cinner and Couter. Each electrode 100, 104 is stimulated, creating an electric field as shown by the arrows stretching above and below each of Cinner and Couter electrodes. The net electric field, based on the differences in the Cinner and Couter electric fields, is shown in principle in FIG. 62. The electric fields in FIG. 61 can be generated and measured, separated by time, to then be compared by processing circuitry similar to that described previously in FIG. 26.

Figure 63:
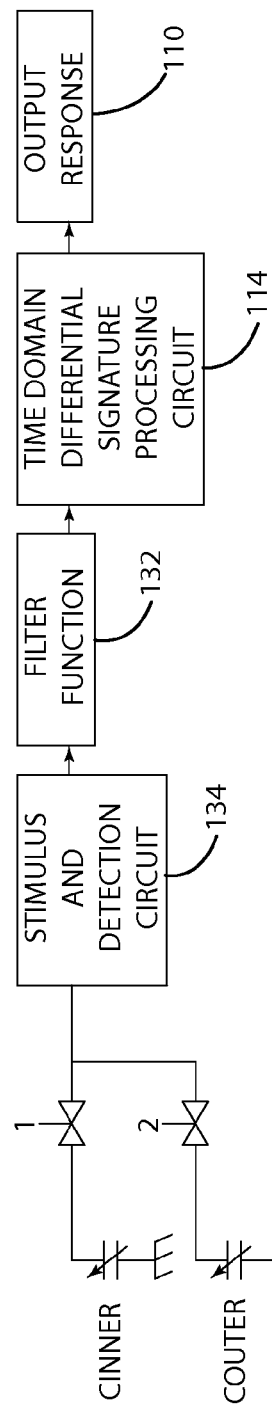
FIG. 63 includes a first circuit diagram for the dual electrode touch sensor illustrated in FIG. 61.

FIG. 63 shows Cinner and Couter coupled to the Stimulus and Detection Circuit 134 where each electrode's signal is filtered and processed by the time domain differential signature processing circuit 114. All of the blocks 110, 114, 132, 134 operate at least as described in this disclosure. The Stimulus and Detection circuit 134 would first stimulate and then measure the Cinner electrode by turning on and then off control device 1. The Stimulus and Detect Circuit 134 would then repeat this cycle but for Couter using control device 2. The difference of the resultant outputs of both electrodes would then be output, along with other parameters associated with the electrode that might be of use later by the time domain differential processing circuit 114. Other possible parameters might be each of Cinner and Couter electrode's non-differential signal value, the common mode voltage value, etc. The output or outputs of the Stimulus and Detection Circuit 134 would then be coupled optionally to the Filter Function 132 which in turn its output is coupled to the Time Domain Differential Signature Processing Circuit 114 where a touch event or series of touch events, as defined by the sequence matching in the Time Domain Differential Circuit block 114, as has been described herein. The output of the Time Domain Differential Circuit 114 is then coupled to the Output Response circuit 110.

Figure 64:
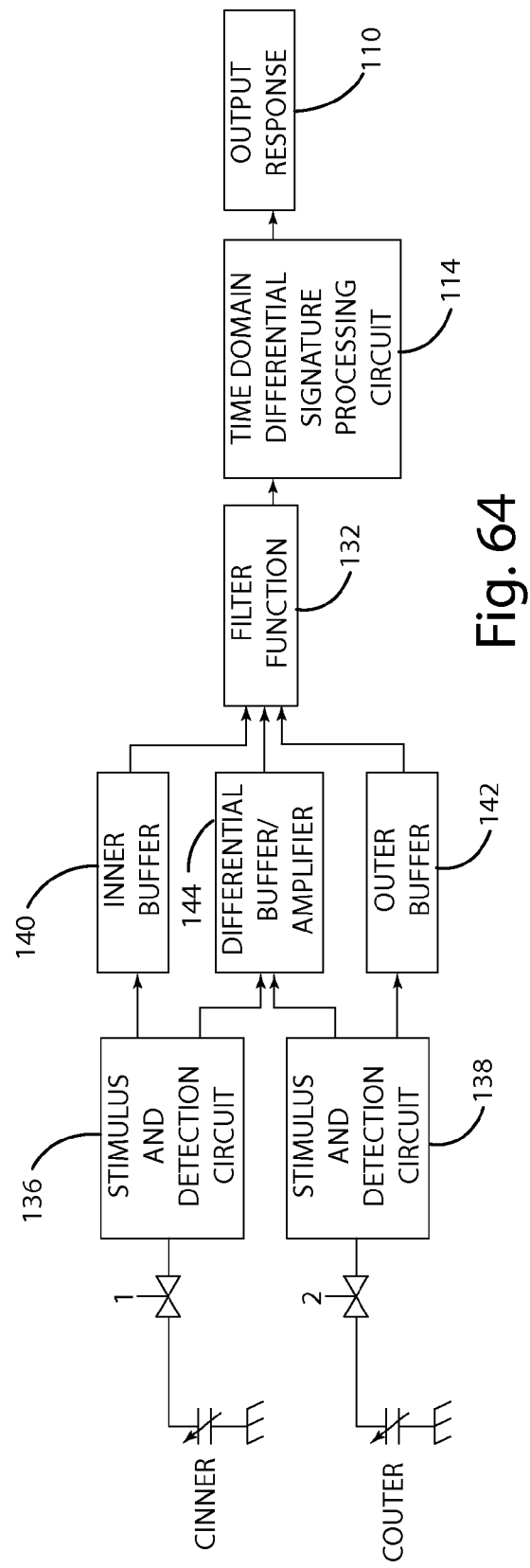
FIG. 64 includes a second circuit diagram for the dual electrode touch sensor illustrated in FIG. 61.

Alternatively as shown in FIG. 64, each of Cinner and Couter would be stimulated and first and second Stimulus and Detection Circuits 136, 138 would detect the electric fields on Cinner and Couter simultaneously. The electrical response for Cinner and Couter electrodes would be processed simultaneously by the Inner Buffer 140, Outer Buffer 142, and Differential Buffer/Amplifier 144. The simultaneous processing of the Differential value of Cinner and Couter will greatly improve the common mode noise immunity based on noise coupling in real time of the Cinner and Couter values. The output of the Inner Buffer 140, Outer Buffer 142, and Differential Buffer/Amplifier 144 would be coupled to the Filter Function 132 and the rest of the blocks to process similarly as described previously and as shown in FIG. 64. Again, but with greater effectiveness, differential measurement techniques result in the suppression of electrical noise via radiated electromagnetic interference or coupled through conducted electromagnetic interference. In previous examples, the first step of processing the stimulus S and dS/dt was detecting if the value of S had exceeded a loose proximity setting of x to verify the signal was strong enough to process the dS/dt event. The sequence for recognizing the simple touch example from FIGS. 22, 23, 24 and 25 was as follows:

1) If s>x (proximity threshold) and
2) ds/dt>0, followed by 3) ds/dt=0, then touch event Using differential sensing techniques where the differential output signal that is proportional to the touch but can attenuate the electrical noise then the first step of the sequence can be eliminated as follows:

1) ds/dt>0, followed by
2) ds/dt=0, then touch event

Where s=S(Cinner)−S(Couter) and ds/dt is based on the differential output of Cinner and Couter in FIG. 64.

This may be accomplished perhaps without the filter function, depending on the particular application. The advantage of eliminating the filter function would be a matter of possible simplification and perhaps faster response times. Filter functions tend to reduce response times. Also, by introducing differential sensing techniques and even the filter function can reduce the processing requirements of the Time Domain Differential processing. In other cases it might be beneficial to implement the filter function, in combination with differential sensing techniques, using software digital filtering techniques.

Figure 65:
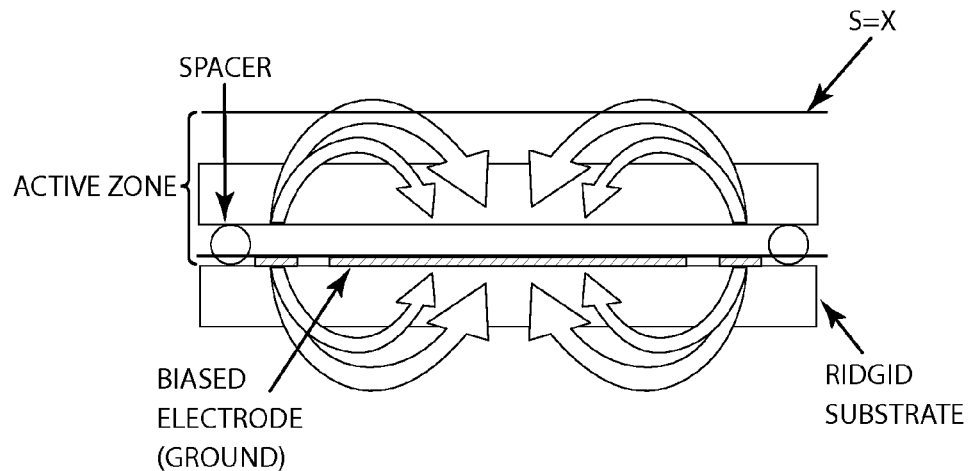
FIG. 65 illustrates a dual electrode touch sensor including spaced apart upper and lower rigid substrates.
Figure 66:
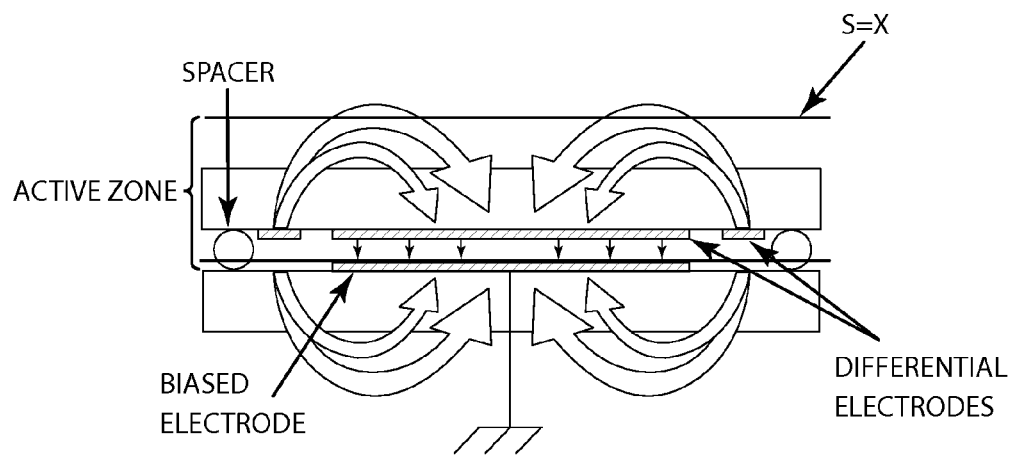
FIG. 66 illustrates a dual electrode touch sensor including spaced apart upper and lower rigid substrates and a biased lower electrode.
Figure 67:
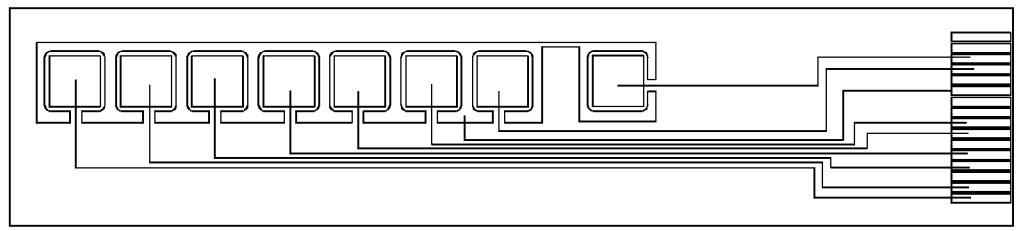
FIG. 67 is an eight-electrode touch sensor employing differential sensing techniques of the present invention.
Figure 68:
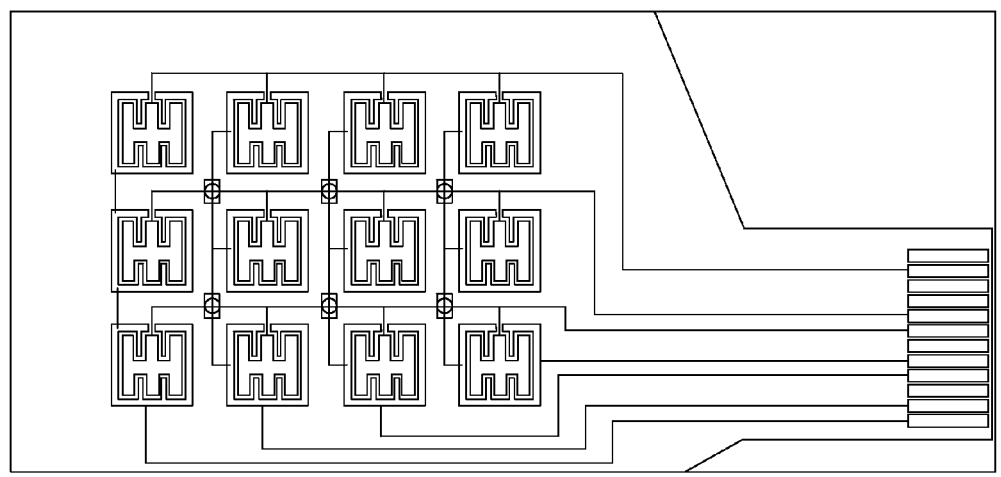
FIG. 68 is a twelve-electrode touch sensor employing differential sensing techniques of the present invention.

Differential sensing techniques can also implement three dimensional sensing techniques as discussed previously. In many ways, many of the structures and layouts discussed earlier could be used as the differential processing is largely implemented in the electronic processing circuitry. FIGS. 65 through 68 illustrate structures and layouts discussed previously that could be used with differential electrode sensing with time domain differential processing. FIGS. 65/66 are examples of three dimensional as discussed previously but using differential sensing electrode structures. The upper substrate of each electrode structure may be flexible or rigid, consistent in operation to previous examples.

Figure 69:
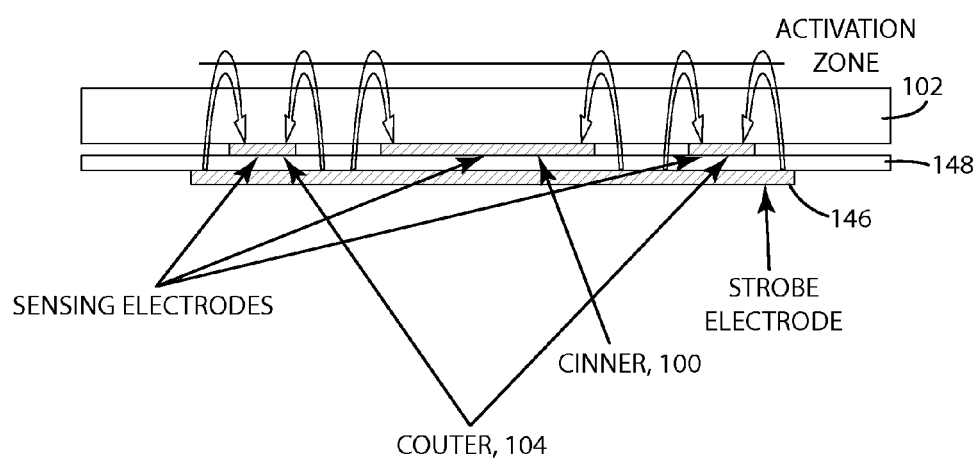
FIG. 69 illustrates a touch sensor including inner and outer electrodes and a strobe electrode.

Shown in FIG. 69 is an electrode structure that will combine the benefits of the sensing techniques described in FIGS. 35 through 40 and differential electrode sensing techniques. FIGS. 70 and 71 show comparable sensing techniques comparable to FIGS. 63 and 64. In particular, FIG. 69 illustrates the use of an additional electrode 146. This additional electrode 146 is used as a strobe electrode to couple a field to a sensing electrode 100 similar to that described and associated with FIGS. 35 through 40. Unlike FIGS. 35 through 40, FIG. 69 illustrates a strobe electrode 146 common to and for the purpose of coupling to two separate electrodes, Cinner 100 and Couter 104, simultaneously. The strobe electrode 146 is located underneath Cinner 100 and Couter 104 on the opposite side of the substrate 148 that Cinner 100 and Couter 104 are located. The basic structure allows for the additional water immunity by coupling from a strobe electrode 146 to a sensing electrode, in this case two sensing electrodes simultaneously. FIG. 70 illustrates the strobe electrode coupled to Cinner 100 and Couter 104. The processing circuitry shows processing using multiplexing measuring techniques. Similar to as described in FIG. 63, the differential sensing is calculated by measuring Cinner 100 and Couter 104 separated by time. FIG. 71 illustrates a technique similar that shown in FIG. 64 for measuring Cinner 100 and Couter 104 differential sensing simultaneously, again with a common strobe electrode 146 and a stimulus circuit 150. The combination of the benefits of common mode rejection, water immunity, and time domain differential sensing techniques as described previously can all be integrated and utilized in by implementing the basic electrode structure in FIG. 69 and in FIG. 71.

Figure 72:
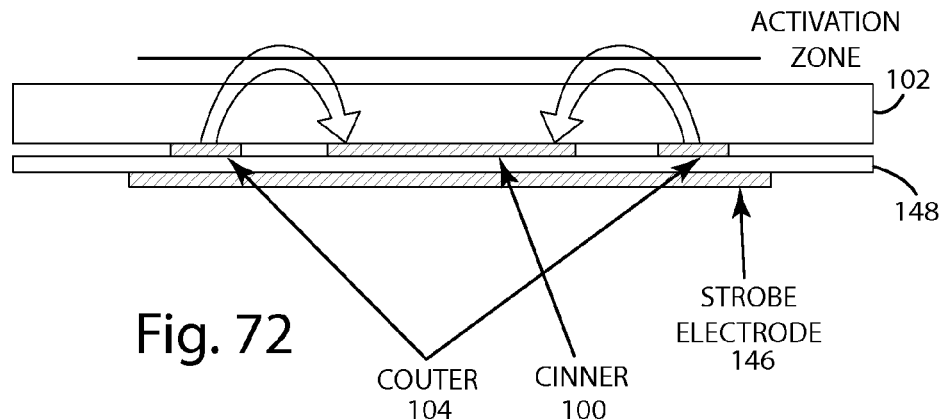
FIG. 72 illustrates the touch sensor of FIG. 69 including the net electric field.
Figure 73:
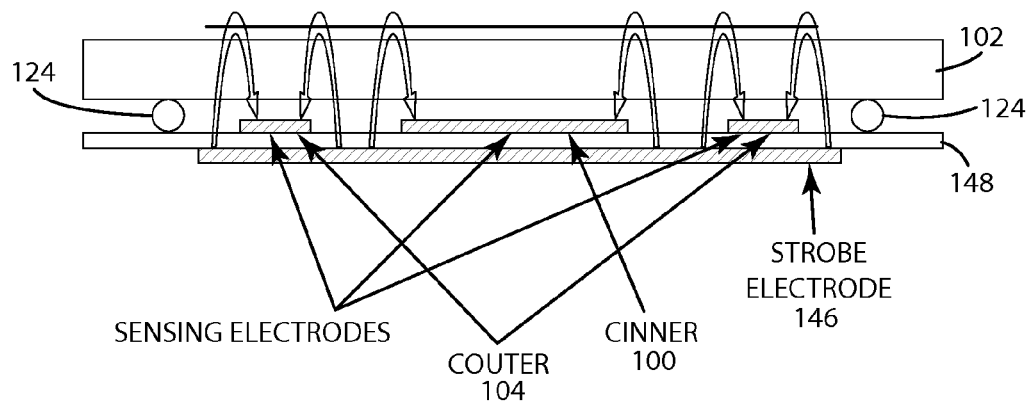
FIG. 73 illustrates the touch sensor of FIG. 69 including an overlying substrate supported by spacers.
Figure 74:
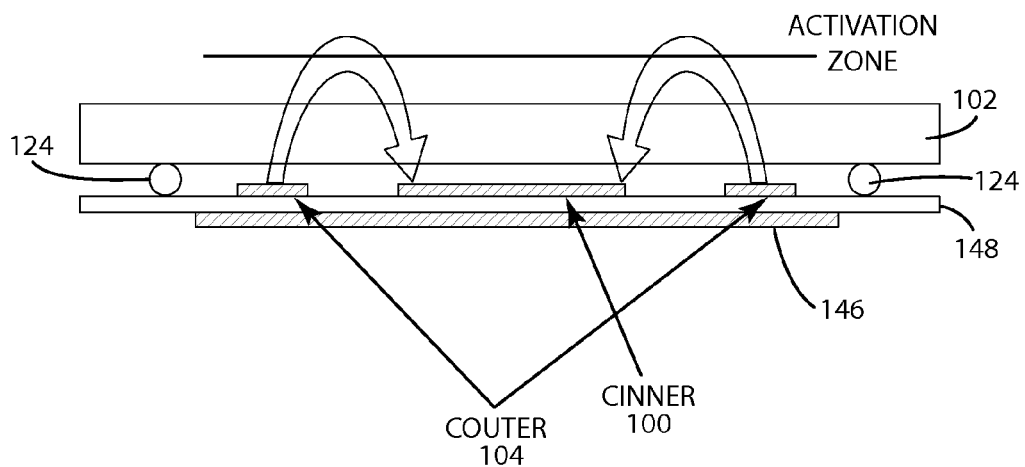
FIG. 74 illustrates the touch sensor of FIG. 73 including the net electric field.
Figure 75:
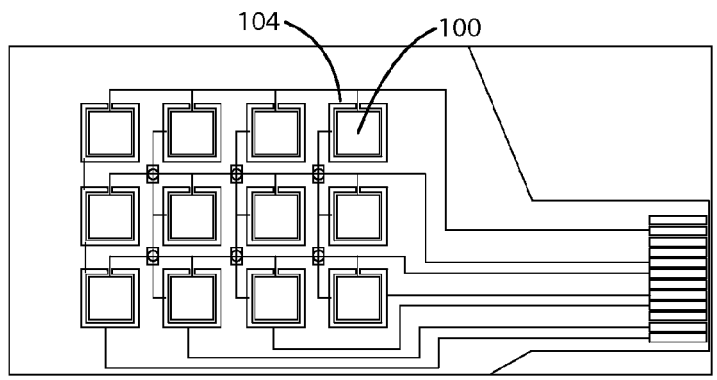
FIG. 75 illustrates a first twelve-electrode sensor including inner and outer electrodes.
Figure 76:
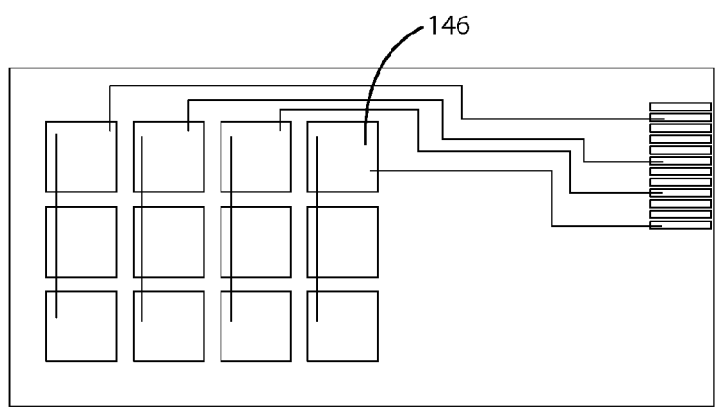
FIG. 76 illustrates a lower strobe electrode for use with the twelve-electrode sensor of FIG. 75.
Figure 77:
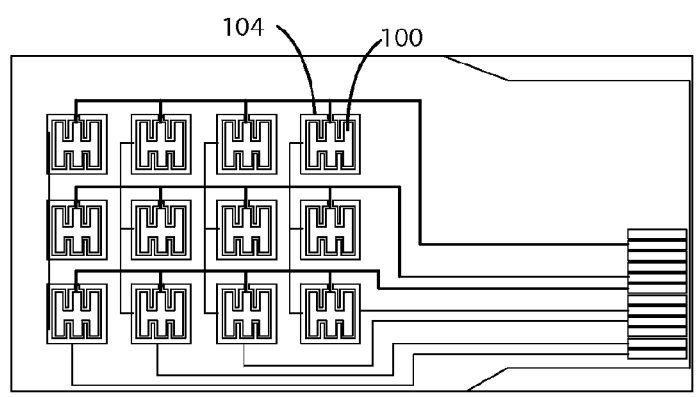
FIG. 77 illustrates a second twelve-electrode sensor including inner and outer electrodes.
Figure 78:
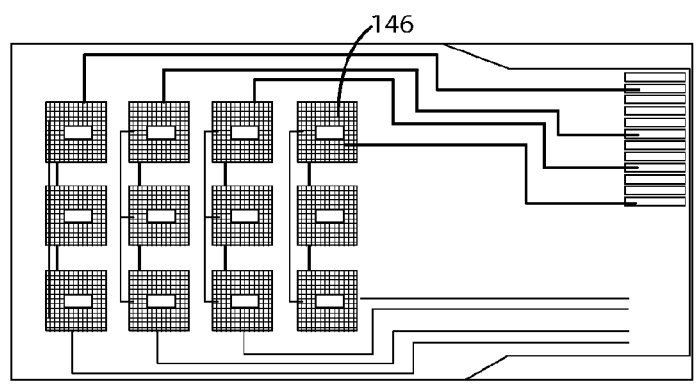
FIG. 78 illustrates a lower strobe electrode for use with the twelve-electrode sensor of FIG. 77.

FIG. 72 shows the net electric field based on the difference in electrical potential between Cinner 100 and Couter 104 shown coupled FIG. 69. FIGS. 73 and 74 show again as previously described, structures associated with three dimensional electrodes that can enhance the features that time domain differential sensing can provide. FIGS. 75 and 76 show an array of three electrode structures as discussed relating to FIGS. 69 through 74. FIG. 75 shows the array of electrodes for Cinner and Couter and FIG. 76 shows the array of electrodes for the Strobe electrode. FIGS. 77 and 78 are for an alternative example to that shown in FIGS. 75 and 76 relating to three electrode structures. FIG. 77 shows the array of electrodes for Cinner 100 and Couter 104 and FIG. 78 shows the array of electrodes for the Strobe electrode 146. The electrode structures depicted in FIGS. 77 and 78 are would be considered more water immune than shown in FIGS. 75 and 76 based on the increased coupling from the Strobe electrodes 146 to the Cinner 100 and Couter 104 which helps distinguish from water versus human touch.

Additional embodiments can include the differential sensing techniques discussed above. For example, a capacitive sensor can include a plurality of capacitive switches that are electrically isolated from one another, where each capacitive switch includes an electrode pairing having first and second electrodes. The capacitive sensor can further include a differential measurement circuit electrically coupled to each of the plurality of capacitive switches, wherein the differential measurement circuit is adapted to compare the self-capacitance of the first electrode against the self-capacitance of the second electrode, either simultaneously or sequentially, to aid in the detection of a stimulus proximate the relevant capacitive switch. The differential measurement can also be adapted to compare the rate of change of self-capacitance of the first electrode against the rate of change of self-capacitance of the second electrode. In this example, the rate of change of electrode capacitance can be determined by a time domain differential processing circuit 114 substantially as discussed above in connection with FIGS. 37-40. Further by example, the time domain differential processing circuit 114 can be adapted to determine the rate of change of a relative capacitance, where a relative capacitance includes the difference between the first electrode self-capacitance and the second electrode self-capacitance. Still further by example, the time domain differential processing circuit 114 can be adapted to measure the rate of change of a mutual capacitance between the first and second electrodes. A related method can include a) providing a plurality of electrode pairings, each including an inner electrode and an outer electrode, b) measuring the self-capacitance of each electrode in the plurality of electrode pairings, and c) comparing the self-capacitance of each inner electrode against the paired outer electrode to determine the presence of a stimulus proximate that electrode pairing, optionally using a single differential sensing circuit. The method can further include comparing the rate of change of capacitance of the inner electrode with the rate of change of capacitance of the outer electrode for each electrode pairing. The method can still further include comparing the capacitance of the inner electrode against the capacitance of the outer electrode to define a relative capacitance, and determining a change in relative capacitance over time.

Another embodiment includes a touch pad or touch screen including electrode rows and electrode columns electrically coupled to a differential measurement circuit. In this embodiment, the differential measurement circuit is adapted to compare the self-capacitance of the one or more electrode rows against the self-capacitance of one or more electrode columns, either simultaneously or sequentially, to determine the presence or absence of a stimulus on the touch screen display. The differential measurement can also be adapted to compare the rate of change of self-capacitance of an electrode row against the rate of change of self-capacitance of another electrode row. In this example, the rate of change of electrode capacitance can be determined by a time domain differential processing circuit 114 substantially as discussed above in connection with FIGS. 37-40. Further by example, the time domain differential processing circuit 114 can be adapted to determine the rate of change of a relative capacitance, where a relative capacitance includes the difference between the self-capacitance of one row or column with the self-capacitance of another row or column. Still further by example, the time domain differential processing circuit 114 can be adapted to measure the rate of change of a mutual capacitance between two rows, two columns, or one row and one column. A related method can include a) providing plurality of electrodes including electrode rows and electrode columns, b) measuring the self-capacitance of each electrode row and each electrode column, and c) comparing the self-capacitance of at least two of the plurality of electrodes to determine the two-dimensional location of a touch input on the touch screen display, optionally using a single differential sensing circuit. The method can further include comparing the rate of change of capacitance of a row electrode with the rate of change of capacitance of another row electrode of a column electrode. The method can still further include comparing the capacitance of any two electrodes to define a relative capacitance, and determining a change in relative capacitance over time.

III. Matrix Electrode Touch Sensors

Figure 79:
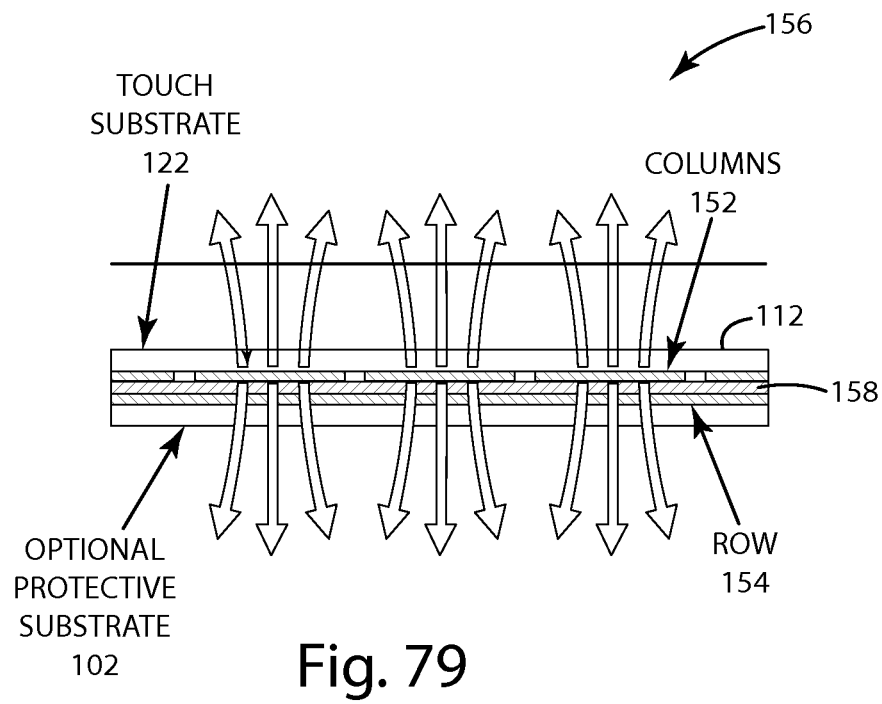
FIG. 79 is a first side view of a touch sensor including overlapping electrode rows and electrode columns.
Figure 80:
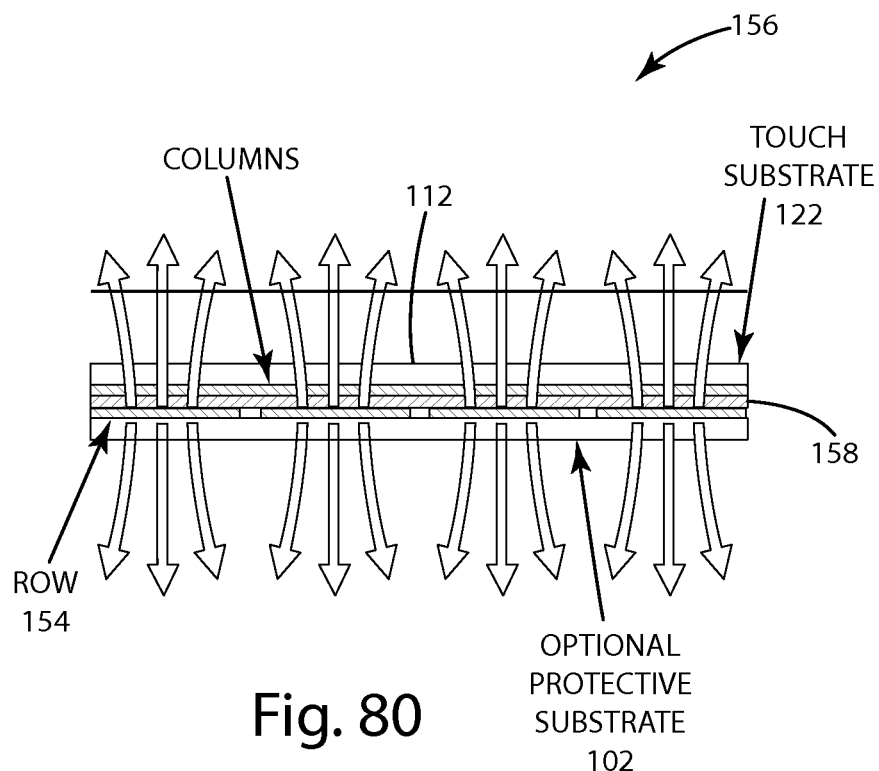
FIG. 80 is a second side view of a touch sensor including overlapping electrode rows and electrode columns.
Figure 81:
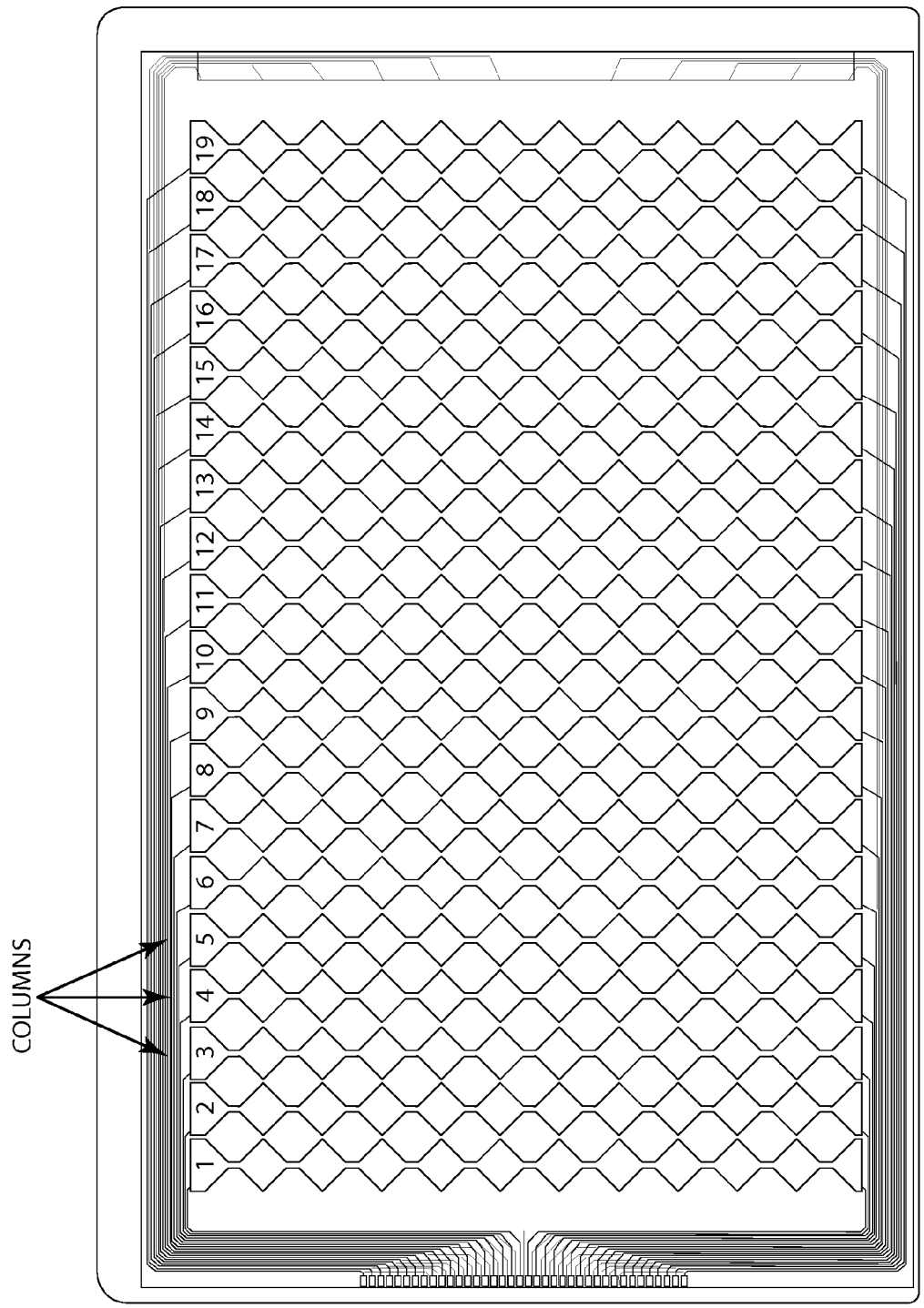
FIG. 81 is a top view of the touch sensor of FIGS. 79-80 including electrode columns.
Figure 82:
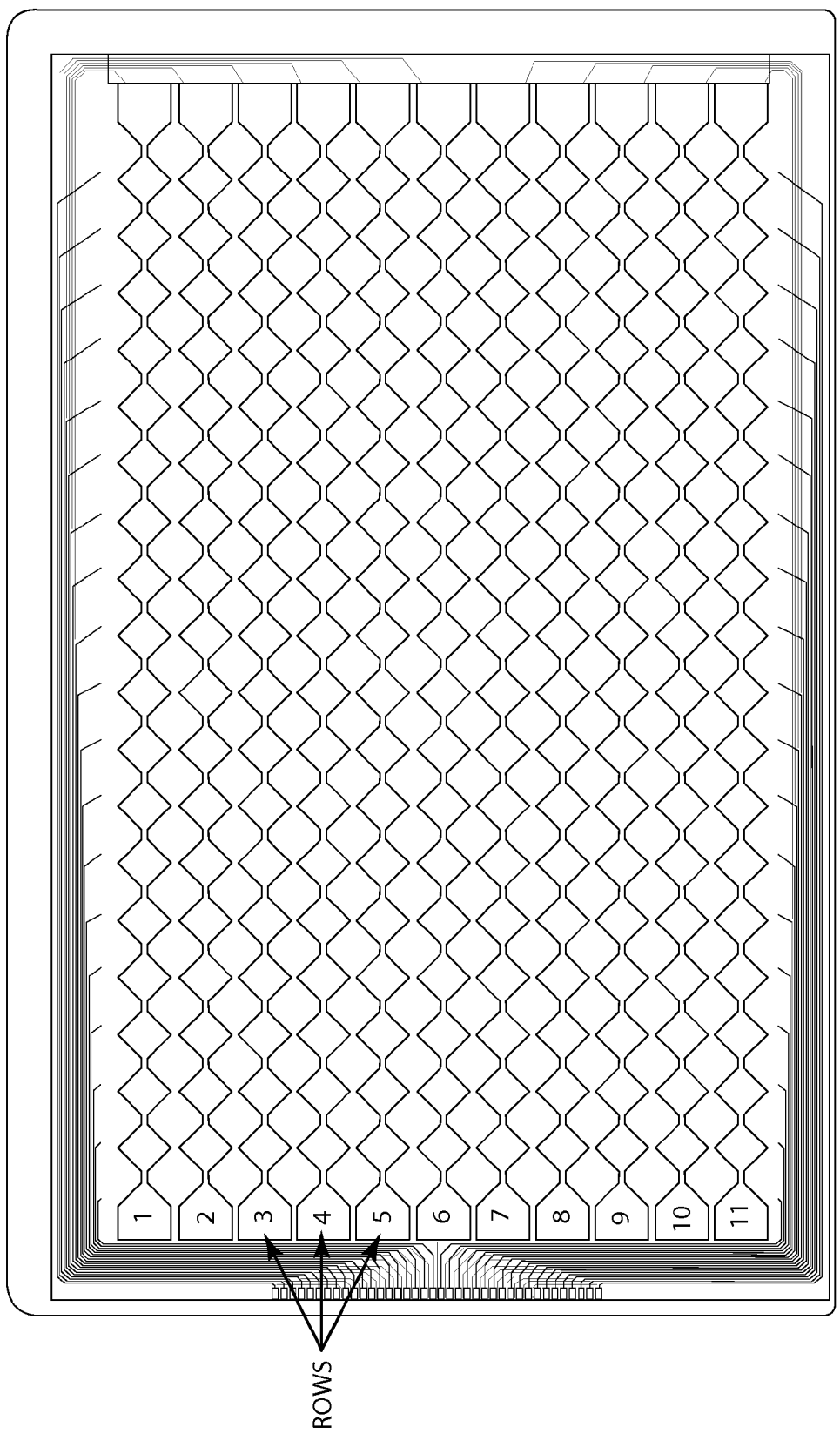
FIG. 82 is a top view of the touch sensor of FIGS. 79-80 including electrode rows.
Figure 83:
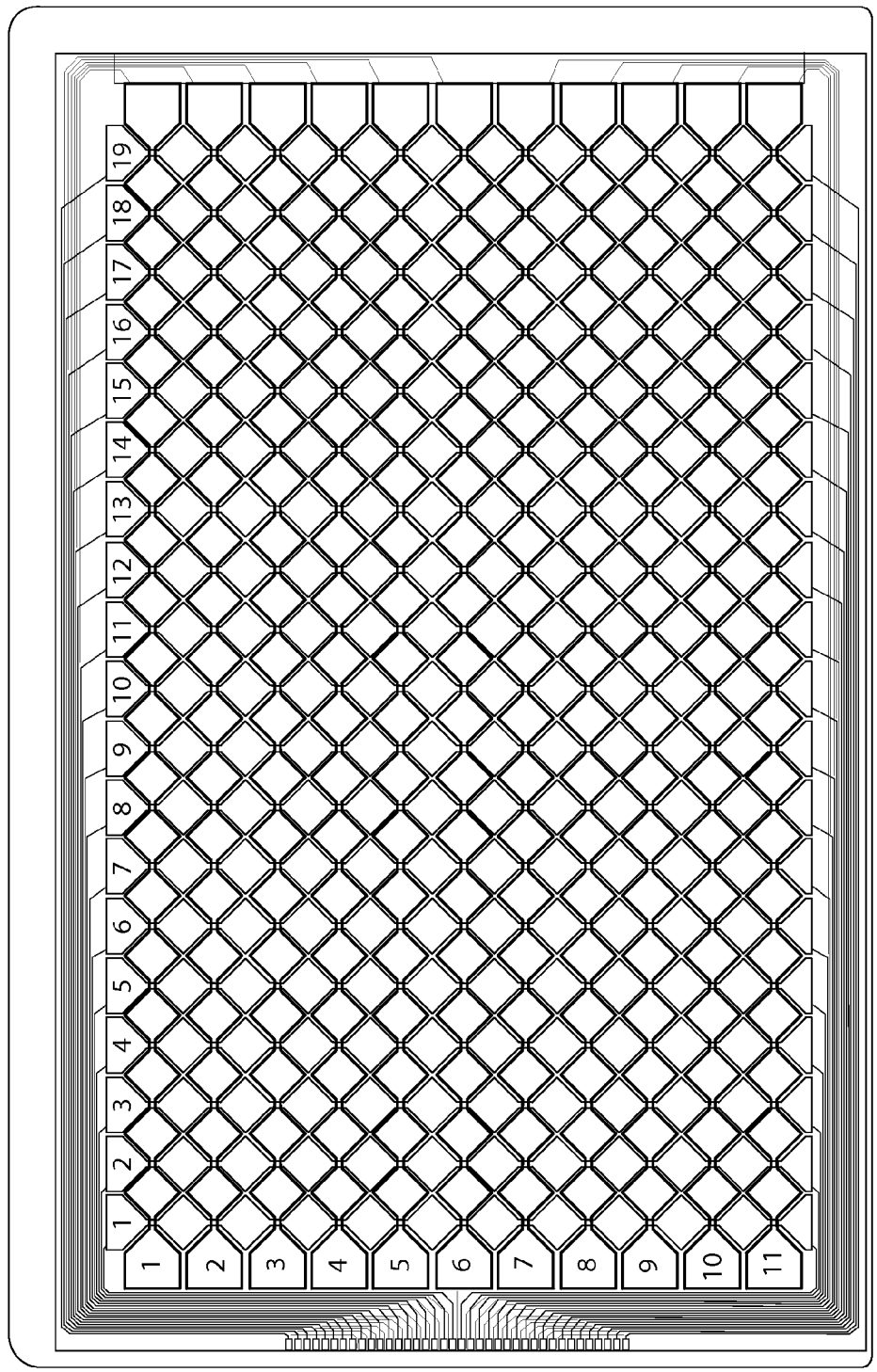
FIG. 83 is a top view of the touch sensor of FIGS. 79-80 including electrode columns and electrode rows.

FIGS. 79 through 85 illustrate a series of columns of electrodes 152 and rows of electrodes 154 that can be arranged to form a matrix 156 for detecting multiple points using time domain differential techniques as discussed previously. The matrix of electrodes 152, 154 may be opaque, translucent, or transparent and may be made of conductors, semiconductor, or resistive materials using screen printing, electro-less, electro-plating, or other techniques including embedding or assembling wires or other subassembly components on or into a carrier substrate. A construction of the matrix 156 can include a dielectric 158 interposed between the electrode columns 152 and the electrode rows 154. For example, the matrix 156 can include a conductive material such as printed silver epoxy on polyester or polycarbonate film or glass, copper on glass or printed circuit board, indium tin oxide (ITO) on polyester or polycarbonate film or glass, or carbon nano material deposited on films or glass. FIGS. 79 and 80 are side illustrations of how electric fields may be generated from the columns and rows by any of the techniques used to detect capacitance change including that which is described herein. The columns shown in the side view in FIGS. 79 and 80 are shown in a top view in FIG. 81 and likewise the rows shown in the side view in FIGS. 79 and 80 are shown in a top view in FIG. 82. FIG. 83 shows a combined view of the columns and rows in a top view.

Figure 84:
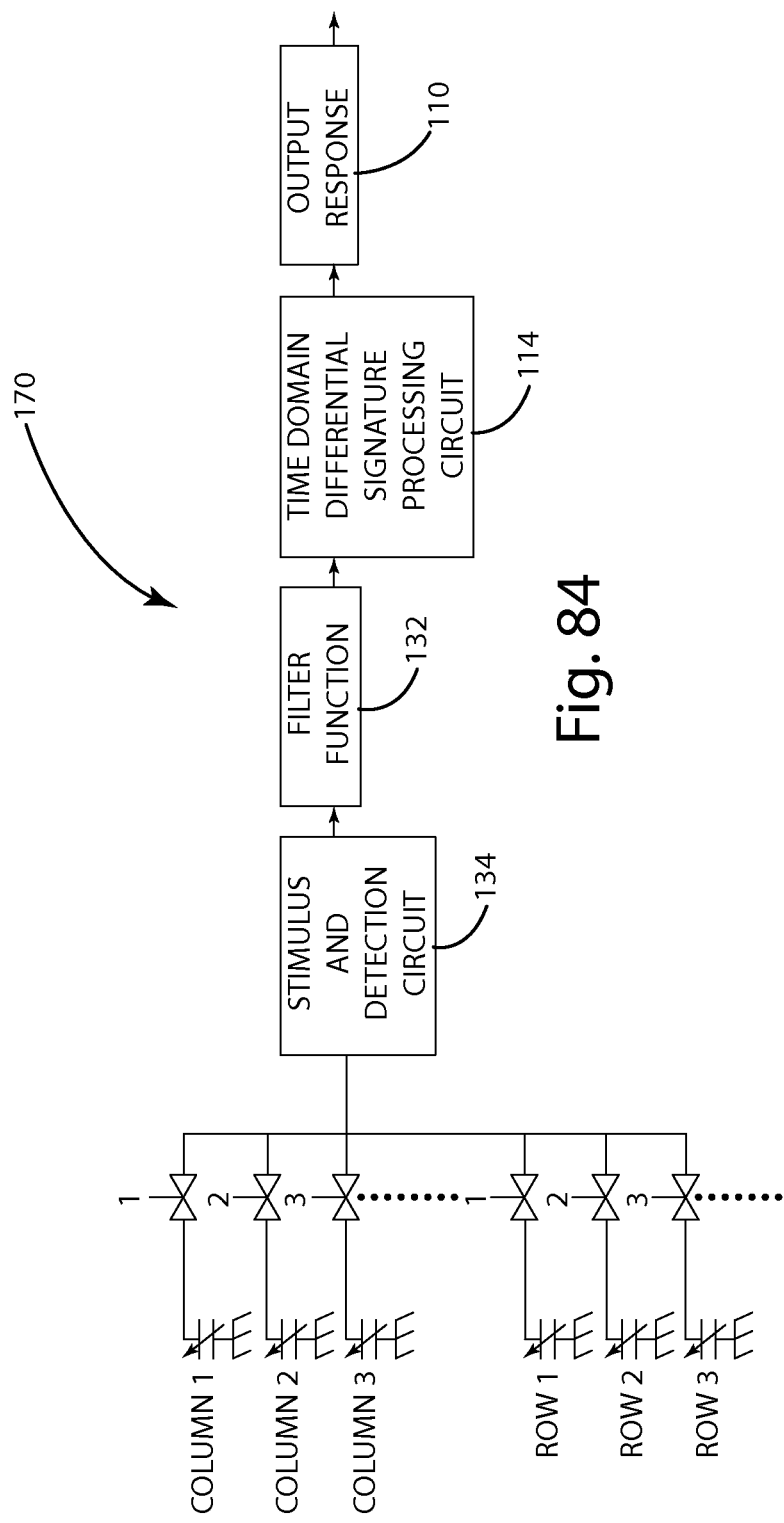
FIG. 84 is a circuit diagram of the touch sensor of FIG. 83 including a time domain differential signature processing circuit.
Figure 85:
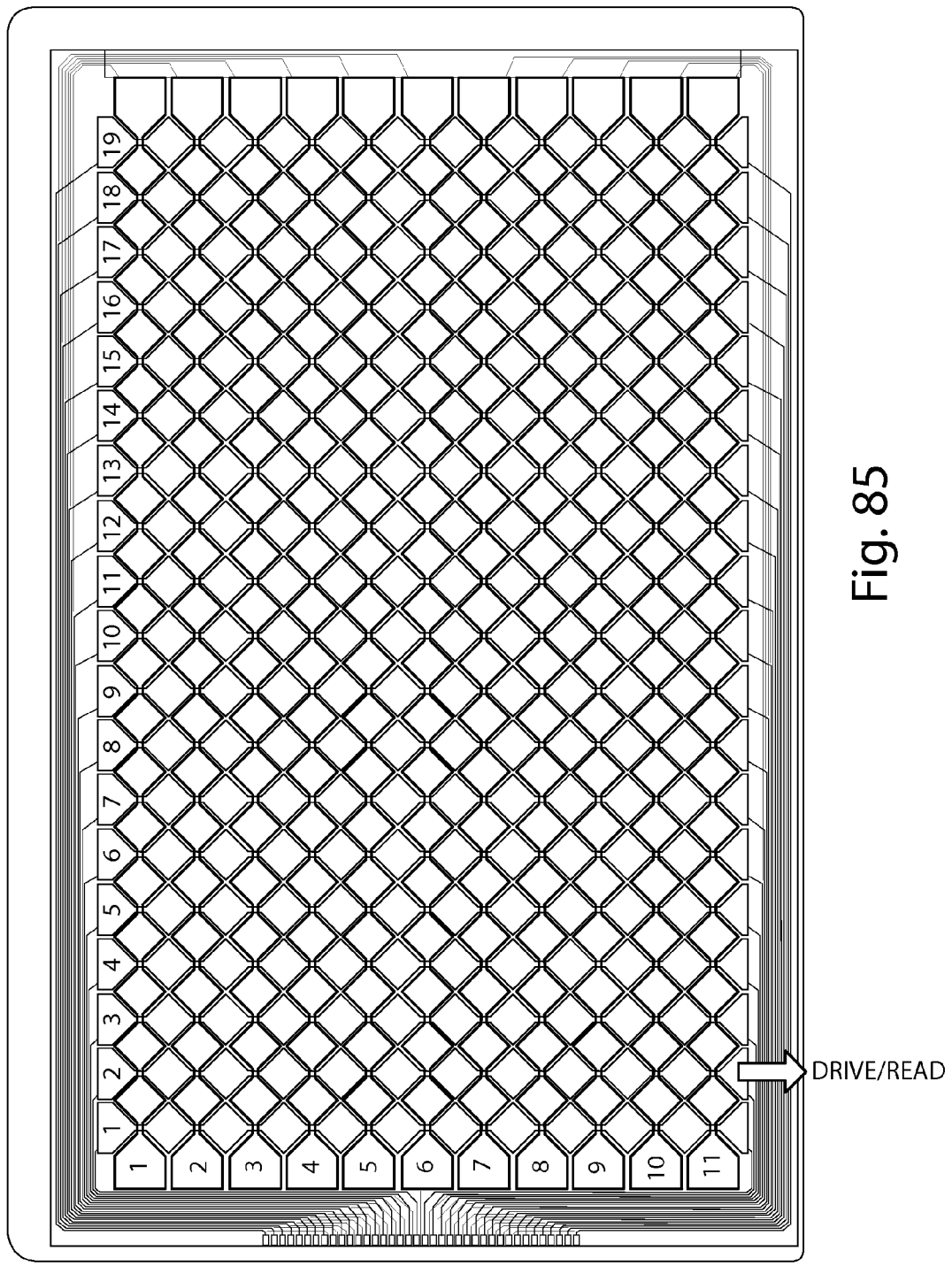
FIG. 85 is a top view of the touch sensor of FIG. 83 depicting a column being driven and read in accordance with an embodiment of the present invention.
Figure 86:
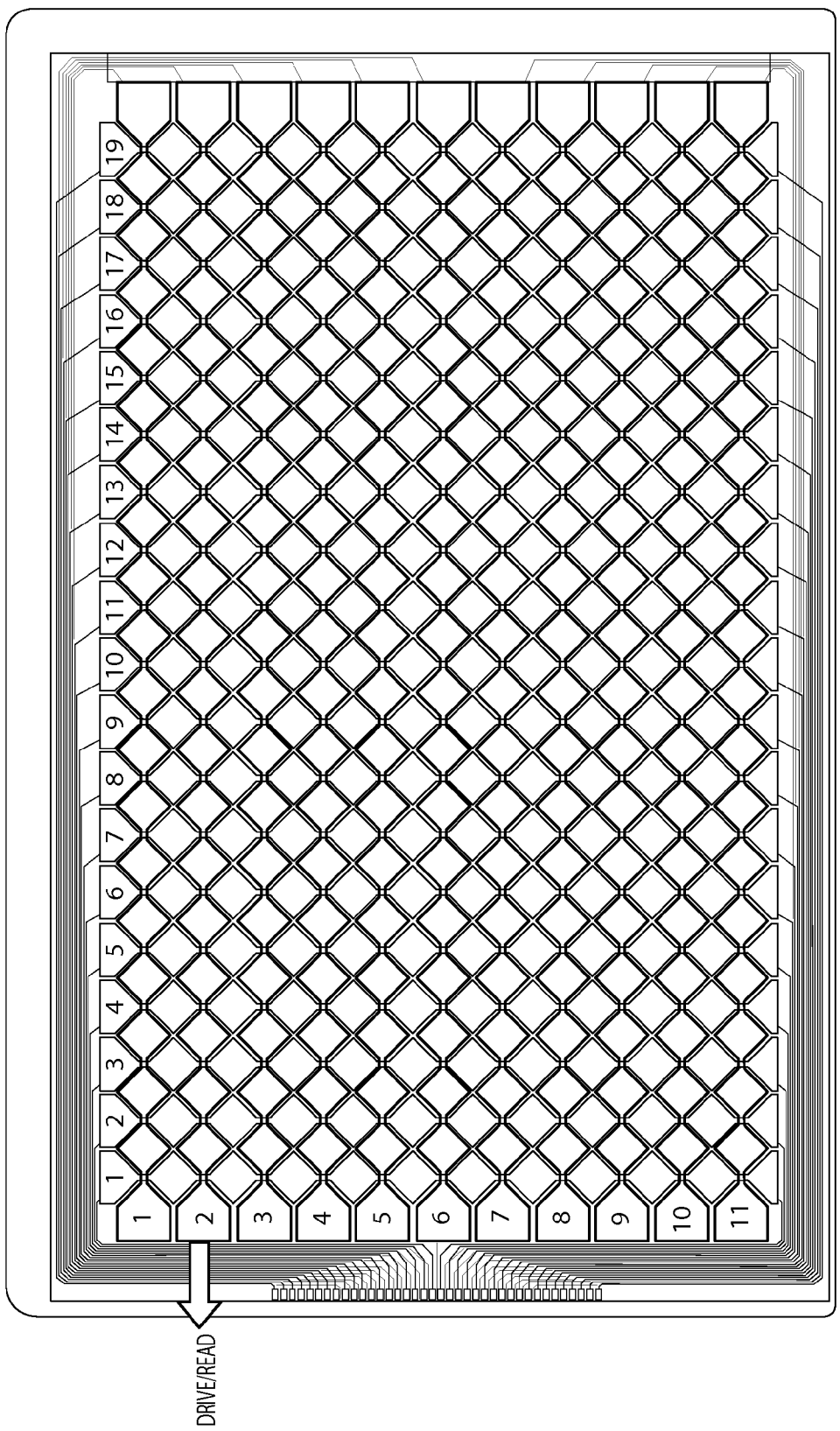
FIG. 86 is a top view of the touch sensor of FIG. 83 depicting a row being driven and read in accordance with an embodiment of the present invention.
Figure 87:
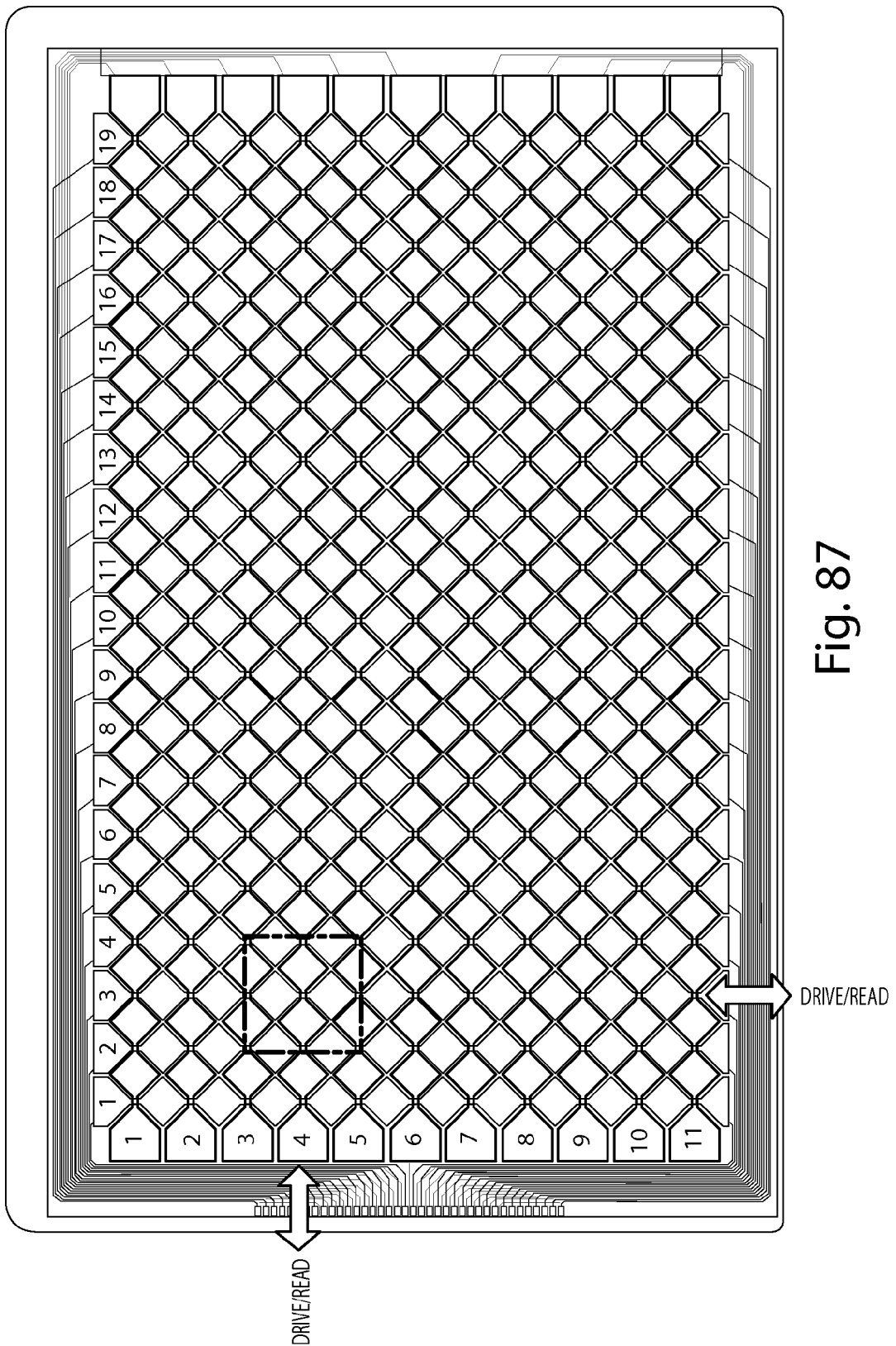
FIG. 87 is a top view of the touch sensor of FIG. 83 depicting a column and a row being driven and read in accordance with an embodiment of the present invention.
Figure 88:
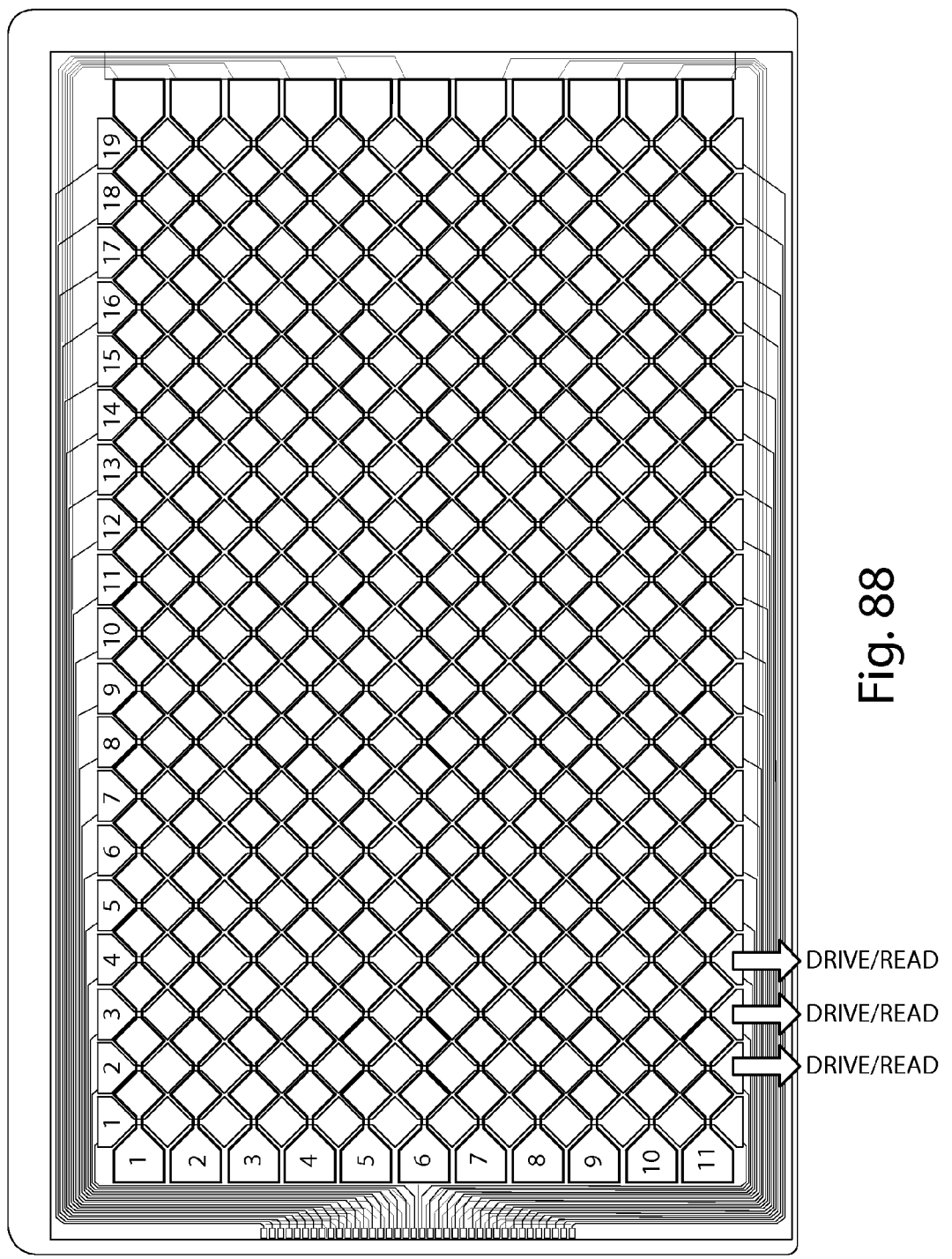
FIG. 88 is a top view of the touch sensor of FIG. 83 depicting multiple columns being driven and read in accordance with an embodiment of the present invention.
Figure 89:
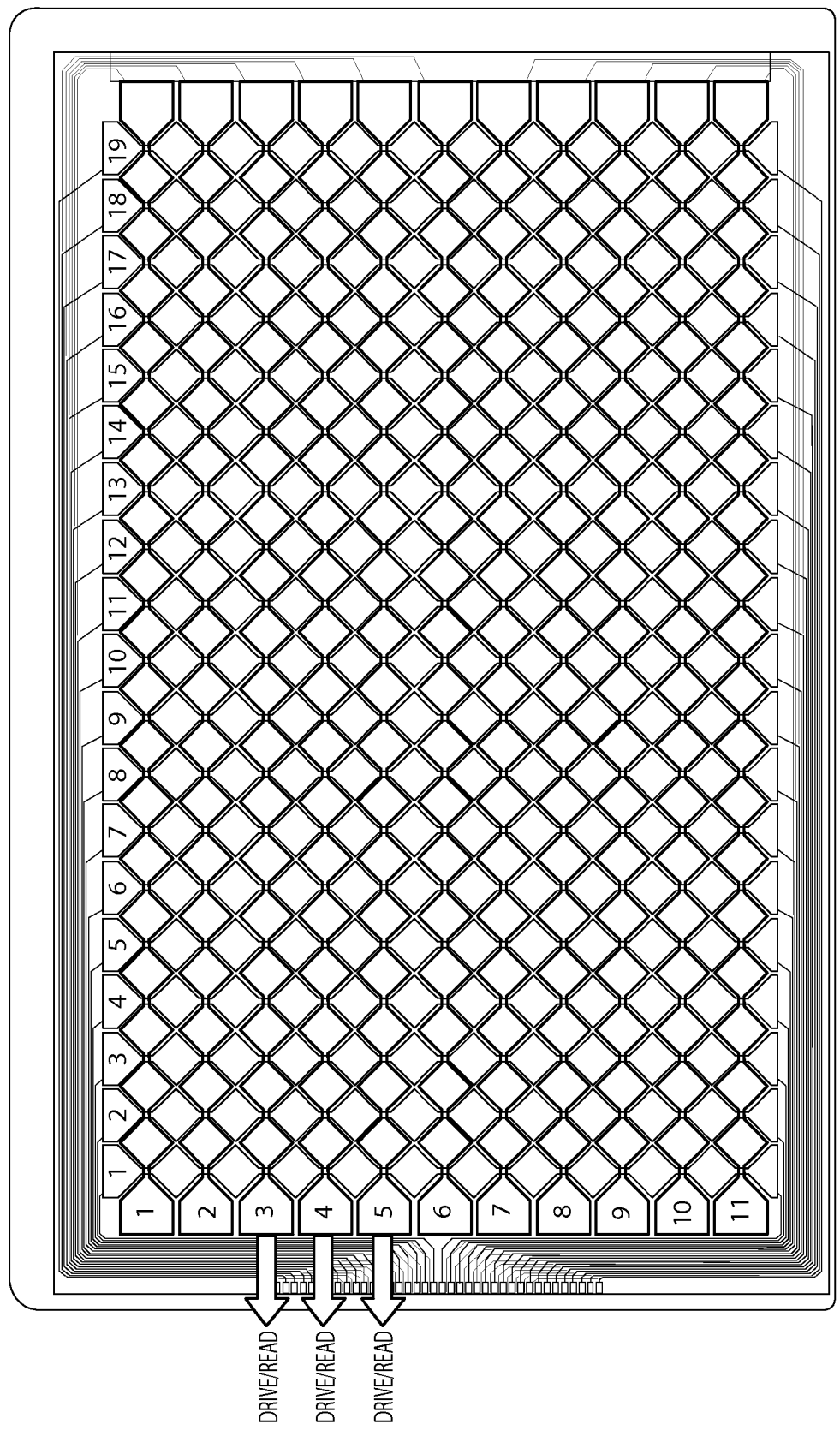
FIG. 89 is a top view of the touch sensor of FIG. 83 depicting multiple rows being driven and read in accordance with an embodiment of the present invention.
Figure 90:
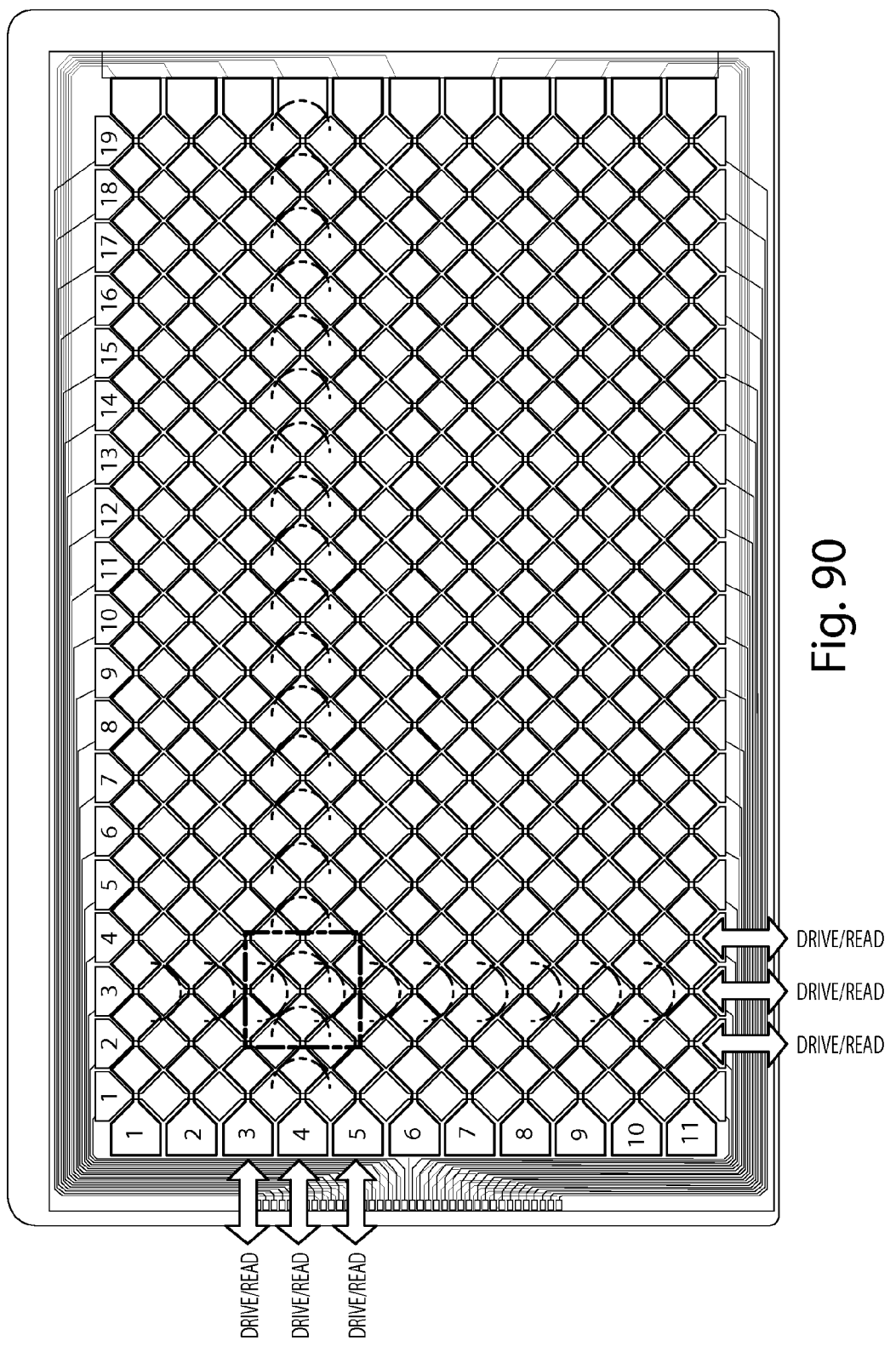
FIG. 90 is a top view of the touch sensor of FIG. 83 depicting multiple columns and rows being driven and read in accordance with an embodiment of the present invention.

FIG. 84 illustrates a basic sensing circuit 170 employing concepts as described earlier in FIGS. 59 and 60 but applied to the column/row matrix in FIGS. 79 through 85. This circuit 170 would sample each column 152 and then each row 154 then, using time domain differential sensing using the parameters as described previously, determine the appropriate touch signature for the desired output response. FIG. 85 illustrates a column that is driven and read using the circuit sampling technique in FIG. 84. As each column electrode is stimulated, electric fields similar to that shown in FIG. 79 will be generated. Similarly, FIG. 86 illustrates a row that is driven and read using the circuit sampling technique in FIG. 84. As each row electrode is stimulated, electric fields similar to that shown in FIG. 80 will be generated. Differential electrode sensing time domain differential sensing techniques may be used also, as described relating to FIGS. 60 through 63. FIGS. 88 through 90 illustrate how a "virtual" inner and outer electrode structure may be made by analyzing three column electrodes and three row electrodes. FIG. 88 illustrates the sensing of three columns of electrodes, each individually, using the circuit shown in FIG. 84. FIG. 89 illustrates the sensing of three rows of electrodes, each individually, using the circuit shown in FIG. 84. The integrating of the outer most columns and outer most rows of electrodes, a virtual outer electrode is created. The integrating of the inner most column electrode and inner most row electrode and virtual inner electrode is created. The difference of the virtual inner and virtual outer electrode creates the basic attributes of the differential electrode structure in show in FIGS. 61 and 62. The location is known the virtual electrode in the matrix by know the address of the electrodes for the columns and rows when taking the measurements. This is illustrated in the shaded area at the intersection of the column electrodes and row electrodes in FIG. 90.

Figure 20:
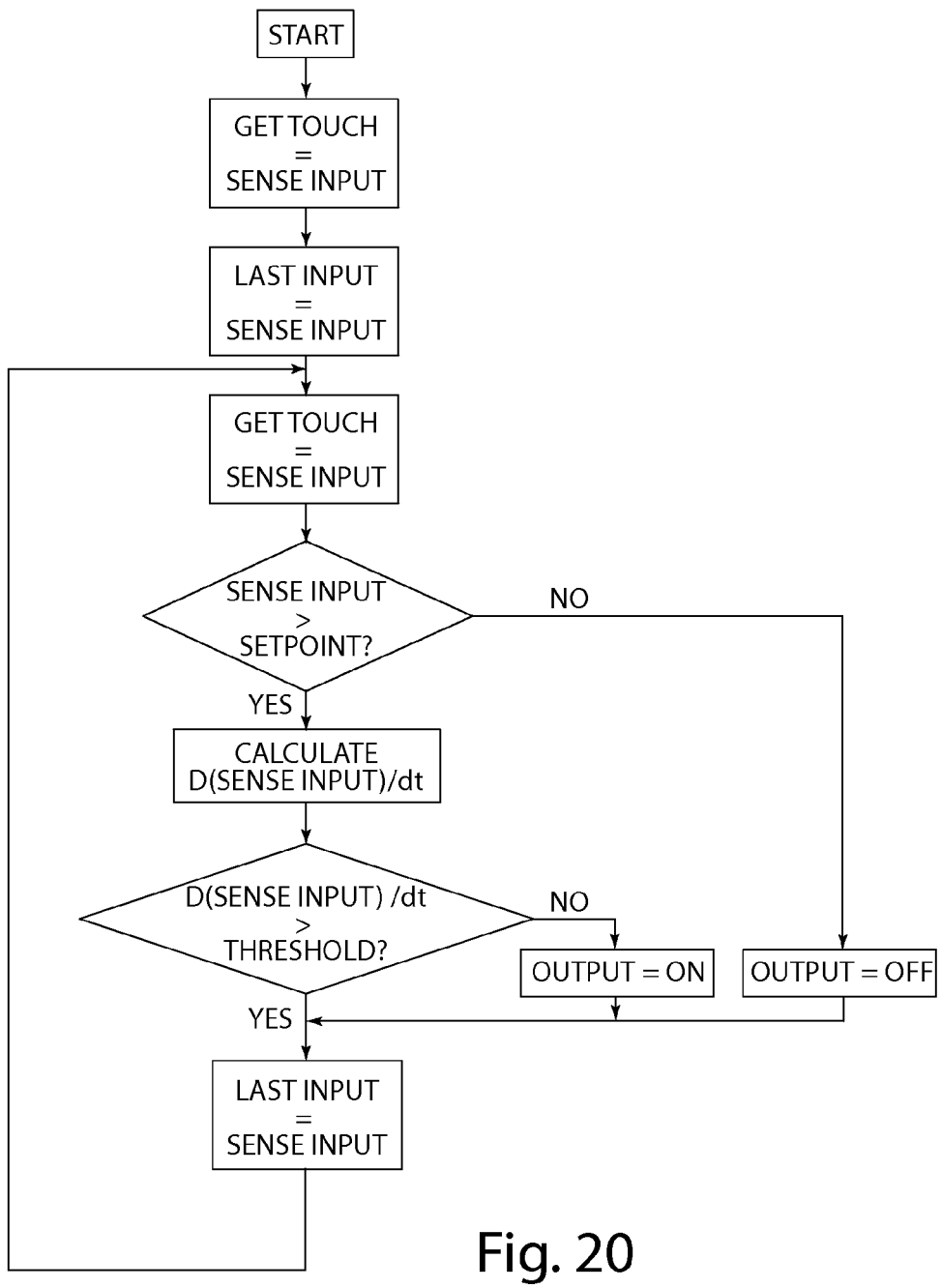
FIG. 20 is a flow chart illustrating operation of the touch sensor illustrated in FIG. 16.
Figure 21:
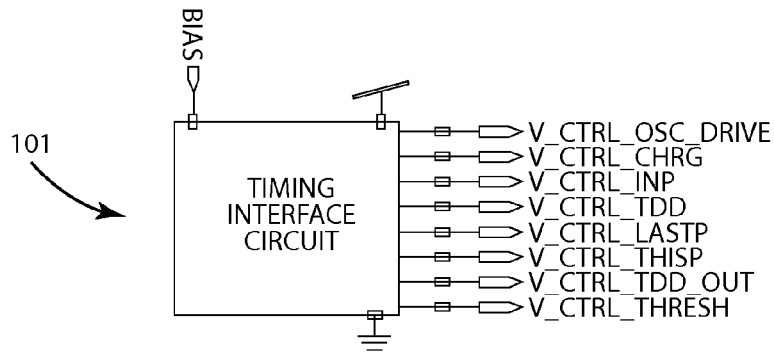
FIG. 21 is a block diagram of a timing interface circuit for the touch sensor illustrated in FIG. 16.
Figure 22:
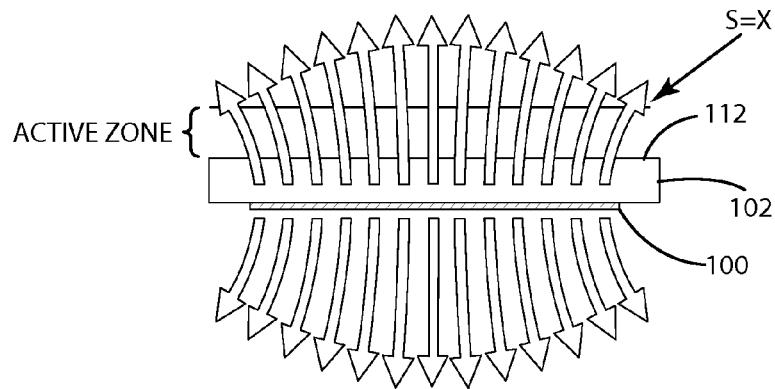
FIG. 22 is a touch sensor including an active zone for determining if a stimulus (S) is greater than a proximity threshold (X)
Figure 91:
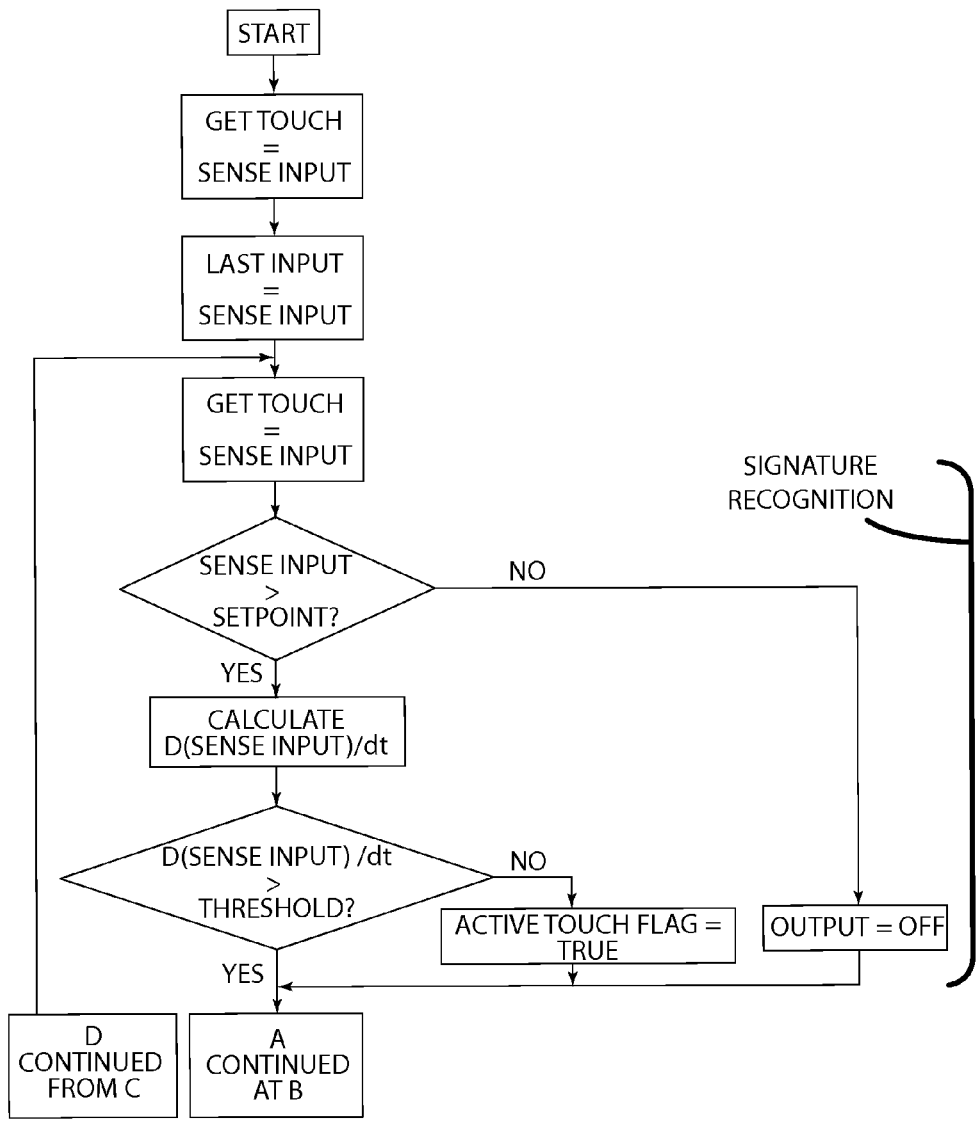
FIG. 91 is a first flow chart illustrating operation of the touch sensor of FIG. 83 in accordance with an embodiment of the present invention.
Figure 92:
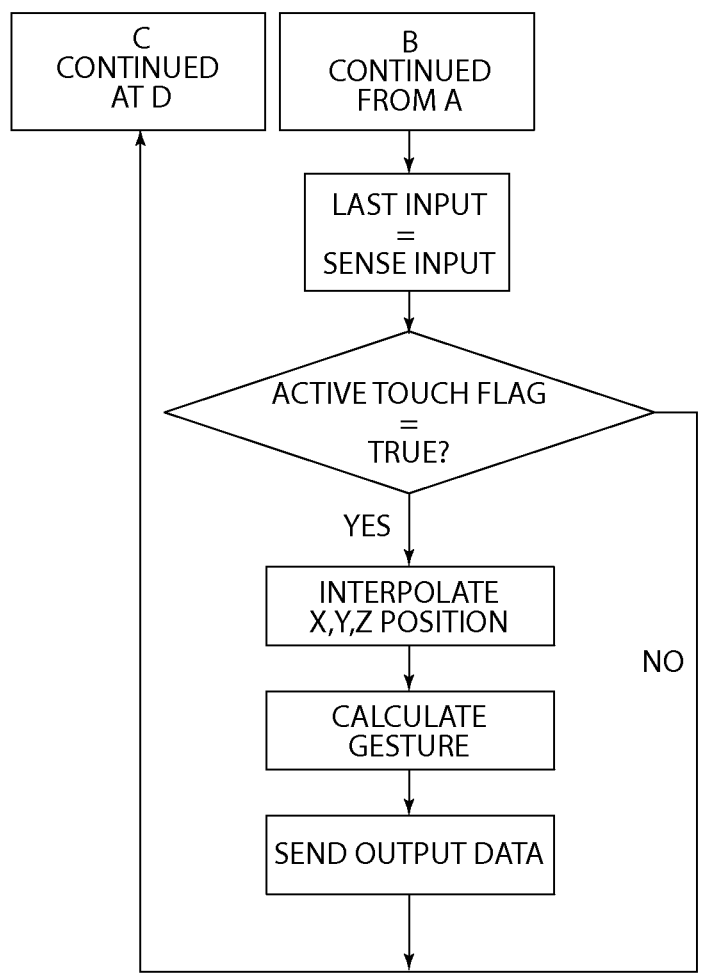
FIG. 92 is a flow chart continuing from the flow chart of FIG. 91.
Figure 93:
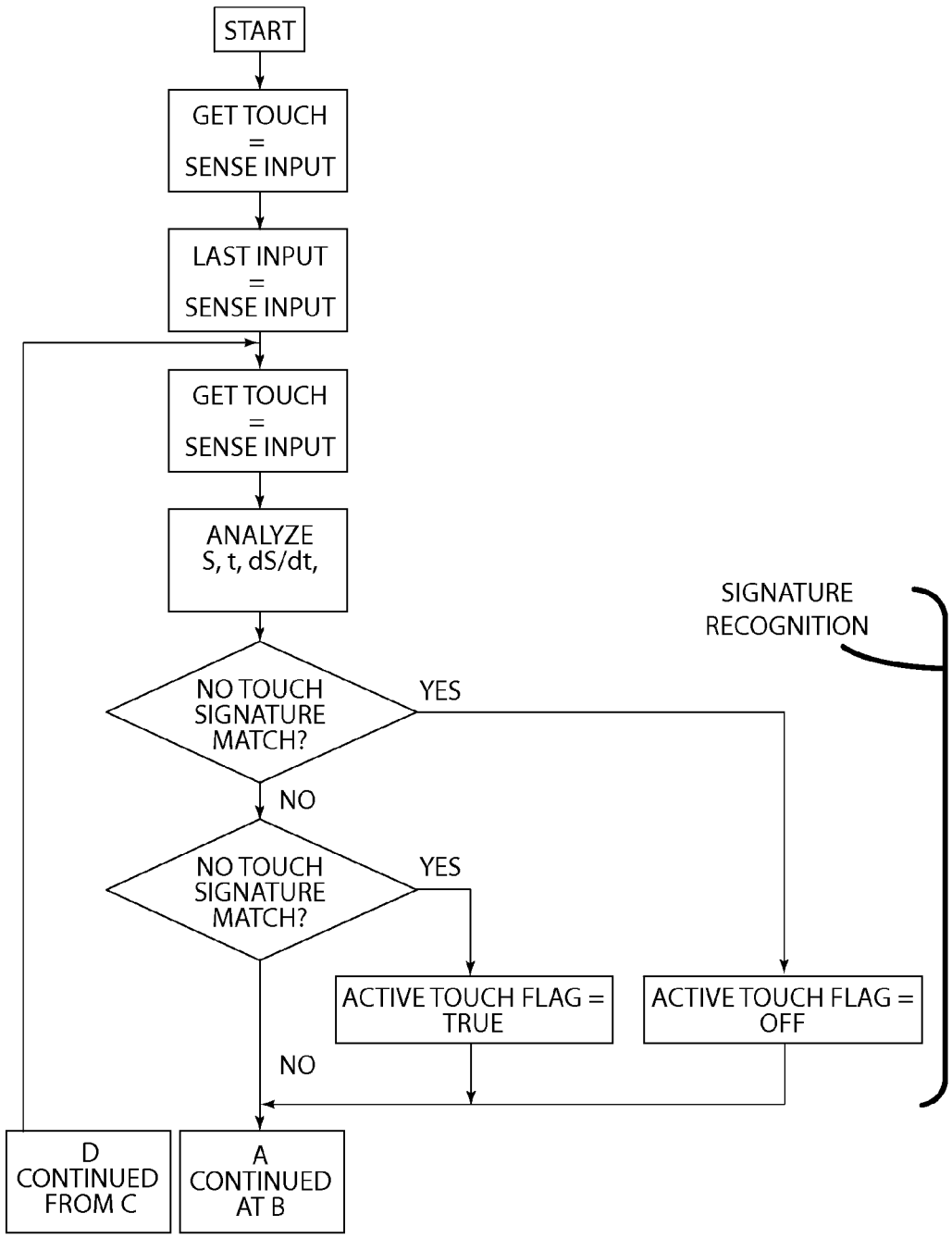
FIG. 93 is a second flow chart illustrating operation of the touch sensor of FIG. 83 in accordance with an embodiment of the present invention.
Figure 94:
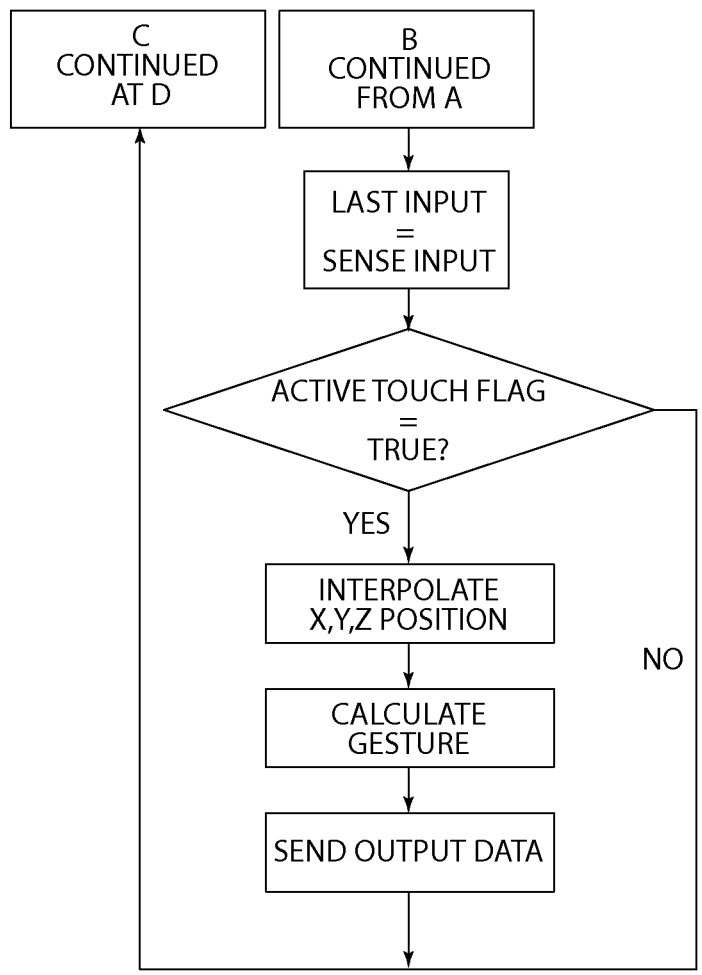
FIG. 94 is a flow chart continuing from the flow chart of FIG. 93.

FIGS. 91 and 92 illustrate a flow chart that is similar in operation to that described in FIG. 20. The additional criteria of interpolating the location of an input located between the electrode columns and rows after a touch signature is detected. The flow chart in FIGS. 91 and 92 show the signature of a basic touch input. The interpolation of a touch location is not performed until after a touch signature is recognized. Similar to conventional capacitance sensors for single buttons that use a predetermined threshold value to determine a touch and with the resultant deficiencies described earlier, projected capacitance touch screens that use predetermined threshold values to determine a touch also have similar issues. By using time domain differential techniques as described herein the benefits of single input touch electrodes can be used to improve the performance of touch screens, mouse pads, and other high resolution/high input devices. The matrix touch input device shown in FIG. 90 would have at least 209 single inputs. The matrix with interpolation would approach the same resolution as that of a typical capacitance touch screen but with the added benefit of accurate touch input with a bare finger without a glove on or a finger with a glove on as well as the other features such as unique signature definition for touch that would then trigger the interpolation of the location. The flow chart in FIGS. 91 and 92 can be modified in a variety of ways. For instance all of the data for all of the electrodes could be sampled and stored and then analyzed for touch signature and if there is a valid touch signature match then interpolation and gesture recognition. FIGS. 91 and 92 illustrate the sample of one electrode at a time for a valid touch input and in the event there is then interpolation and gesture recognition is deciphered. FIGS. 93 and 94 illustrate the concept of looking for a match of a touch signature match as well as a match for a non-touch signature. This concept illustrates that in some case the very touch signature using the parameters and techniques described herein that time domain differential sensing techniques may be considered fundamental in gesturing at the touch deciphering level.

Figure 95:
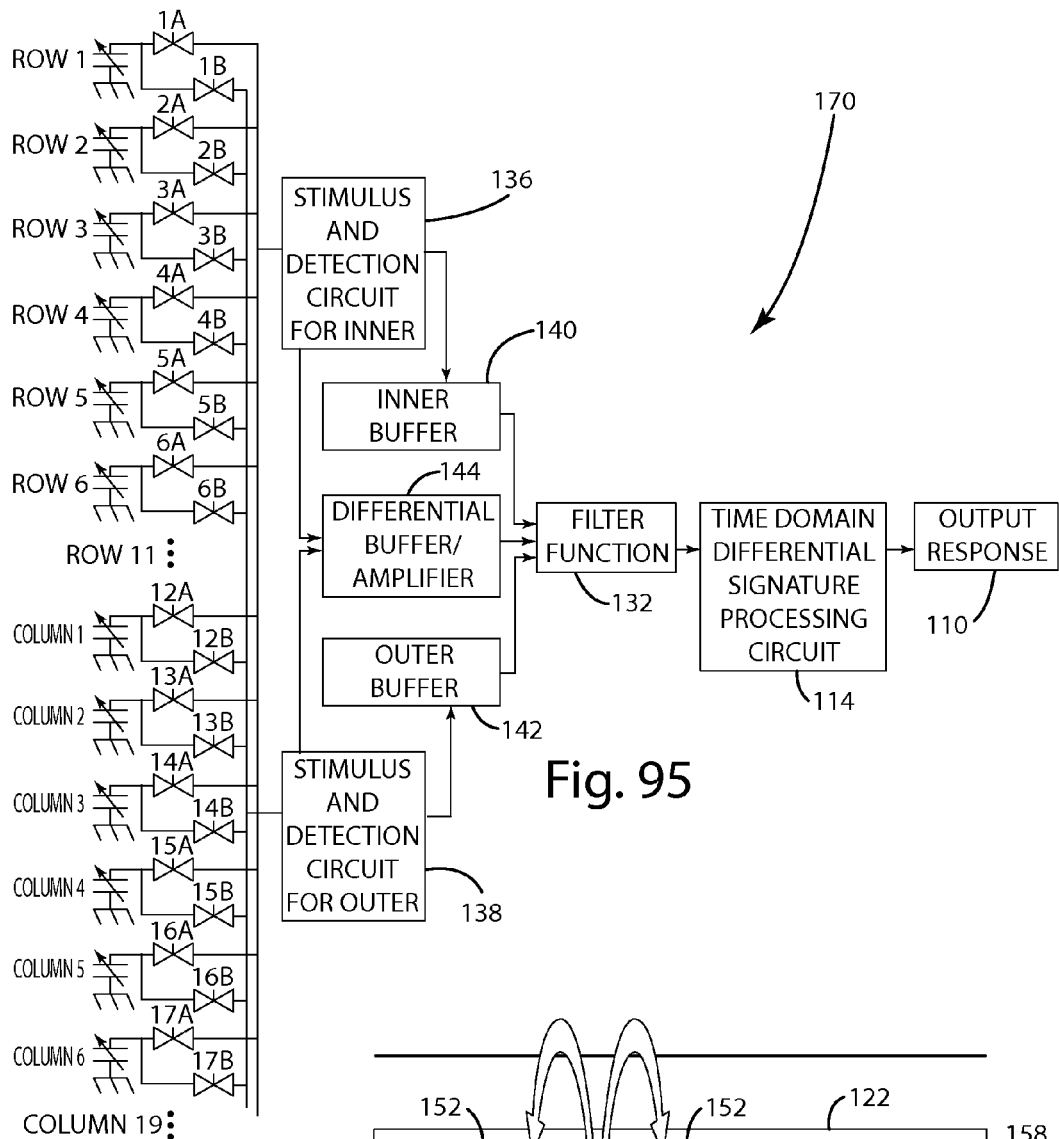
FIG. 95 is a circuit diagram of the touch sensor of FIG. 83 including a filter function and a time domain differential signature processing circuit.

FIG. 95 illustrates a modified version of the circuit shown in FIG. 84 for simultaneously stimulating three electrodes at a time for columns and rows. For instance, switches 13B and 15B would be selected to route Columns 2 and 4 to the Stimulus and Detection Circuit for Outer circuit block 138 and 14A would be selected to route Column 3 to the Stimulus and Detection Circuit for Inner circuit block 136.

The absolute value and the differential signal would be processed and sent to the Filter Block 132 and the Time Domain Differential Signature Processing Circuit 114. The benefits of simultaneously measuring the electrodes would be beneficial in like manner as described previously as associated with FIG. 64. Likewise and similarly, Rows 3, 4, and 5 can be measured by selecting switches 3B, 5B, and 4A to Rows 3, 4, and 5 respectively. Again, the addressing of the columns and rows will determine virtual touch zone for the matrix sensor 170.

Figure 96:
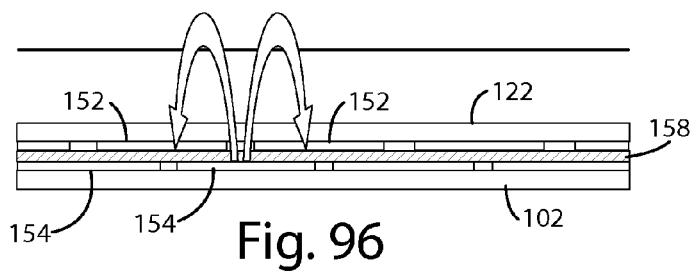
FIG. 96 is a first side view of the touch sensor of FIG. 83 illustrating a net electric field.
Figure 97:
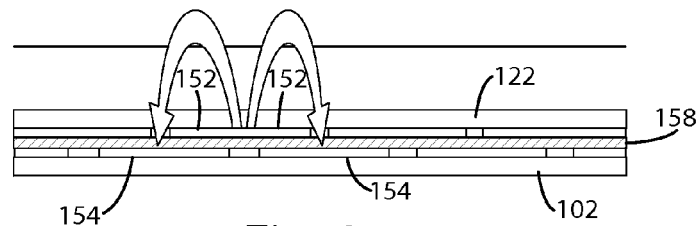
FIG. 97 is a second side view of the touch sensor of FIG. 83 illustrating a net electric field.
Figure 98:
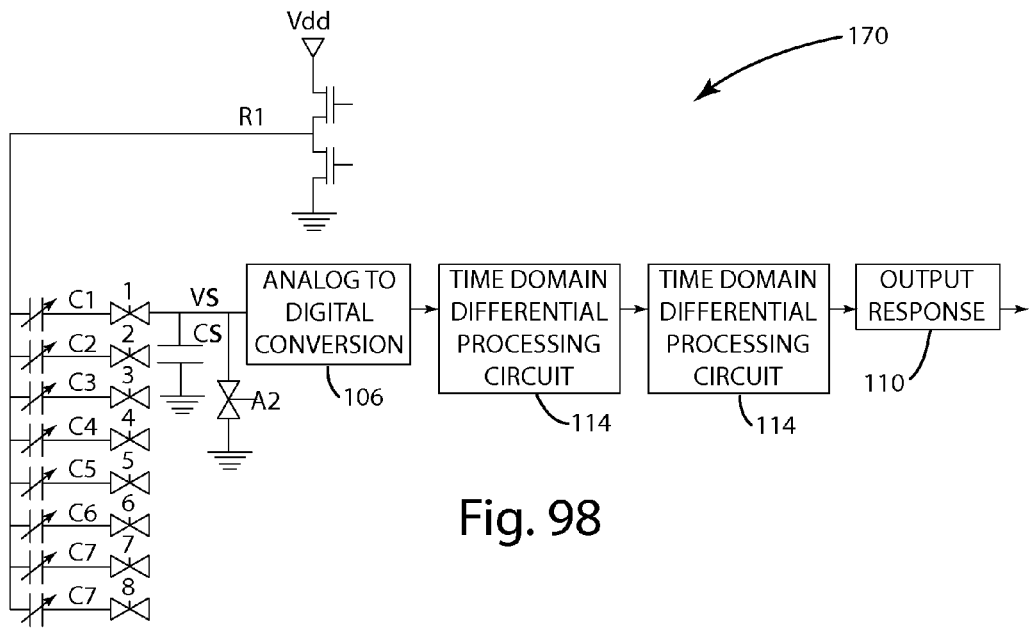
FIG. 98 is a circuit diagram for a circuit adapted to strobe column electrodes and read row electrodes.
Figure 99:
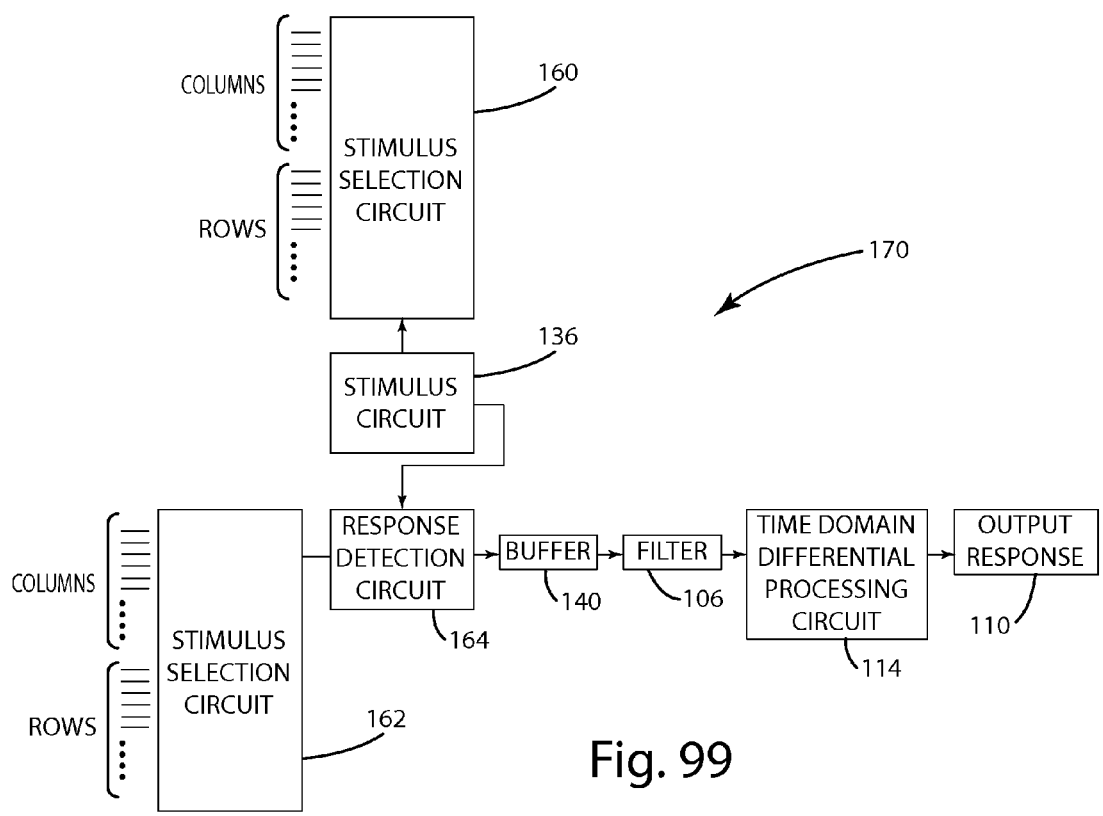
FIG. 99 is the circuit diagram of FIG. 98 modified to include a stimulus selection circuit to route a response from a row or column to a response detection circuit.

FIGS. 96 and 97 illustrates side views of a matrix touch sensor 170, similar to that described in FIGS. 35 through 40, except as applied in a column and row matrix. FIG. 96 illustrates coupling from the Row electrode 154 to the Column electrode 152 by strobing the row electrode 154 and then looking for responses on the columns 152. Conversely, FIG. 97 illustrates coupling from the Column electrode 152 to the Row electrodes 154 by strobing the Column electrode 152 and then looking for a response on the Row electrodes 154. FIG. 98 is a circuit for stimulating a column and then reading the responses on a row R1. One could strobe only columns and read rows or only strobe rows and read columns but to increase robustness doing both can increase the robustness. FIG. 99 illustrates the circuit in FIG. 98 with the added provisions of a stimulus selection circuit 160, 162 for routing the stimulus to any of the rows or columns, individually. Likewise, FIG. 99 illustrates the basic circuit in FIG. 98 with the added provision of a selection circuit for routing the response from any of the rows or columns to the response detection circuit 164. The flow charts shown in FIGS. 91 through 94 would be applied as described above to determine if there is an initiating touch signature event, interpolation, and gesture recognition, and the column/row and/or row/column selection can determine the location of the touch in the matrix.

Figure 100:
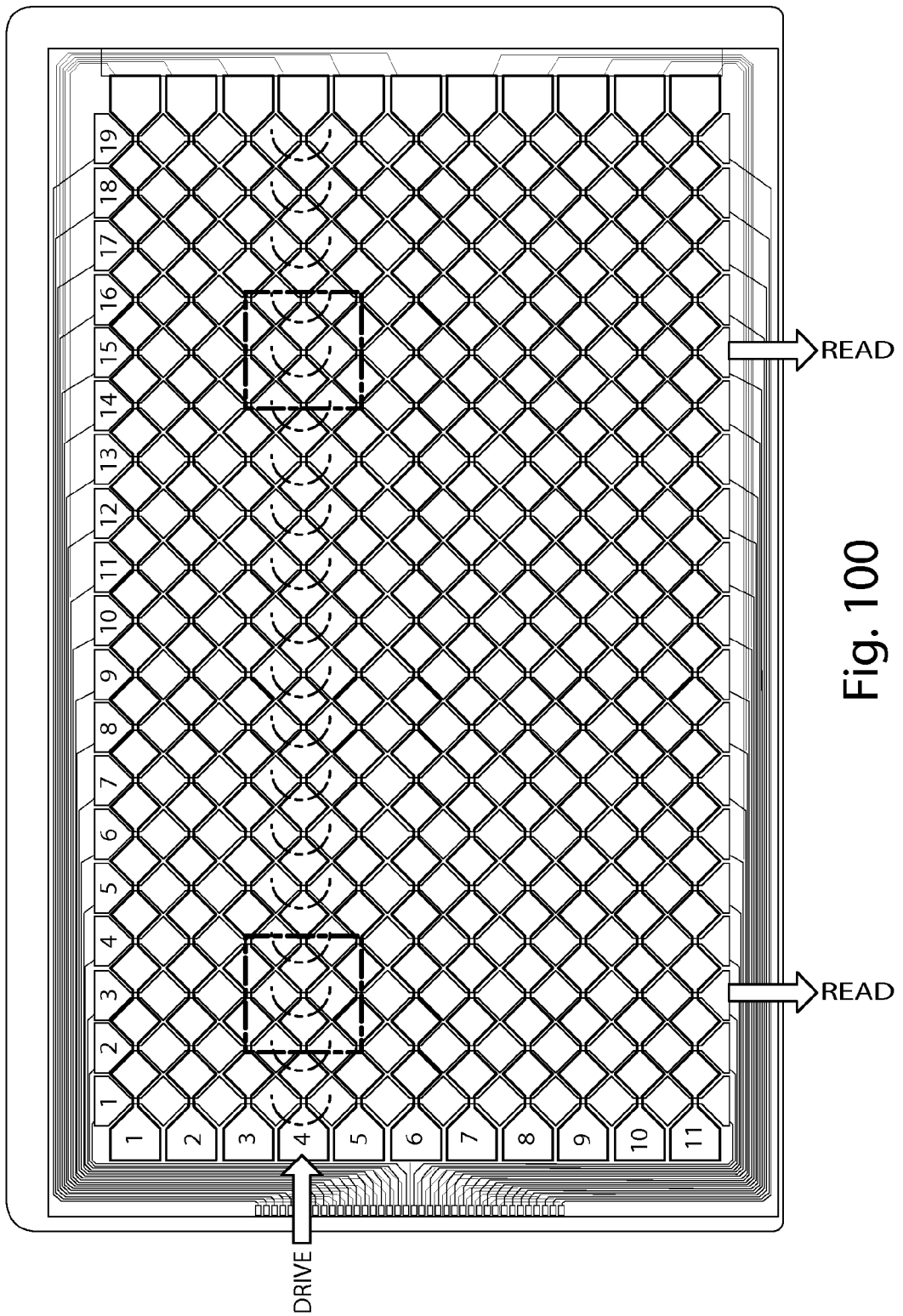
FIG. 100 is a top view of the touch sensor of FIG. 83 depicting the strobing of a single row and the reading of two columns.
Figure 101:
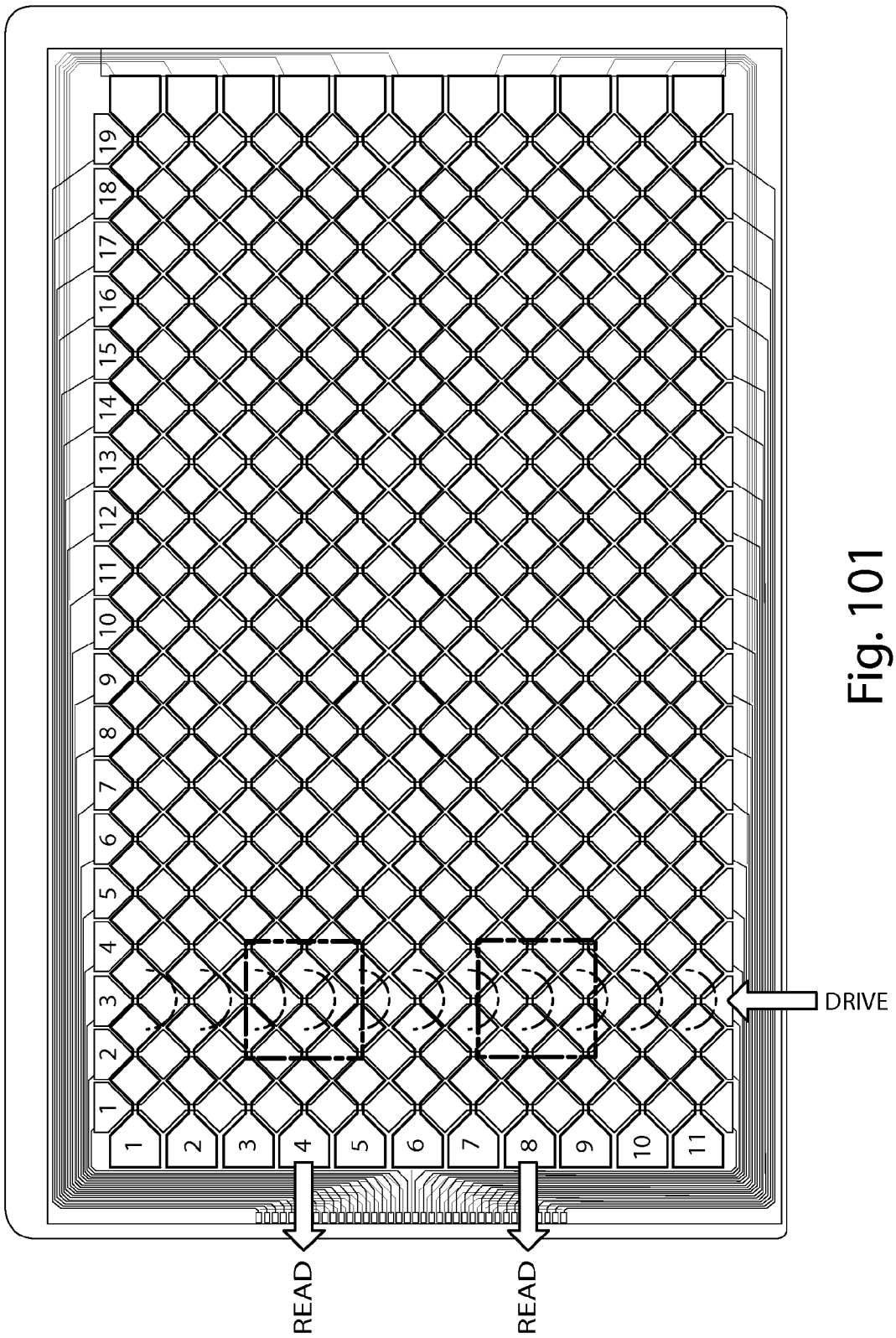
FIG. 101 is a top view of the touch sensor of FIG. 83 depicting the strobing of a single column and the reading of two rows.
Figure 102:
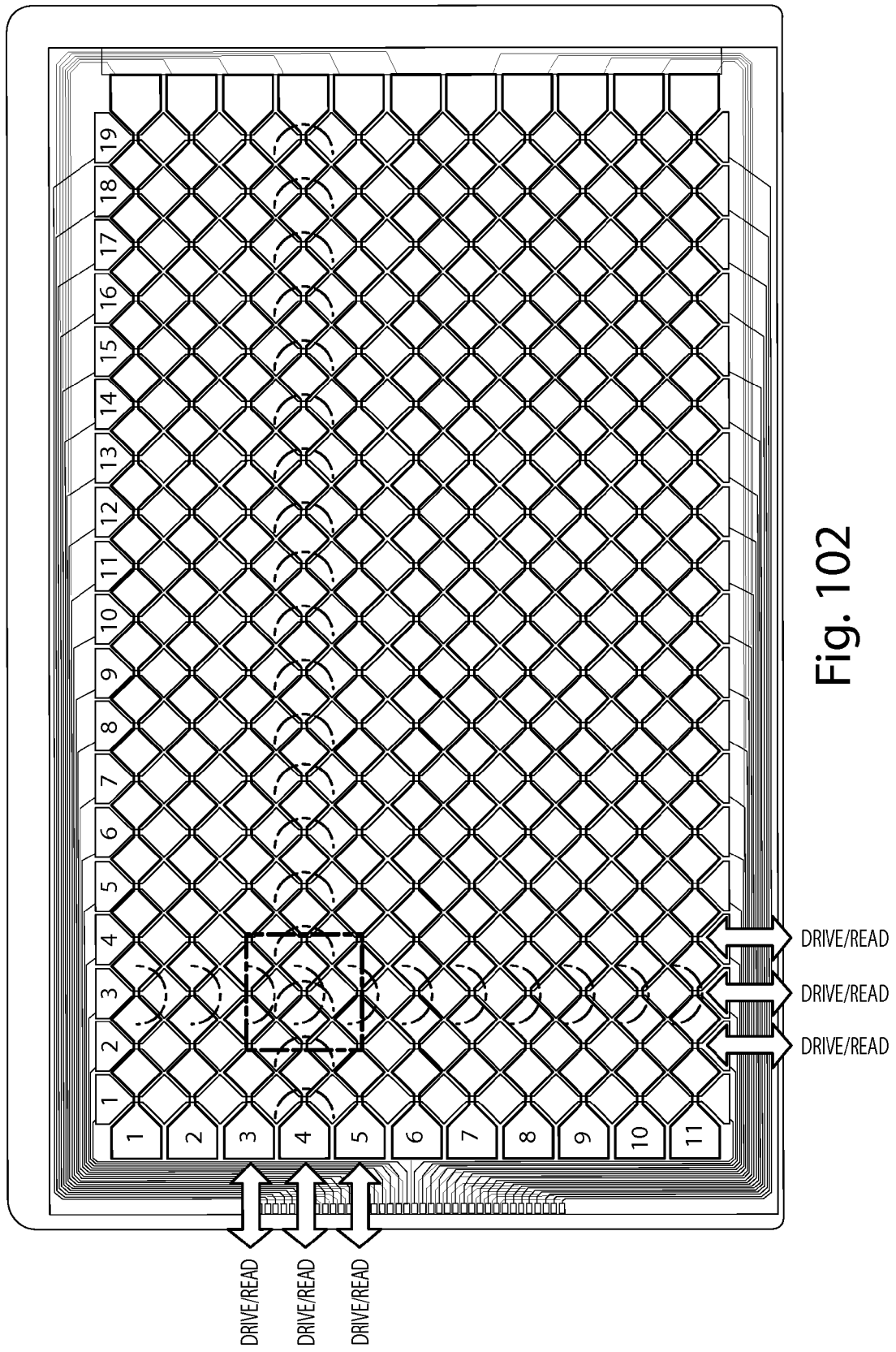
FIG. 102 is a top view of the touch sensor of FIG. 83 depicting the strobing of multiple rows and the reading of multiple columns and vice versa.
Figure 103:
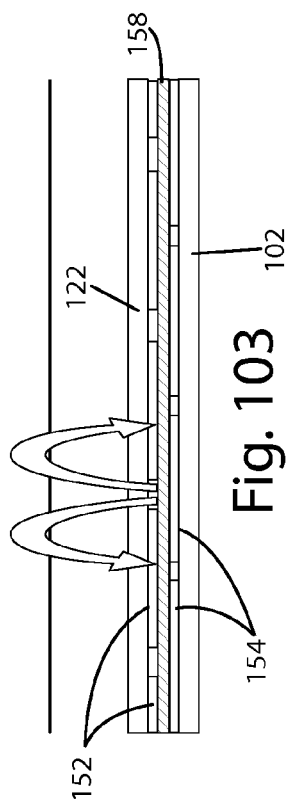
FIG. 103 is a side view of a touch sensor including an electrode column coupled to adjacent electrode rows.
Figure 104:
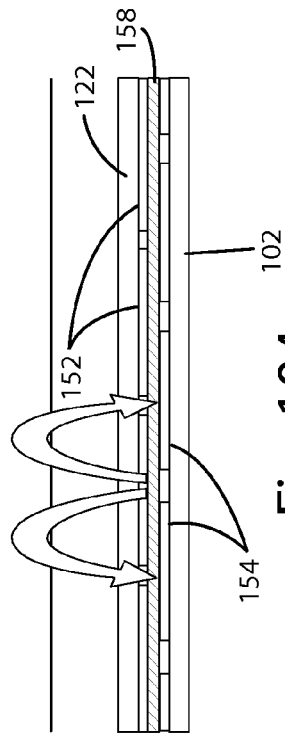
FIG. 104 is a side view of a touch sensor including an electrode row coupled to adjacent electrode columns.

FIG. 100 illustrates the individual selection of a row for strobing and the reading of two columns. All columns could be read simultaneously with one strobe but a more cost efficient method would be to strobe the same row while then measuring an individually selected column. The process would repeat until all of the columns and their responses are measured, albeit at the expense of processing time. Note that one row stimulus can be used to detect two separate touch responses along separate columns. FIG. 101 illustrates conversely the strobing of a column while individually selecting and reading the responses of rows. Note again that there can be two responses from two different rows with the stimulus of one strobing one column. FIG. 102 illustrates the common intersection of a touch input that would be common to both strobing rows and reading column responses and the strobing of columns and the reading of row responses in FIGS. 100 and 101. Also in this technique of sampling, each column/row and/or row/column combination is individually sampled. Even though sampling is done selecting individually, the techniques of differential sensing may be used similar to that described earlier.

Figure 105:
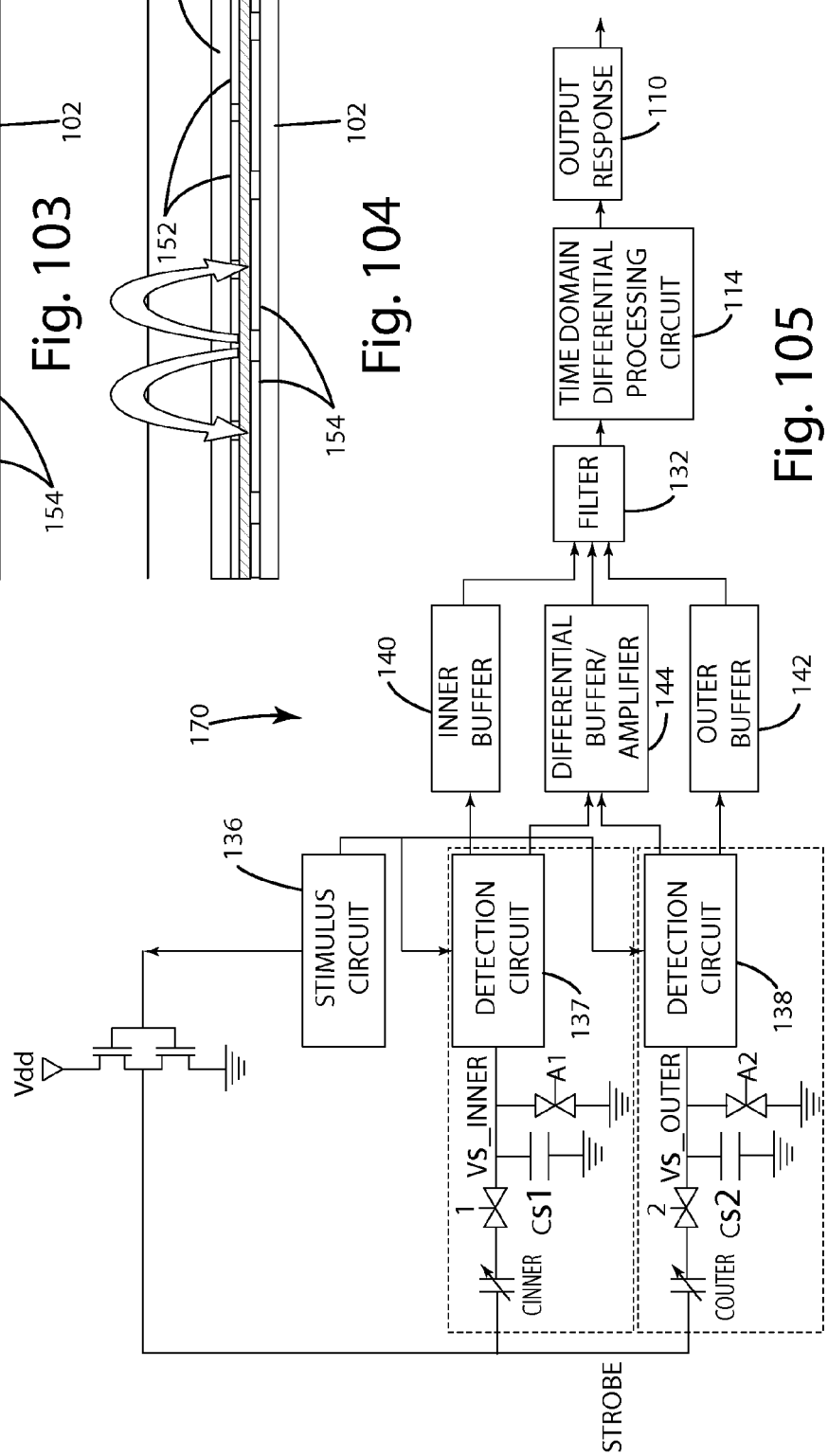
FIG. 105 is a circuit diagram of the touch sensors of FIGS. 103-104 including a time domain differential processing circuit.
Figure 106:
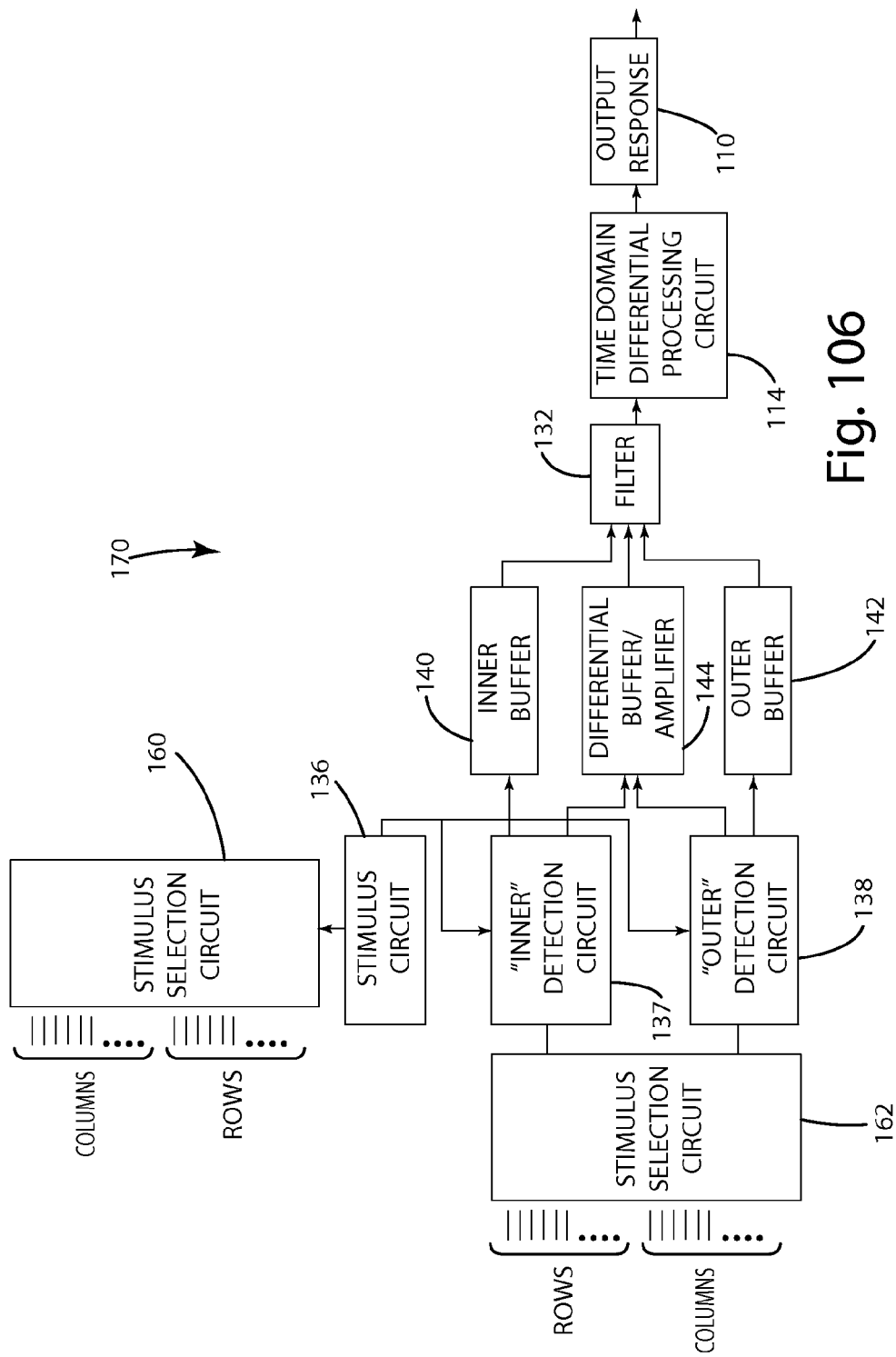
FIG. 106 is the circuit diagram of FIG. 105 modified to include stimulus selection circuits to route a response from a row or column to one of two detection circuits.

An additional differential sensing technique may be implemented as described in FIGS. 103 through 109. The basic strobe/sense technique as described in FIGS. 96 through 102 are used with the exception that instead of reading the responses from selected individual columns 152 and/or rows 154, groups of three selected columns and/or rows are made simultaneously and then processed per FIGS. 105 and 106. FIG. 105 illustrates a technique as related to FIGS. 36 and 37 and FIGS. 69 through 71. When selecting any three columns or any three rows for responses, the outermost columns or outermost rows are selected simultaneously and routed to the Outer Detection Circuit 138 where the output is sent to the Outer Buffer 142 and Differential Buffer/Amplifier 144 for processing later by the Time Domain Differential Processing Circuitry 144. In addition, the innermost row or innermost column is selected and routed to the Inner Detection Circuit 137 where the output is sent to the Inner Buffer 140 and Differential Buffer/Amplifier 144 for processing later by the Time Domain Differential Processing Circuitry 144.

Figure 107:
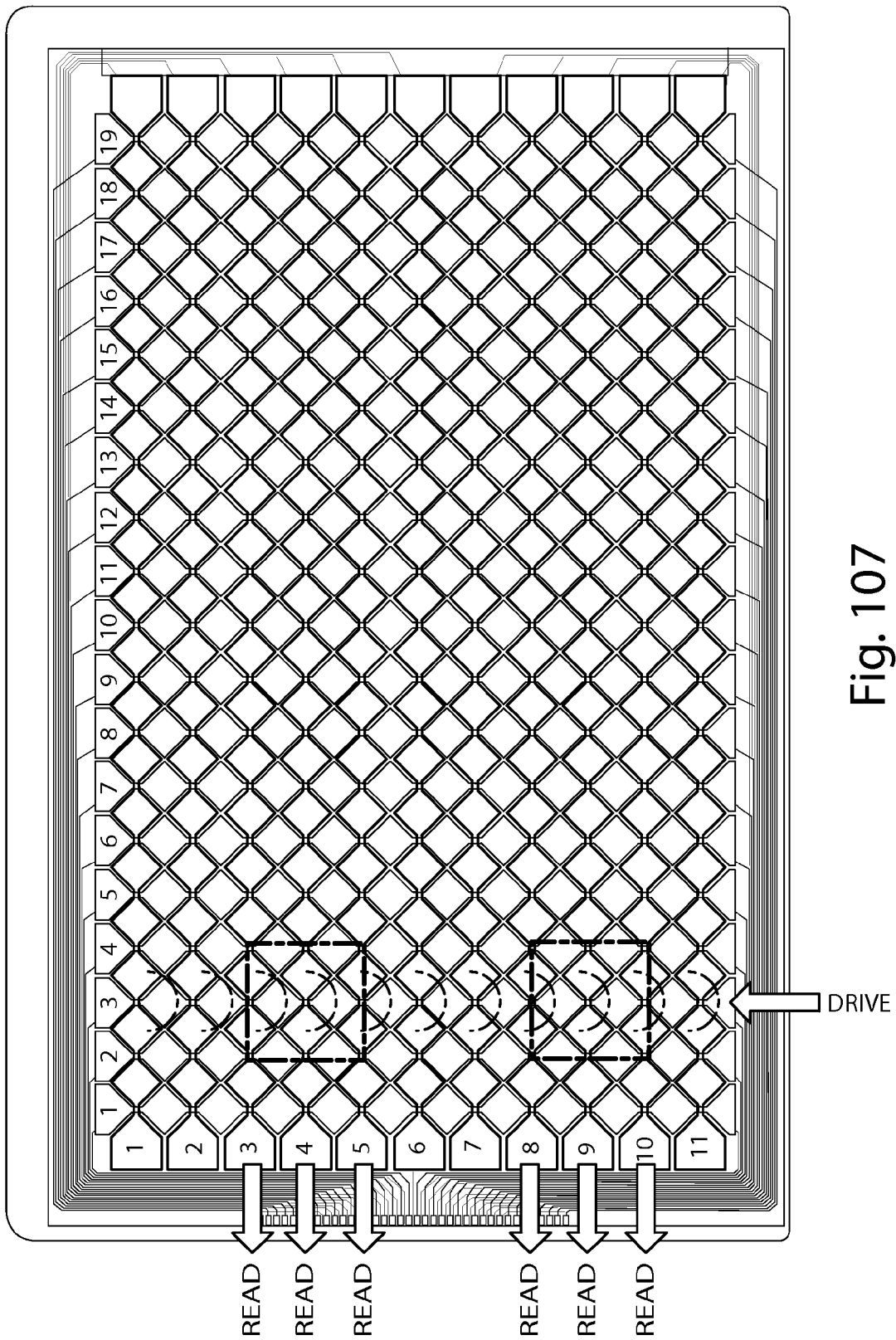
FIG. 107 is a top view of the touch sensor of FIGS. 103-104 depicting the strobing of a single column and the reading of multiple rows.
Figure 108:
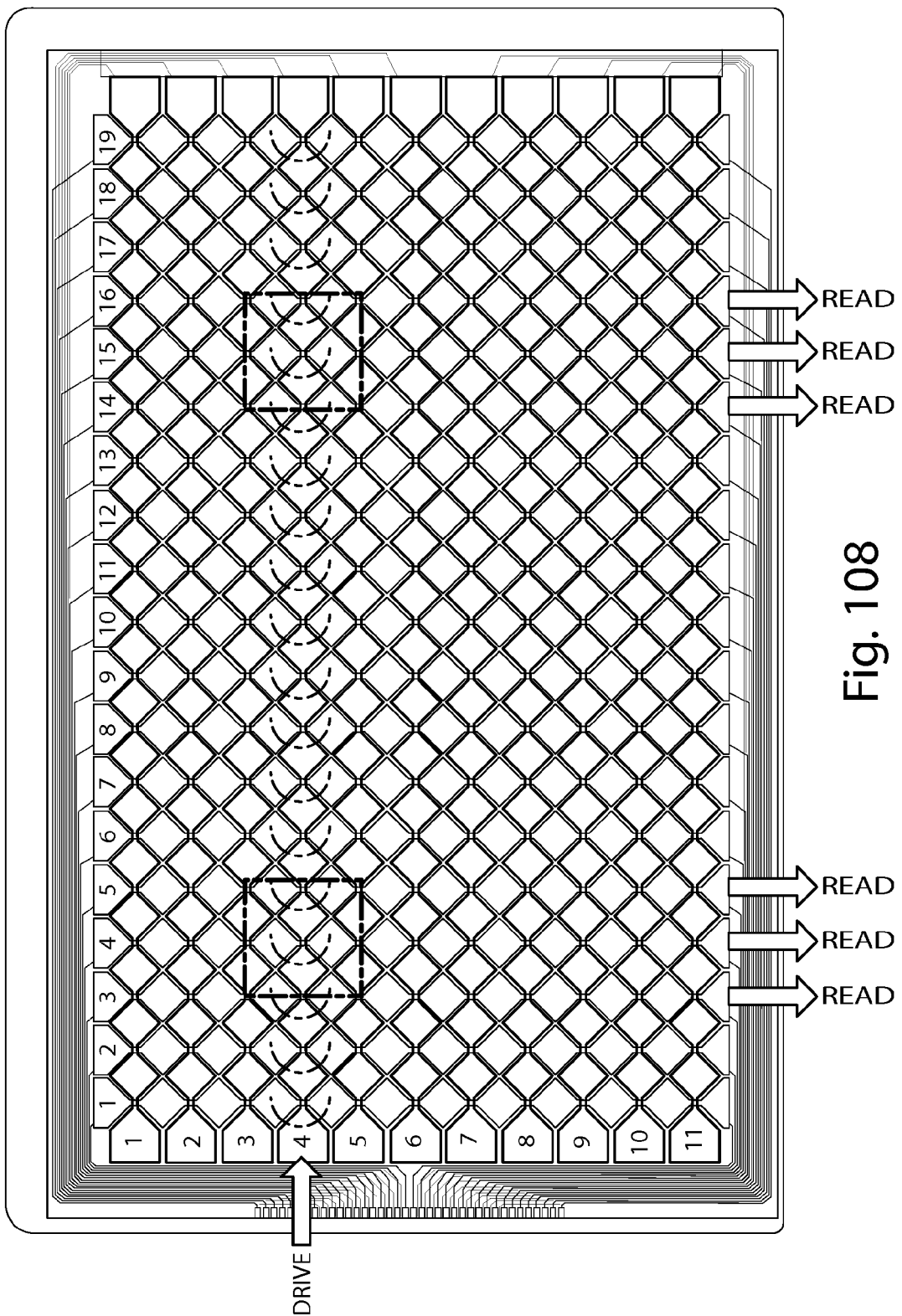
FIG. 108 is a top view of the touch sensor of FIGS. 103-104 depicting the strobing of a single row and the reading of multiple columns.
Figure 109:
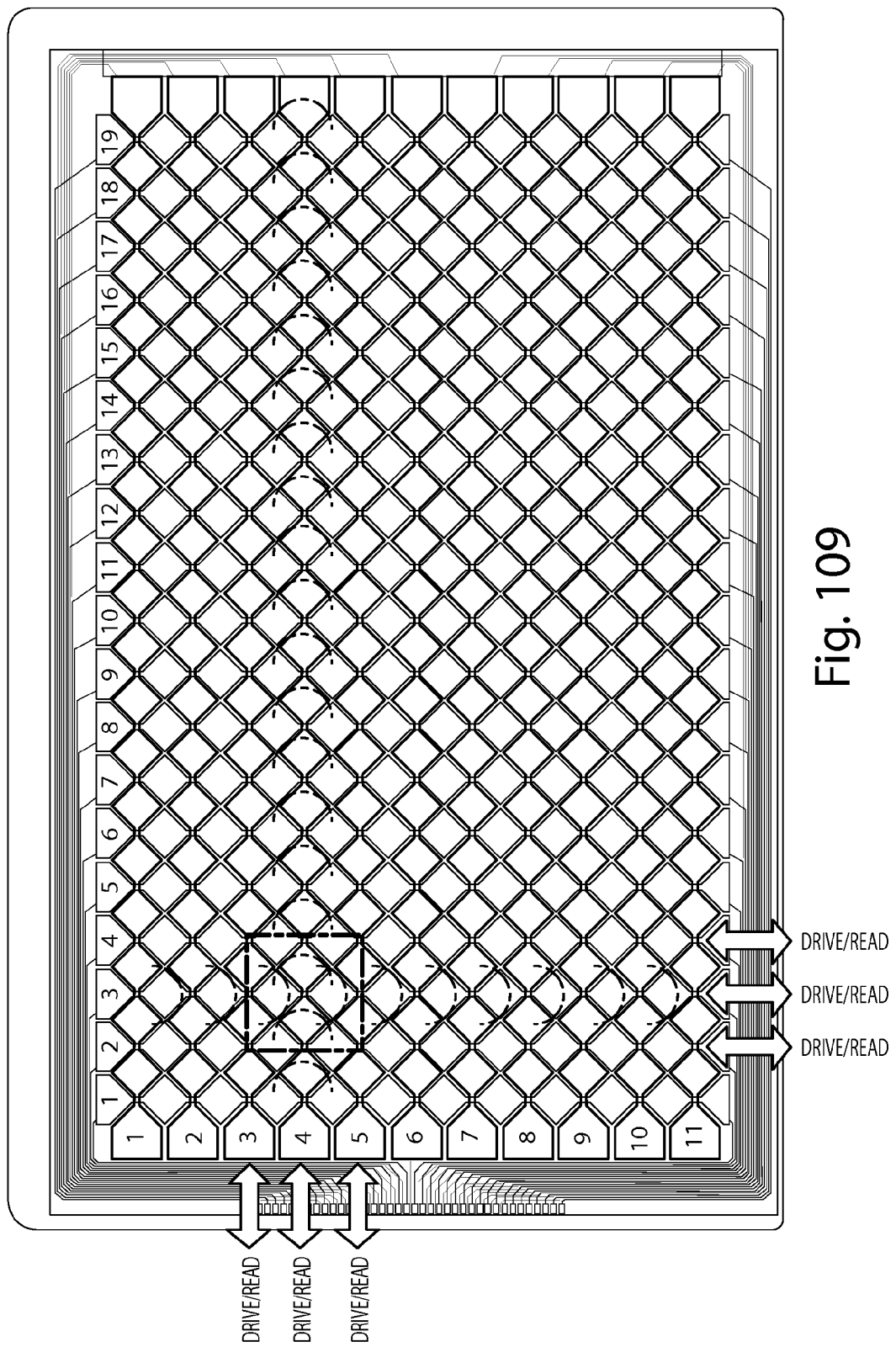
FIG. 109 is a top view of the touch sensor of FIGS. 103-104 depicting the strobing of multiple rows and the reading of multiple columns and vice versa.

FIGS. 107 through 109 are similar to FIGS. 100 through 102 in that there is a strobing of columns and reading of responses from rows and conversely the strobing or rows and reading of responses of columns, with the exception that instead of selecting individual rows and columns for reading responses there is the selecting of three rows and columns simultaneously. Note again, in FIG. 107 that there can be two or more responses on rows for a column strobe and similarly in FIG. 108 there can be two or more responses on columns for a row strobe. FIG. 109 illustrates the common intersection of a touch input that would be common to both strobing of columns and reading row responses and strobing of rows and reading columns responses in FIGS. 107 and 108. Again, the flow charts in FIGS. 91 through 94 would be used and the techniques and benefits described for differential electrodes using time domain differential signature recognition processing would apply.

Figure 110:
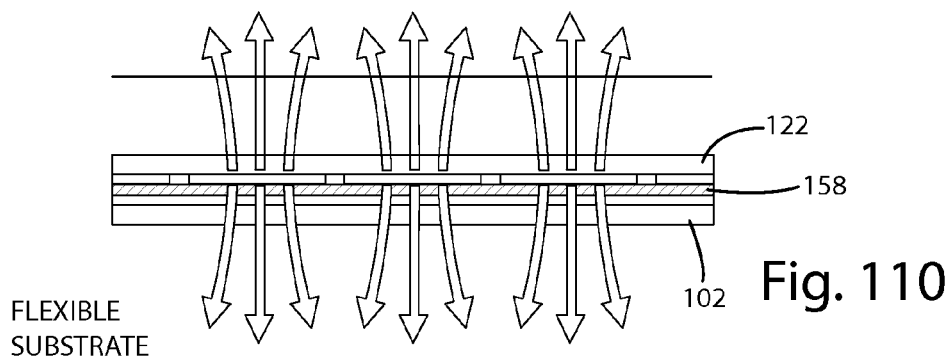
FIG. 110 is a first side view of a touch sensor including electrode columns and electrode rows.
Figure 111:
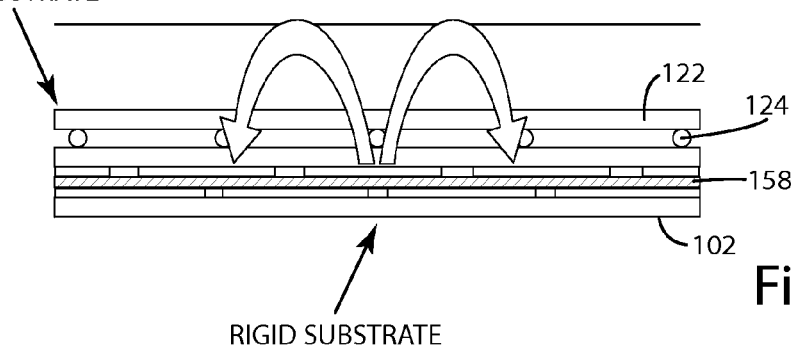
FIG. 111 is the touch sensor of FIG. 110 modified to include a flexible substrate.
Figure 112:
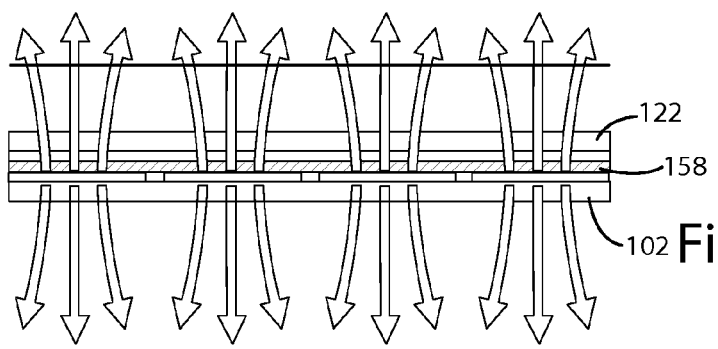
FIG. 112 is a second side view of a touch sensor including electrode columns and electrode rows.
Figure 113:
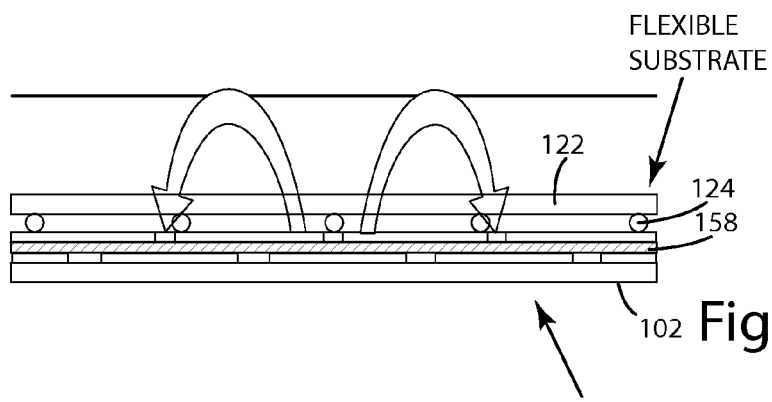
FIG. 113 is the touch sensor of FIG. 112 modified to include a flexible substrate.
Figure 114:
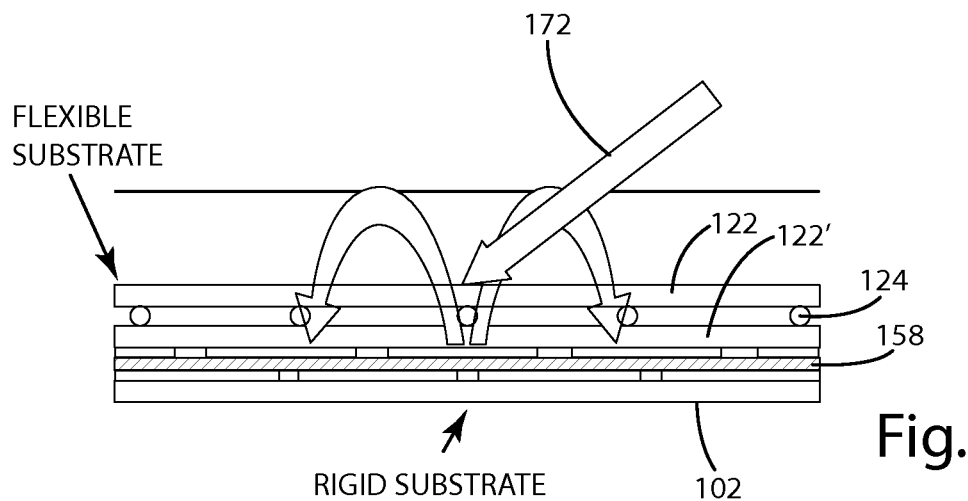
FIG. 114 is a first side view of a touch sensor including electrode columns and electrode rows and illustrating a net electric field.
Figure 115:
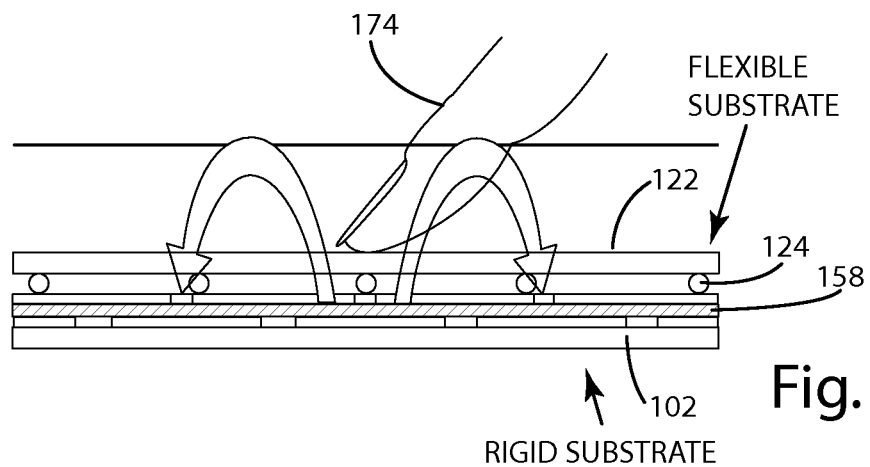
FIG. 115 is a second side view of a touch sensor including electrode columns and electrode rows and illustrating a net electric field.
Figure 116:
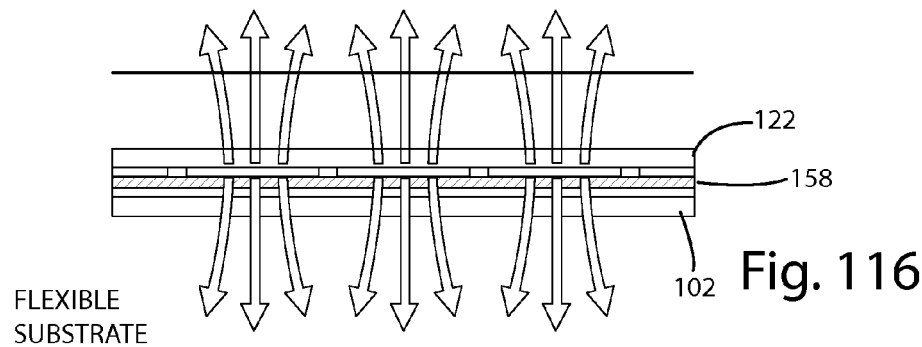
FIG. 116 is a first side view of a touch sensor including electrode columns, electrode rows, and a biased electrode.
Figure 117:
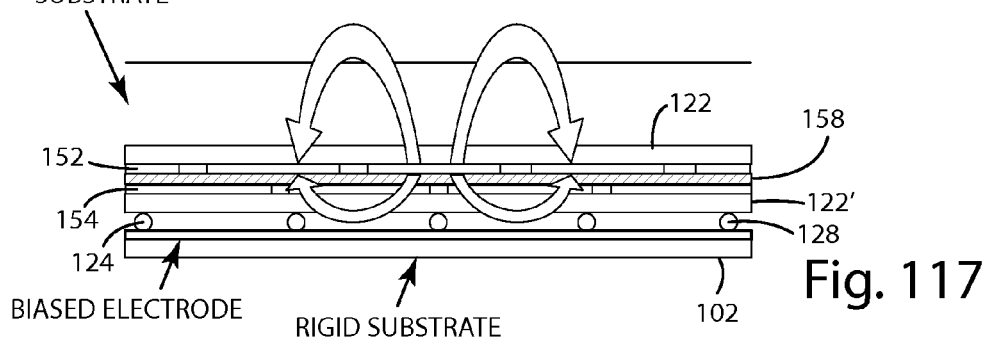
FIG. 117 is the touch sensor of FIG. 116 illustrating a net electric field.
Figure 118:
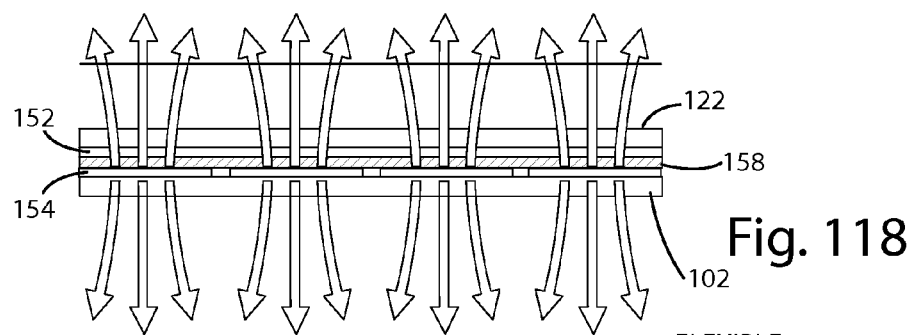
FIG. 118 is a second side view of a touch sensor including electrode columns, electrode rows, and a biased electrode.
Figure 119:
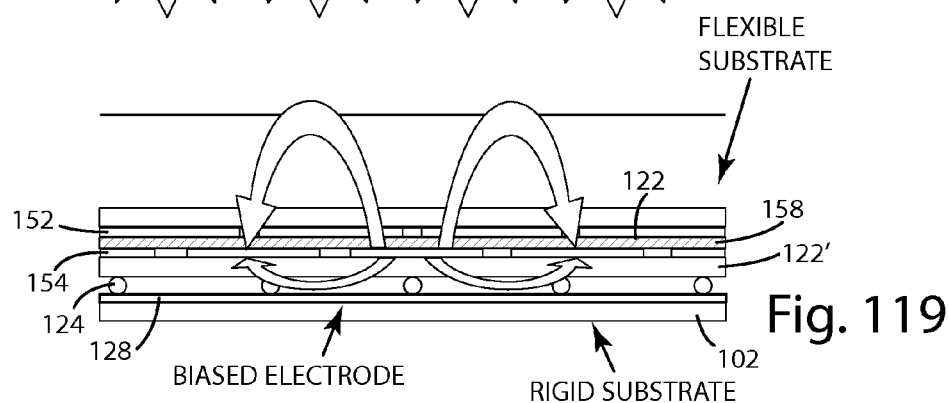
FIG. 119 is the touch sensor of FIG. 118 illustrating a net electric field.
Figure 120:
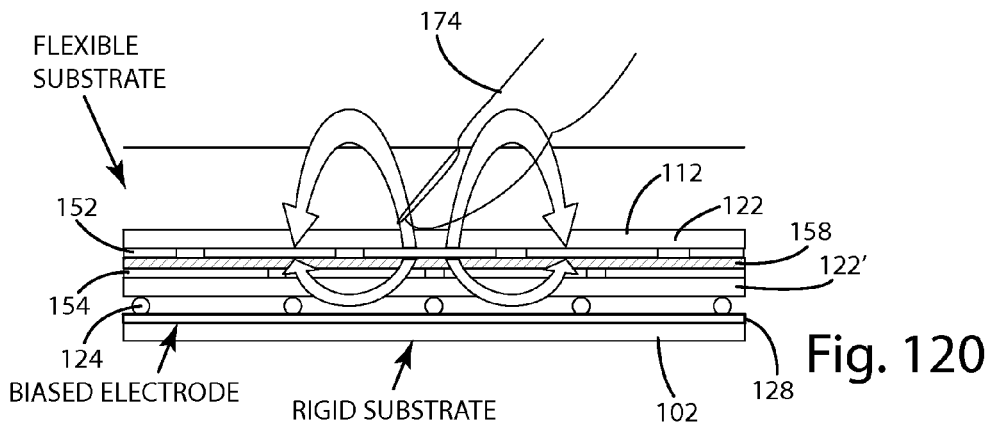
Figure 121:
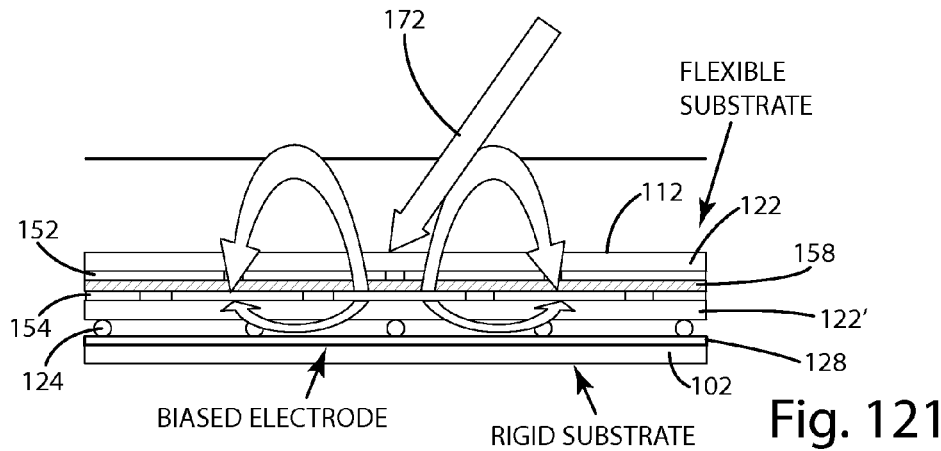

FIGS. 110 through 129 illustrate other potential uses of time domain differential touch signature processing using three dimensional touch sensors. FIG. 110 through 113 illustrate the addition of a flexible substrate 122 to any of the basic structures shown in FIGS. 81 through 83, 85 through 87, 88 through 90, 100 through 102, and 107 through 109. The flexible substrate 122 would be used similarly as the techniques used to describe FIGS. 41 through 43, 65, 73, 74. FIG. 110 and FIG. 112 illustrate side views of electric fields formed by the columns and rows when they are stimulated as shown in FIGS. 81 through 83 and FIGS. 85 through 90. FIG. 111 and FIG. 113 illustrate side views of electric fields formed by the columns and rows when they are stimulated as shown in FIGS. 100 through 102 and 107 through 109. FIG. 114 illustrates how a stylus 172 may be used and FIG. 115 illustrates the use of a finger 174. If the stylus tip is connected to a conductive material, and if this conductive material is coupled to the hand of the human, then a stylus can be used in the structure similar to the finger shown in FIG. 115. The added benefit of a smaller more highly resolute input stimulus might be used. FIGS. 116 through 119 illustrate another variation of a three dimensional electrode structure using the column/row matrix construction. A three dimensional electrode structure can include a gap, optionally an air gap, between the electrode rows and the electrode columns. A three dimensional electrode structure can also apply to conventional capacitive sensing and differential sensing, in addition to time domain differential sensing. This variation allows for the flexing of the column/row matrix towards a biased electrode (such as ground) 128 to affect the change of stimulus as the finger 174 or stylus 172 moves the column/row matrix towards the biased electrode 128. The biased electrode 128 can include any DC potential, pulsed AC potential or strobed, and can be positioned adjacent the upper substrate 122. Other configurations are also possible, provided there is relative movement between a sensing electrode and a biased electrode. The finger or stylus will cause an increase of stimulus as either approach the touch substrate 122 surface 112. An increasing stimulus will be inserted as the stylus or finger move the flexible column/row matrix (localized) towards the biased electrode 128. FIGS. 120 and 121 illustrate the use of a finger 174 and stylus 172.

Figure 122:
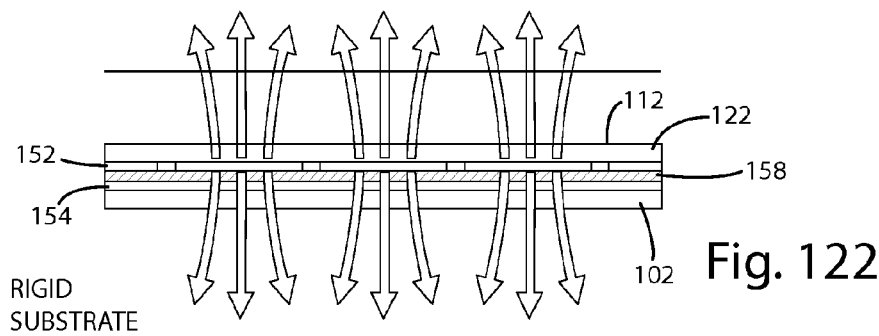
Figure 123:
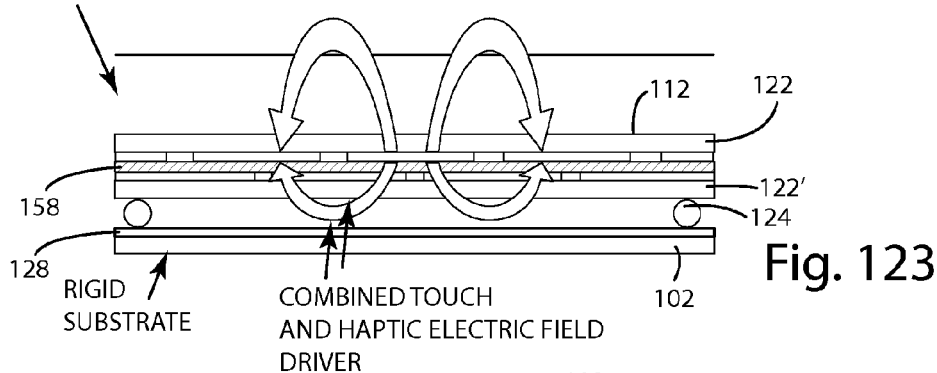
Figure 124:
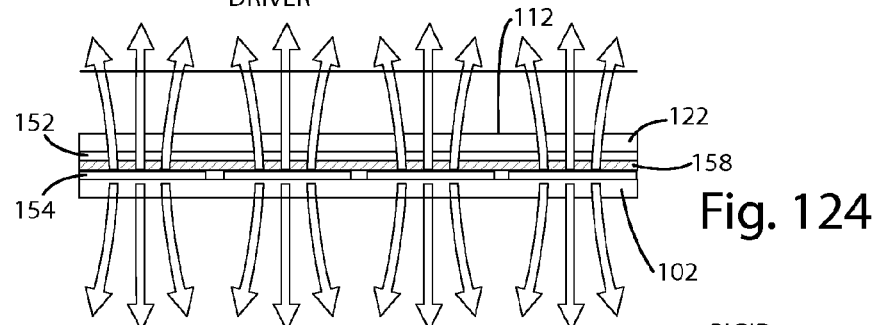
Figure 125:
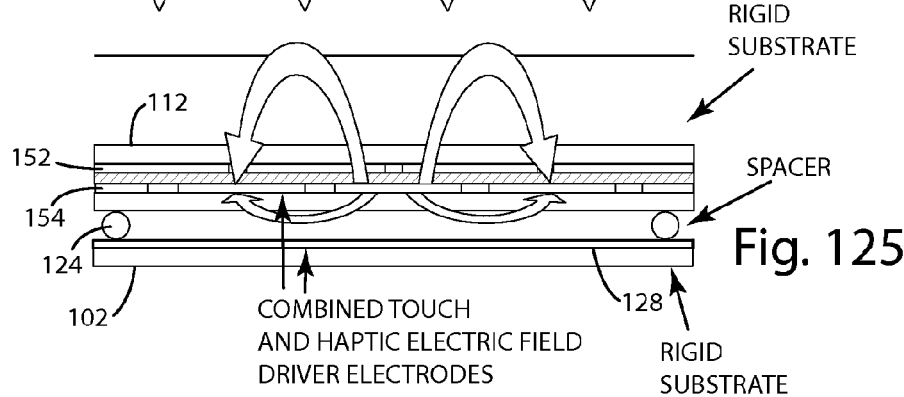
Figure 126:
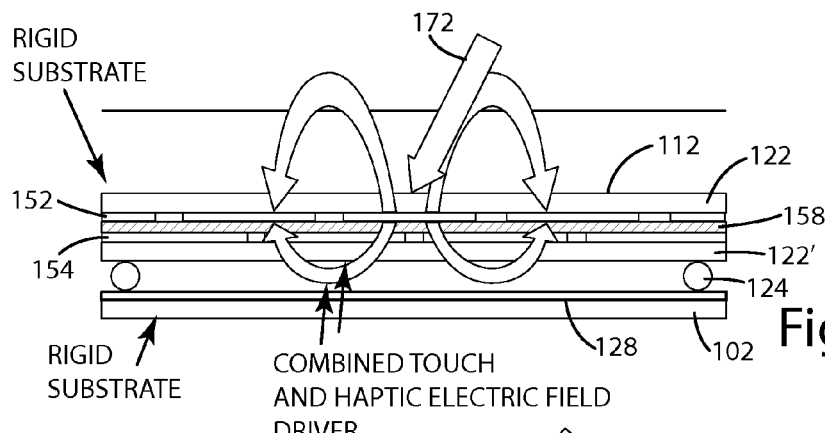
Figure 127:
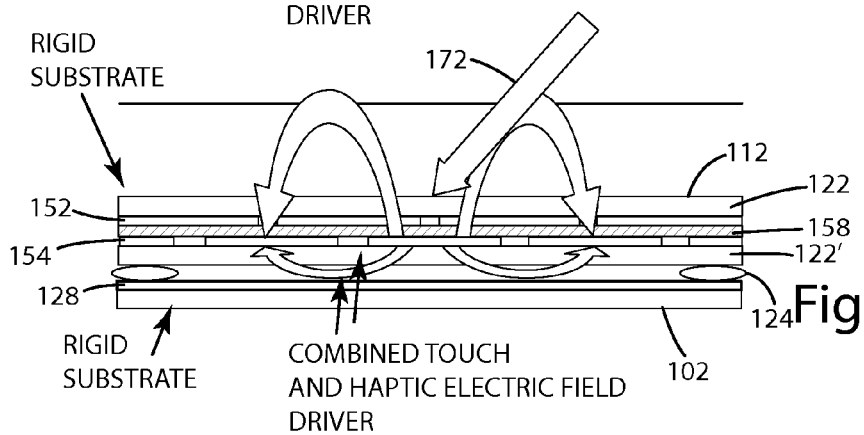
Figure 128:
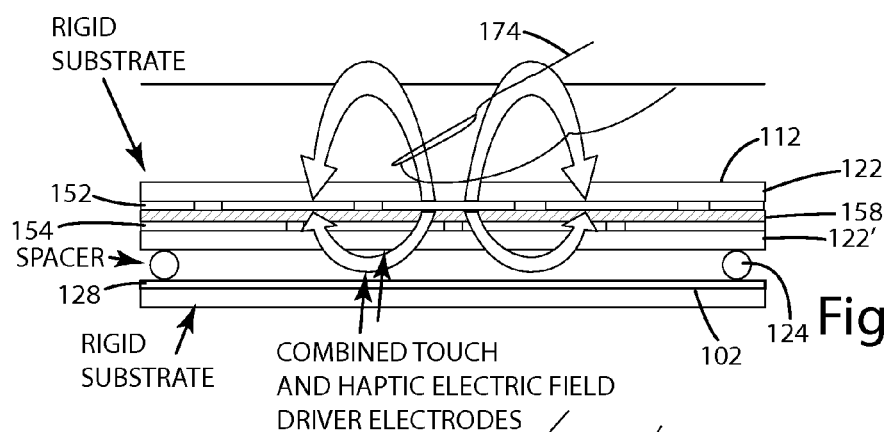
Figure 129:
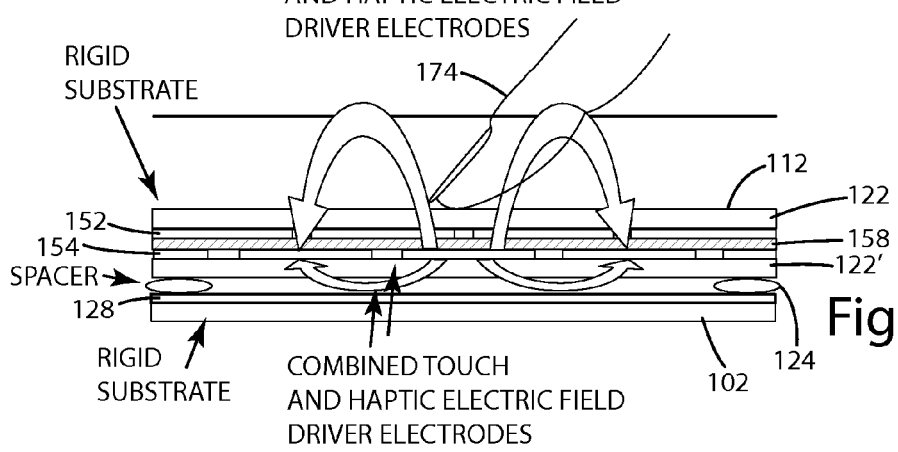

FIGS. 122 through 129 illustrate the use of a three dimensional time domain differential electrode structure made of two rigid materials 102 and 122 separated by spacers 124 that are compressible. FIGS. 122 and 124 show side views of top rigid sensor assembly constructed of a rigid substrate 122. The construction shown also would apply specifically to a matrix type touch input device 170. The top rigid sensor substrate 122 would be directly or indirectly supported by a spacer material 124 that can be compressed to allow the two rigid substrates 102 and 122 to move closer together without much deflection of the upper rigid substrate 122 when pressed by a finger 174 or stylus 172. When a stylus 172 or finger 174 move towards and touches the rigid upper sensor substrate 112, the time domain differential touch signature techniques would be used to determine the match of a touch input, then interpolation and gesture recognition. If the stylus 172 and finger 174 were to exert pressure after the touch condition such as to cause the spacers 124 that are supporting the rigid upper sensor assembly to compress allowing the sensor electrodes 152, 154 to move towards the biased electrode 128, then using time domain differential processing techniques will allow additional features to be added based on a third dimensional input. These added features are similar to that which was described in FIGS. 46, 47, 48, 50, and 66. FIGS. 126 and 128 illustrate the use of stylus and finger for detecting the touch condition without compressing the spacers 124. FIGS. 127 and 129 show movement and decreasing of space between the two rigid substrates 122 and 102 (increasing the stimulus because of the biased electrode) by moving the rigid upper touch surface 122 towards the lower rigid substrate 102.

Additionally by sharing the conductive rows and columns and the lower conductive biased electrode with a haptics driver, the same construction may be used for generating the third dimension of touch sensing and may also be used to generate haptics response. Haptics feedback is becoming more and more popular as the user experience is enhanced when a touch input is made by causing a tunable vibrating stimulus at the finger indicating that a touch was interpreted by the user device as well as providing a different vibrating response depending on the type of touch signature or touch signature/gesture is provided. Time domain differential is particularly useful with haptics as the actual moment of touch is determined which in turn can be used to generate haptics feedback. This would be in contrast with systems that use predetermined threshold techniques where a touch input may be falsely or prematurely be interpreted causing the haptics response to trigger to soon or sluggishly. The advantage of using time domain differential sensing as described herein will be true in any haptics application. The integrated haptics/time domain differential signature electrode structure shown in FIGS. 122 through 129 (when the electrodes on the upper and lower rigid substrates are shared) can provide for a reduced package profile in mobile and other devices. For example, a capacitive sensor can include an upper substrate 122 for receipt of a touch input thereon, an upper electrode 152 supported by the upper substrate 122, a lower electrode 154 spaced apart from the upper electrode 152, and a lower substrate 122' for supporting the lower electrode 152. An integrated circuit, microcontroller, or FGPA for example can include both a processing unit to detect a touch input and a haptics driver to induce an electrostatic force between the first and second spaced apart electrodes 152, 154 to vibrate the upper substrate 112 in response to a touch input thereon. By combining the processing unit and the haptics driver into a single integrated circuit, for example, the haptic response latency is potentially reduced. In addition, the processing unit can include a time domain differential sensing circuit and/or a differential sensing circuit as substantially set forth above. The vibration of the upper substrate 112 can be performed by dedicated haptics controller in other embodiments, however. In these and other embodiments, control of the haptics driver and touch sensing can be interleaved. Further optionally, the upper electrode 152 can include a plurality of electrode rows, and the lower electrode can include a plurality of electrode columns as substantially set forth above in connection with FIGS. 81-82.

IV. Time Domain Differential Sensing in Light Sensors

Figure 130:
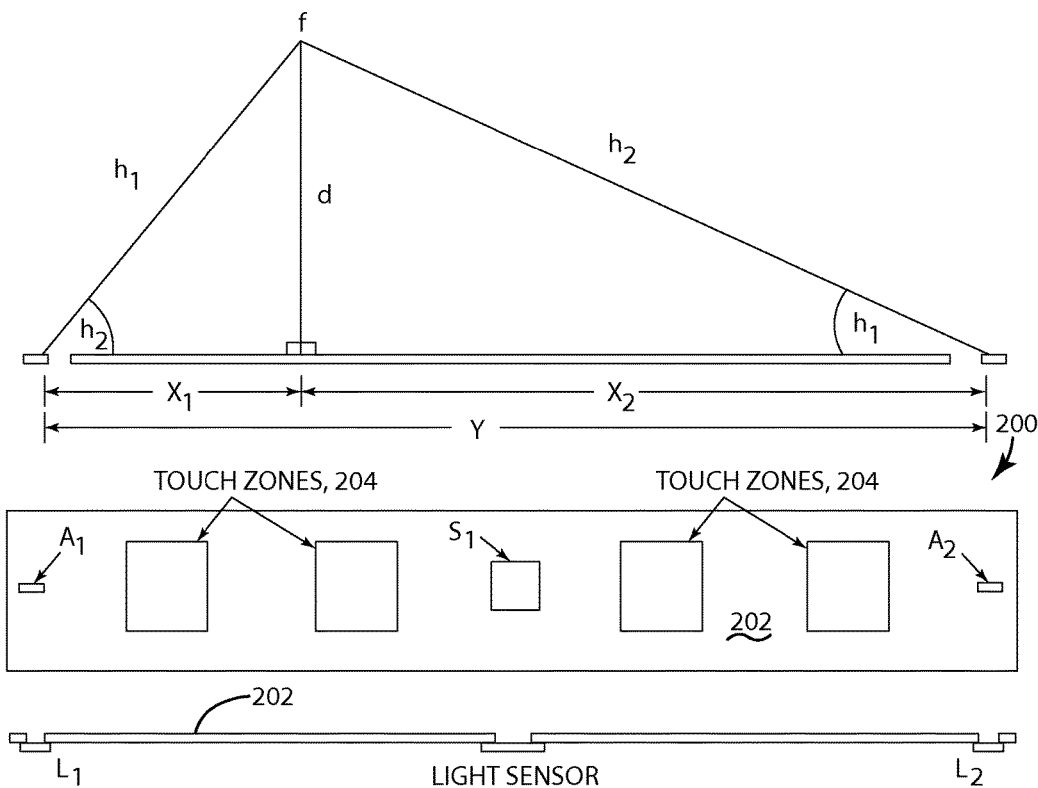

Time domain differential sensing techniques can be applied to the sensing of other parameters such as light. FIG. 130 illustrates the use of LED lighting and light sensors 200 to determine the signature of an object above a surface 202. FIG. 130 illustrates a single row array of sensor pads 204 with LED apertures A1 and A2 to allow for the projection of light emitted by LEDs L1 and L2 located underneath the apertures. There are two LEDs and apertures, one LED and aperture at one end of the sensor strip and another LED and aperture at the opposite end. There is one sensor, S1, located in the middle of the strip for sensing the reflected light objects, as they move toward the touch surface, from the LEDs L1 and L2. The aperture size and geometry would be sized such that the intensity of the light would vary as an object is moved over top of the sensor strip. As an object moves from the left to the right, the intensity of the light would vary roughly proportional to the sin(h2) and sin(h1). Angle h2 would decrease as an object moves from the left to the right and the light from aperture A1 is reflected by the object to sensor S1 and would decrease in intensity in proportion the angle h2. Simultaneously, the light emitted from aperture A2 and reflected by the object to sensor S1 would vary in intensity roughly proportionate to the sin(h1). LEDs L1 and L2 would alternate in stimulation by a drive circuit. In other words, L1 would be turned on and Sensor S1 would measure the intensity of the reflected light and process or store for later processing. L1 would be turned off and L2 would be turned on and the reflected light intensity reflected off the object would be measured by S1 and processed or stored later for processing. The intensity of the light reflected from LEDS L1 and L2 would both decrease simultaneously if the object were to remain fixed above the sensor strip but move perpendicular towards the surface. Conversely the reflected intensity would increase in the reflected light off an object if that object were to remain fixed above the sensor strip yet move away from the sensor strip surface. Instead of measuring the change in stimulus of an electric field but measuring this stimulus change in light intensity, an object would be able to be tracked up, down, left, and right above the sensor strip 200 adding a third dimension above the touch sensor pads 204. As a finger or stylus moves above the surface 202, different finger/hand signatures can be captured to supplement the interactivity of the touch signature at the touch surface 202 as described herein previously.

Figure 131:
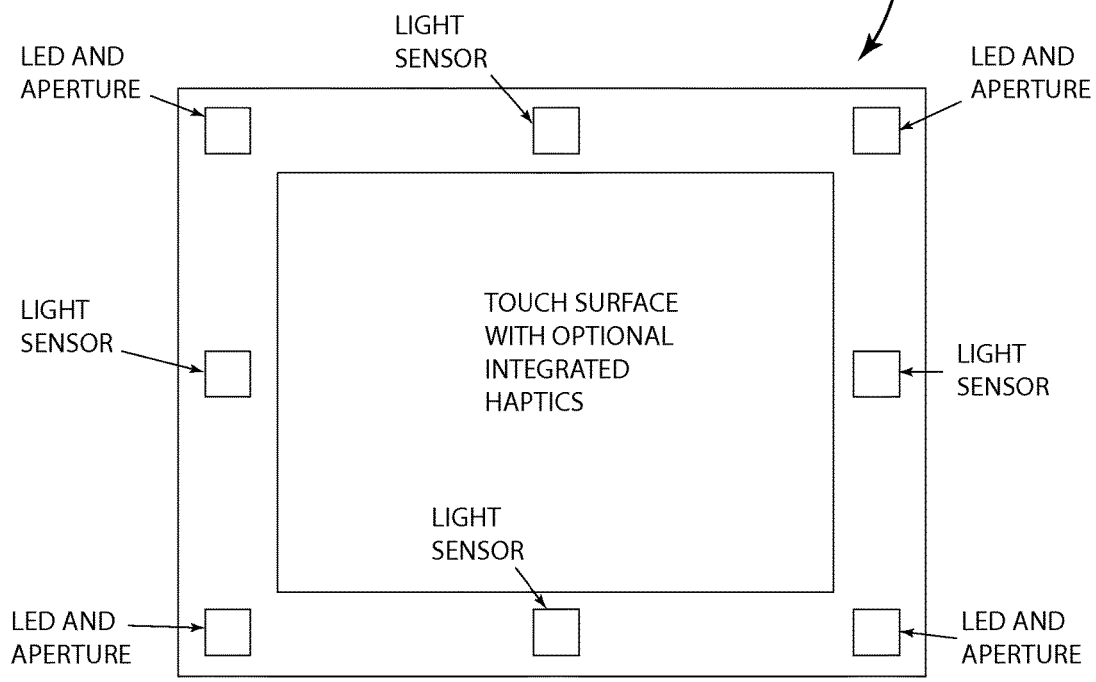
Figure 132:
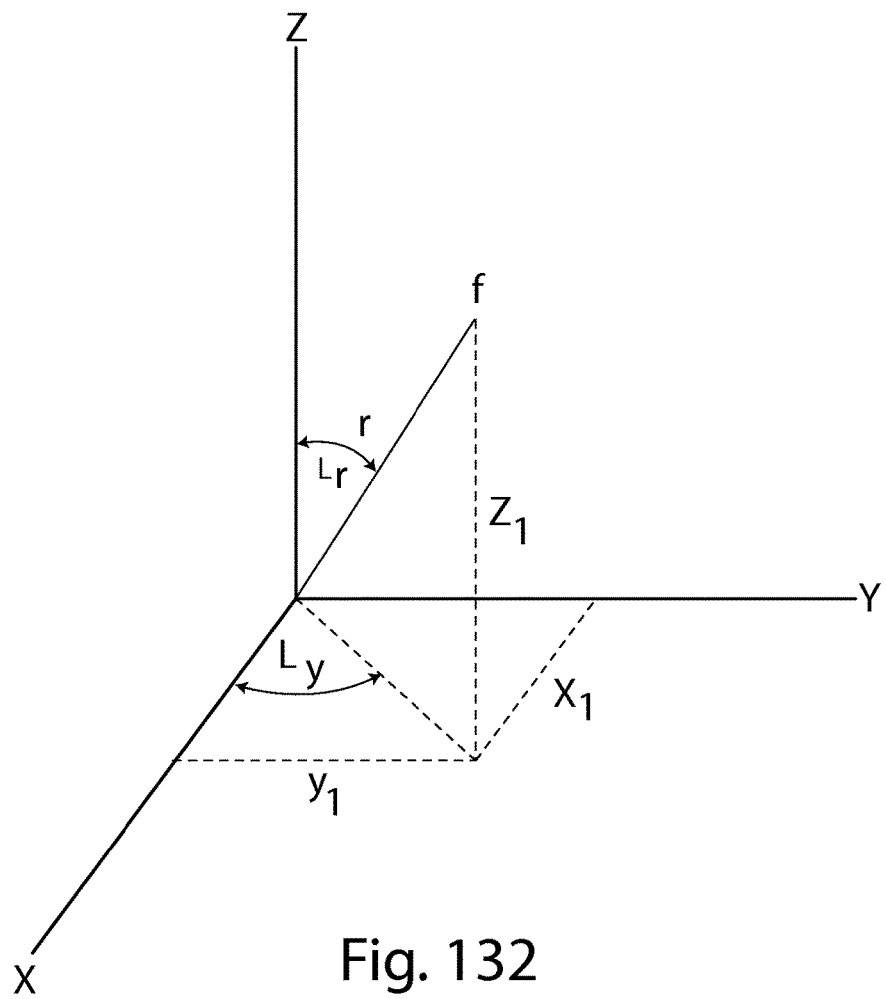

The concept of using light in conjunction with rows and columns of touch electrodes can be implemented as discrete buttons or high resolution touch matrices. FIG. 131 illustrates one possibility for extending the time domain differential sensing on an XY matrix application such as a mouse pad or touch screen 210. FIG. 132 shows variables as they relate simple analytical trigonometry to determine location in three dimensional space above a plane (which would be the touch screen, touch pad, or keyboard). The touch pad or touch screen can include integrated haptics substantially as set forth above in connection with FIGS. 122 through 129. The formulas apply in general in which the light intensity would vary proportionally to following:

$$x = r * \sin(\text{angle } r) * \cos(\text{angle } y)$$

$$y = r * \sin(\text{angle } r) * \sin(\text{angle } y)$$

$$z = r * \cos(\text{angle } r)$$

$$r = \sqrt{x^2 + y^2 + z^2}$$

$$\text{Angle } y = \text{inv} \tan(x/y)$$

$$\text{Angle } r = \text{inv} \cos(z/\sqrt{x^2 + y^2 + z^2})$$

Where the intensity from the light apertures would vary with angle (r).

As the term is used herein, a "capacitive sensing circuit" is any circuit including one or more electrodes having a capacitance that varies in response to the presence of an object, for example a finger, a glove or a stylus. Capacitive sensing circuits can include, for example, a single electrode, an electrode pairing, multiple electrode pairings, a sample and hold capacitor, multiple sample and hold capacitors, an electrode row, multiple electrode rows, an electrode column, multiple electrode columns, a multiplexor, and combinations thereof, whether now known or hereinafter developed. As the term is used herein, a "capacitive sensor" includes a capacitive sensing circuit (e.g., at least a single electrode) in combination with one or more processing units to provide an output inductive of a stimulus. Exemplary processing units can include an analog filter, an analog to digital converter, a digital filter, a differential processing unit, a time domain differential processing unit, a time domain differential signature processing unit, a stimulus detection unit, a gesture recognition unit, a haptics driver, and combinations thereof as optionally set forth in connection with FIGS. 16-129. The processing unit(s) can be analog or digital, and can include for example one or more integrated circuits, micro-controllers, and FPGAs, for example. The capacitive sensors of the present invention can be used across of range of applications where the detection of a stimulus is desired, including touch sensors, touch screens, touch panels, and other control interfaces whether now known or hereinafter developed.

The above description is that of current embodiments. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A capacitive sensor comprising:
   first and second electrodes having a mutual capacitance;
   a touch substrate overlying the first and second electrodes; and
   a processing unit electrically coupled to the first and second electrodes and configured to register a first touch signature in response to an object approaching one of the first or second electrode,
   the first touch signature occurring over a total time domain (T) between a first time and a second time, between a first substantially constant mutual capacitance and a second substantially constant mutual capacitance, wherein the first touch signature includes a rate of change (ds/dt) of the mutual capacitance in combination with at least one of the following parameters of the first touch signature:
   an interval change in mutual capacitance (ds) during the total time domain (T), wherein the interval change in mutual capacitance (ds) is less than a total change in mutual capacitance (S) for the first touch signature,
   an interval time domain (dt) corresponding to the interval change in mutual capacitance (ds), wherein the interval time domain (dt) is less than the total time domain (T) for the first touch signature.

2. The capacitive sensor of claim 1 wherein the first touch signature includes a total change in mutual capacitance (S) during the total time domain (T).

3. The capacitive sensor of claim 1 wherein the interval change in mutual capacitance (ds) is an increase in mutual capacitance.

4. The capacitive sensor of claim 1 wherein the interval change in mutual capacitance (ds) is a decrease in mutual capacitance.

5. The capacitive sensor of claim 1 wherein the interval change in mutual capacitance (ds) is substantially zero during the interval time domain (dt).

6. The capacitive sensor of claim 1 wherein the first electrode is a sense electrode and wherein the second electrode is a strobe electrode spaced apart from the sense electrode.

7. The capacitive sensor of claim 1 wherein the processor is configured to register a second touch signature in response to an object receding from the first and second electrodes.

8. The capacitive sensor of claim 1 wherein the first electrode is an electrode row and wherein the second electrode is an electrode column.

\* \* \* \* \*